(12) United States Patent
Gray et al.

(10) Patent No.: US 11,592,915 B2
(45) Date of Patent: Feb. 28, 2023

(54) E-PEN ASSOCIATION WITHIN TOUCH SENSOR AND E-PEN SYSTEMS

(71) Applicant: SIGMASENSE, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US); Michael Shawn Gray, Dripping Springs, TX (US); Kevin Joseph Derichs, Buda, TX (US)

(73) Assignee: SIGMASENSE, LLC., Wilmington, DE (US)

( * ) Notice: Subject to any disclaimer, the term of this patent is extended or adjusted under 35 U.S.C. 154(b) by 0 days.

(21) Appl. No.: 17/733,448

(22) Filed: Apr. 29, 2022

(65) Prior Publication Data

US 2022/0261095 A1 Aug. 18, 2022

Related U.S. Application Data

(63) Continuation of application No. 17/552,668, filed on Dec. 16, 2021, which is a continuation of application
(Continued)

(51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/0416* (2013.01)

(58) Field of Classification Search
CPC .. G06F 3/0383; G06F 3/03545; G06F 3/0416; G06F 3/04162
See application file for complete search history.

(56) References Cited

U.S. PATENT DOCUMENTS 6,218,972 B1  4/2001 Groshong
6,665,013 B1 12/2003 Fossum et al.
(Continued)

FOREIGN PATENT DOCUMENTS

CN 103995626 A 8/2014
CN 104182105 A 12/2014

OTHER PUBLICATIONS

Baker; How delta-sigma ADCs work. Part 1; Analog Applications Journal; Oct. 1, 2011; 6 pgs.
(Continued)

*Primary Examiner* — Temesghen Ghebretinsae
*Assistant Examiner* — Ivelisse Martinez Quiles
(74) *Attorney, Agent, or Firm* — Garlick & Markison; Timothy W. Markison; Shayne X. Short

(57) ABSTRACT

An e-pen includes e-pen sensor electrodes (including a first and a second e-pen sensor electrode) and drive-sense circuits (DSCs) (including a first DSC and a second DSC. The first DSC drives a first e-pen signal having a first frequency via a first single line coupling to the first e-pen sensor electrode and simultaneously senses, via the first single line, the first e-pen signal. Based on e-pen/touch sensor device interaction, the first e-pen signal is coupled into at least one touch sensor electrode of the touch sensor device. The first DSC process the first e-pen signal to generate a first digital signal representative of a first electrical characteristic of the first e-pen sensor electrode. Similarly, the second DSC drives a second e-pen signal having a second frequency via a second single line coupling to the second e-pen sensor electrode and
(Continued)

simultaneously senses, via the second single line, the second e-pen signal.

20 Claims, 36 Drawing Sheets

Related U.S. Application Data

No. 17/083,998, filed on Oct. 29, 2020, now Pat. No. 11,237,653, which is a continuation of application No. 16/195,041, filed on Nov. 19, 2018, now Pat. No. 10,852,857.

(56) References Cited

U.S. PATENT DOCUMENTS

| | | | |
|---|---|---|---|
| 7,528,755 | B2 | 5/2009 | Hammerschmidt |
| 8,031,094 | B2 | 10/2011 | Hotelling et al. |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,587,535 | B2 | 11/2013 | Oda et al. |
| 8,625,726 | B2 | 1/2014 | Kuan |
| 8,982,097 | B1 | 3/2015 | Kuzo et al. |
| 9,201,547 | B2 | 12/2015 | Elias |
| 2011/0063154 | A1 | 3/2011 | Hotelling et al. |
| 2011/0298745 | A1 | 12/2011 | Souchkov |
| 2012/0062499 | A1 | 3/2012 | Weaver |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1 | 12/2015 | Chen |
| 2016/0188049 | A1 | 6/2016 | Yang et al. |
| 2017/0242502 | A1 | 8/2017 | Gray et al. |
| 2017/0242534 | A1 | 8/2017 | Gray |
| 2018/0107293 | A1 | 4/2018 | Yeh |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

communication system 10 computing device 12 computing device 14 computing device 18 computing subsystem 25

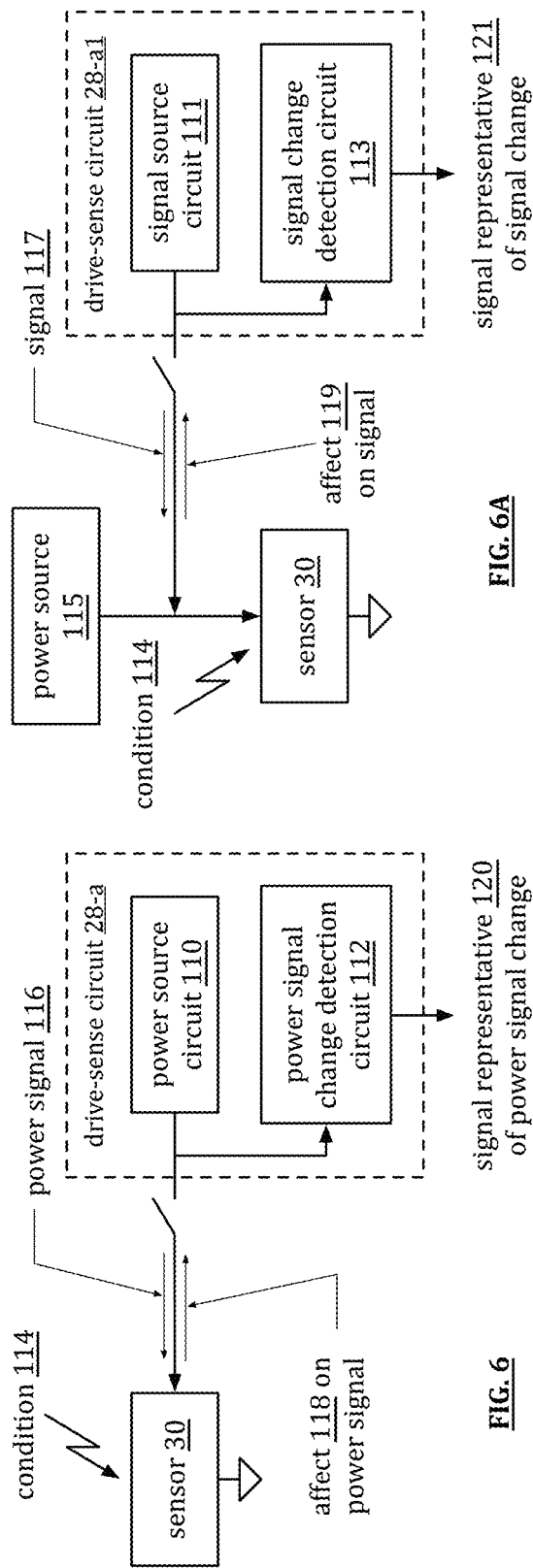
FIG. 6A
FIG. 6
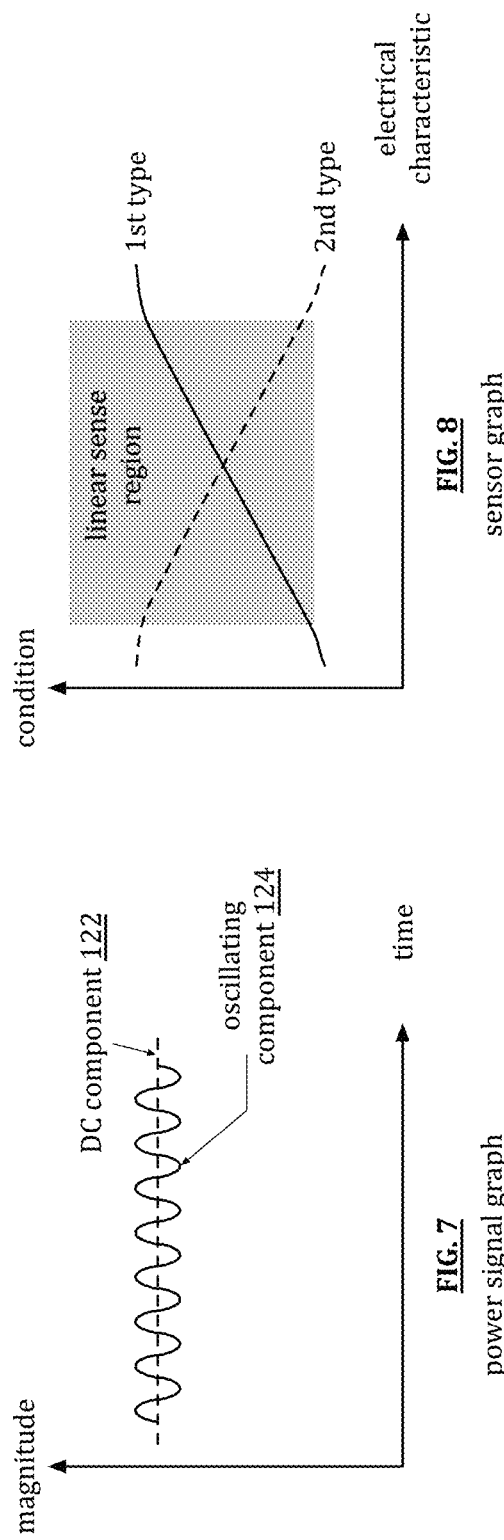
FIG. 8
sensor graph
FIG. 7
power signal graph

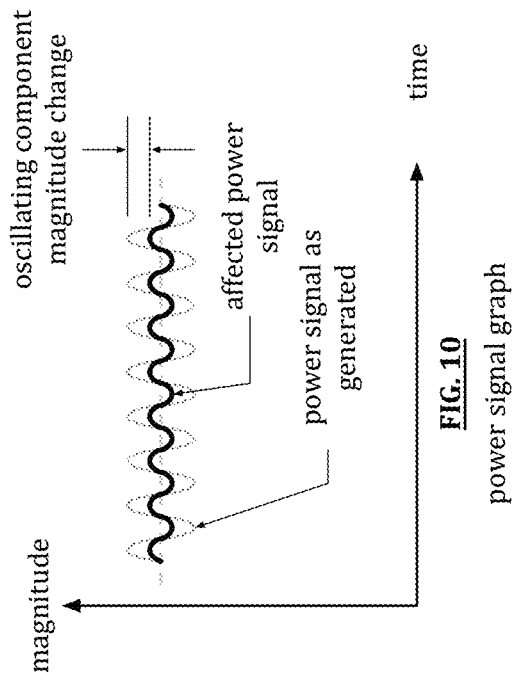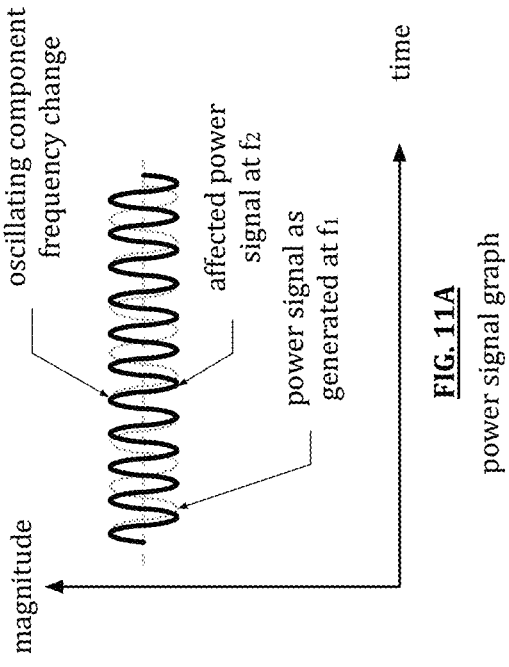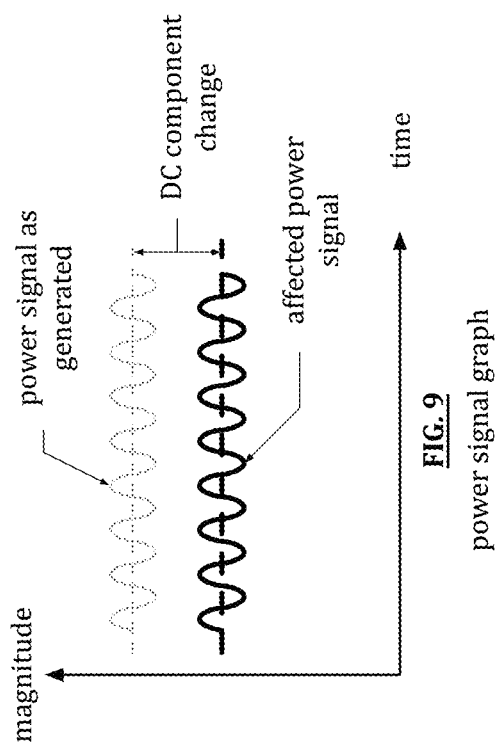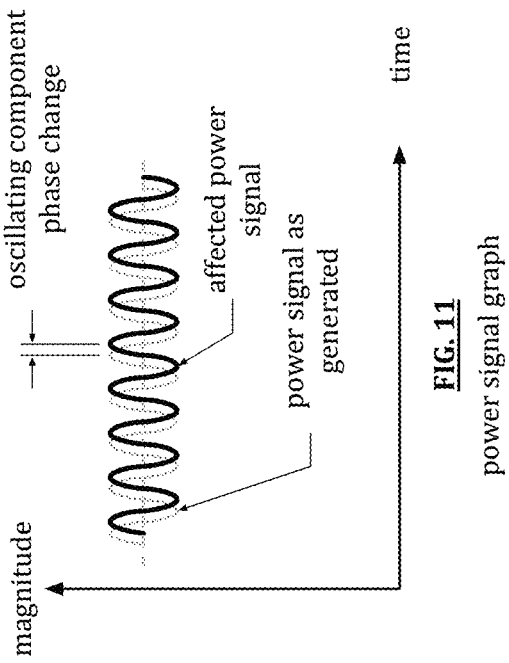

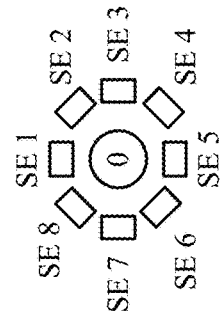
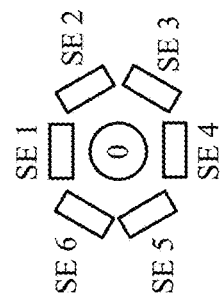
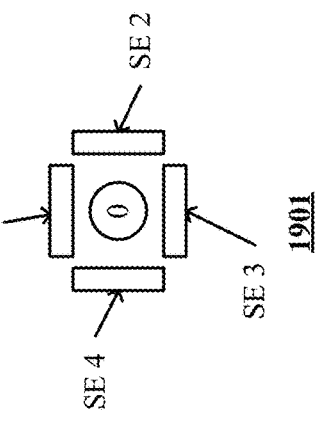
1901
1902
1903
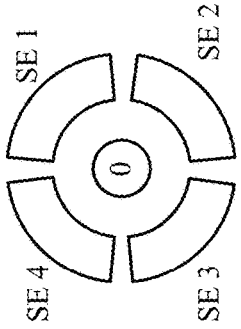
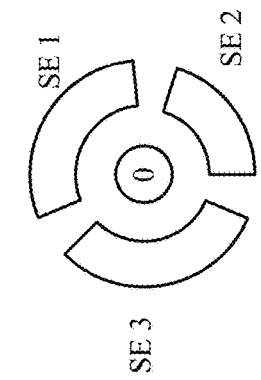
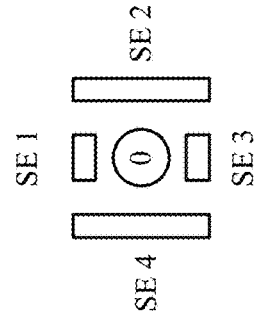
1904
1905
1906
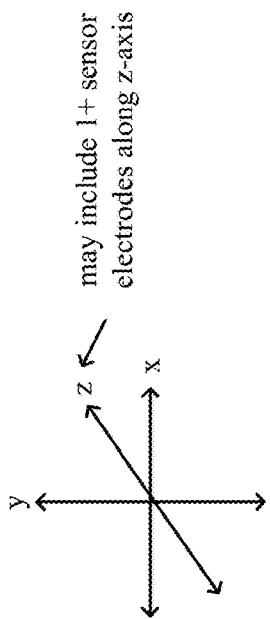
FIG. 19
axial views
(e.g., top or bottom)

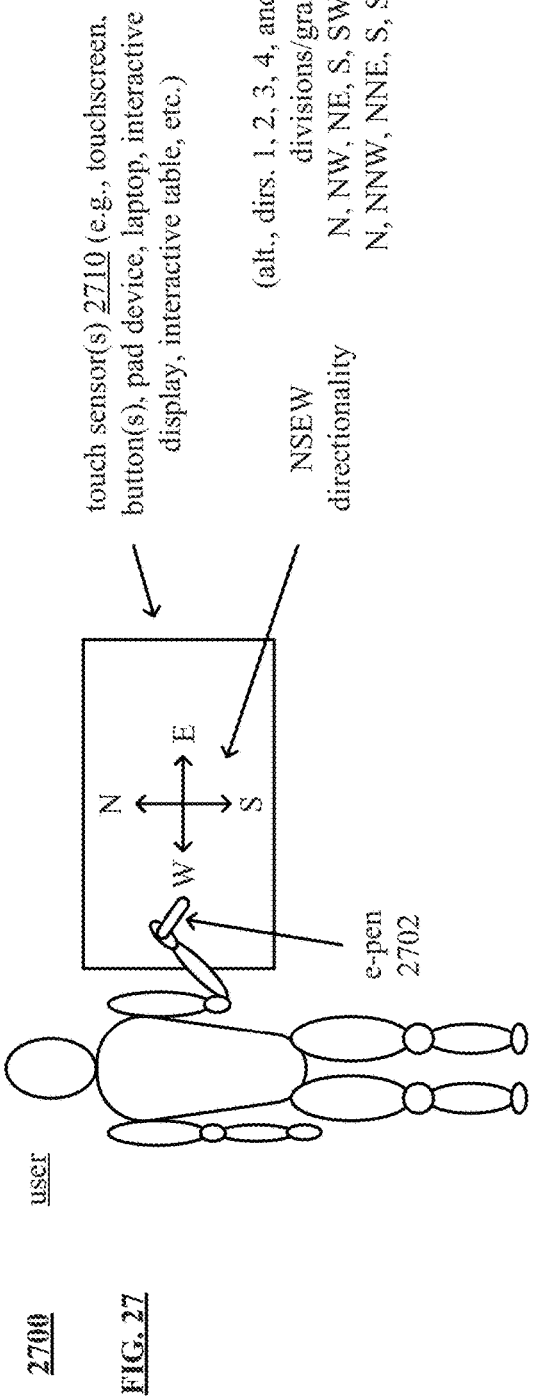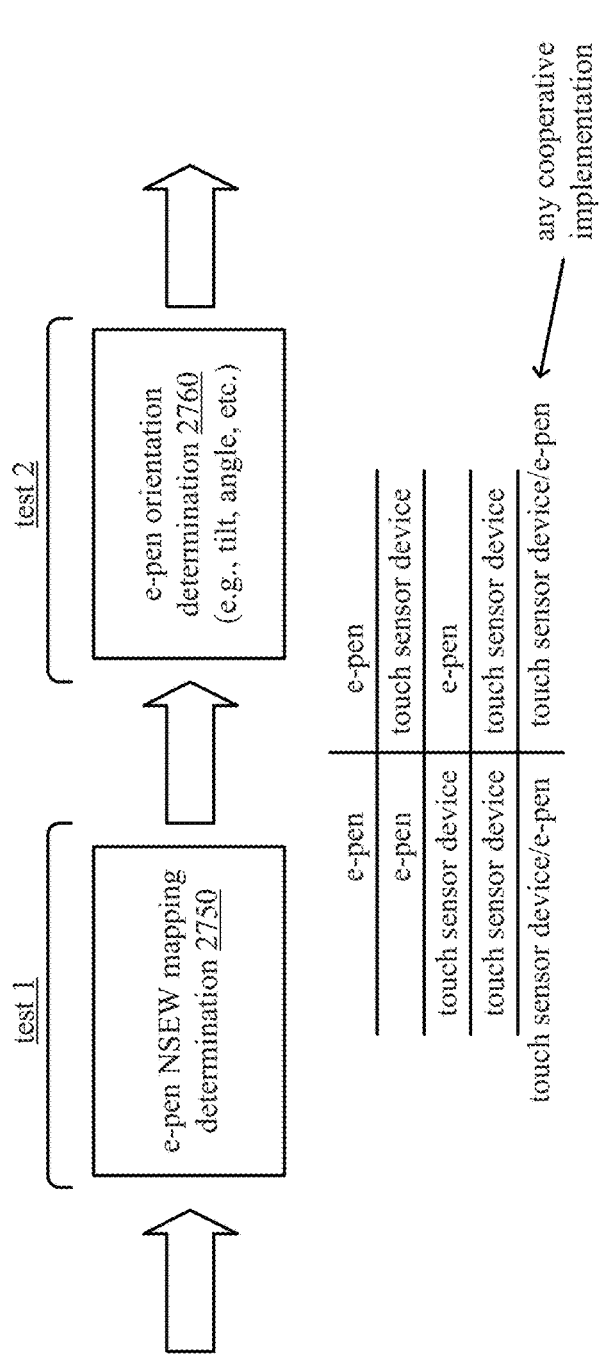
FIG. 27

3000 start/continue

↓ transmitting, via primary sensor electrode of e-pen, primary e-pen signal having primary characteristic(s) (e.g., primary e-pen signal via primary sensor electrode 0) 3010

↓ transmitting, via one or more secondary e-pen sensor electrodes, one or more secondary e-pen signals having secondary characteristic(s) (e.g., first secondary e-pen signal via secondary sensor electrode 1, second secondary e-pen signal via secondary sensor electrode 2, etc.) 3020

↓ detecting, via electrodes of touch sensors, the first e-pen signal having primary characteristic(s) and at least one of the one or more secondary e-pen signals having secondary characteristic(s) 3030

↓ processing, using processing module(s) associated with the touch sensors, the primary e-pen signal having primary characteristic(s) and at least one of the one or more secondary e-pen signals having secondary characteristic(s) to generate digital information corresponding to e-pen NSEW mapping 3040

↓ identifying, using processing module(s) associated with the touch sensors, location of the primary sensor electrode based on the sensor electrodes of the touch sensors (e.g., row/column sensor electrodes) and associated touch sensor electrodes (e.g., approx. cross-section of touch sensors where primary first e-pen signal detected) 3050

↓ transmitting, via the associated touch sensor electrodes, one or more touch sensor signals having touch sensor characteristic(s) (e.g., first touch sensor signal via touch sensor electrode 1, second touch sensor signal via touch sensor electrode 2, etc.) 3060

↓ detecting, via the associated touch sensor electrodes, change(s) of the one or more touch sensor signals 3070

↓ processing, using processing module(s) associated with the touch sensors, change(s) of the one or more touch sensor signals to generate digital information corresponding to e-pen orientation 3080 (e.g., tilt, orientation of e-pen changes capacitance between respective sensor electrodes of e-pen)

↓ end/continue

FIG. 30

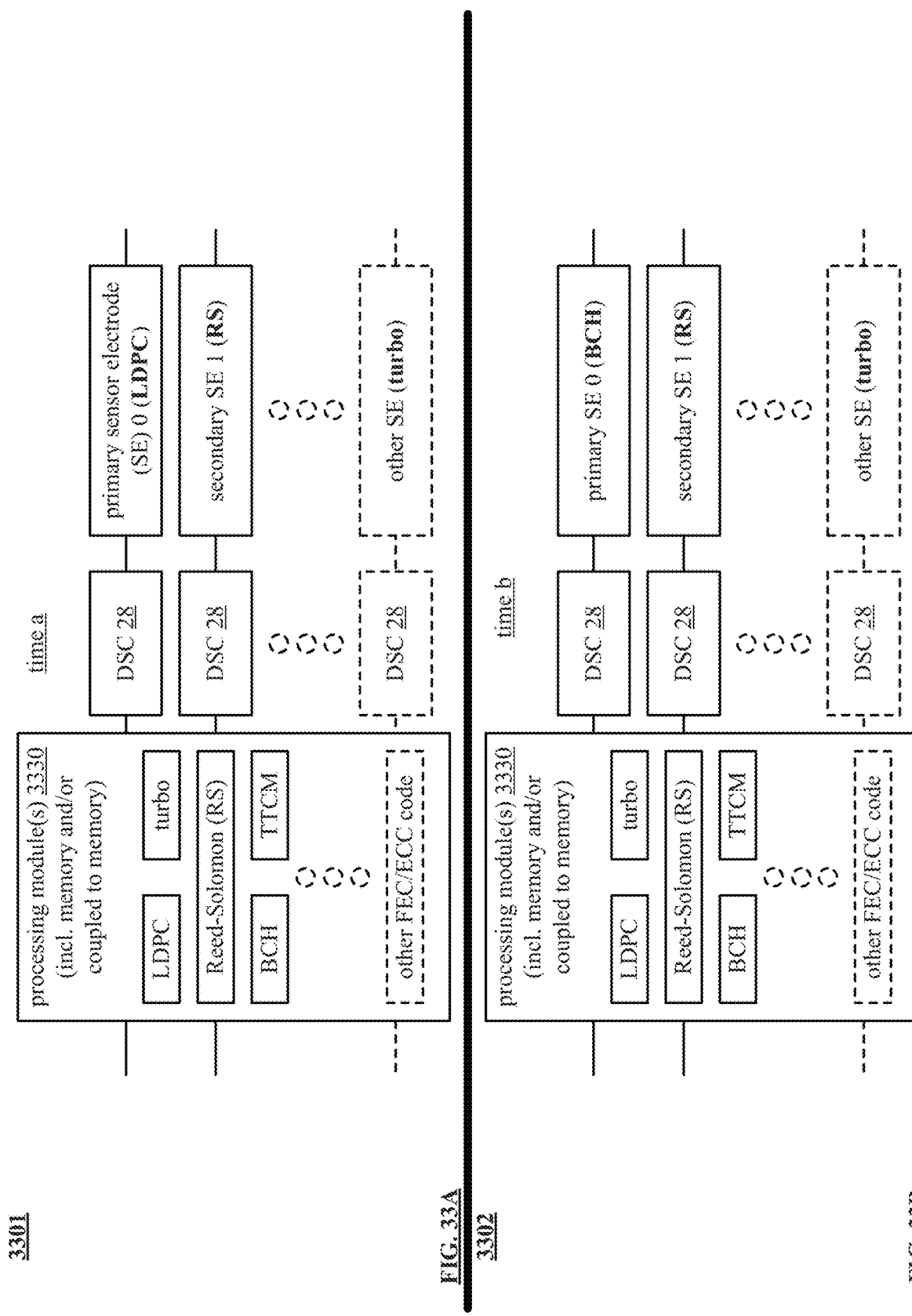

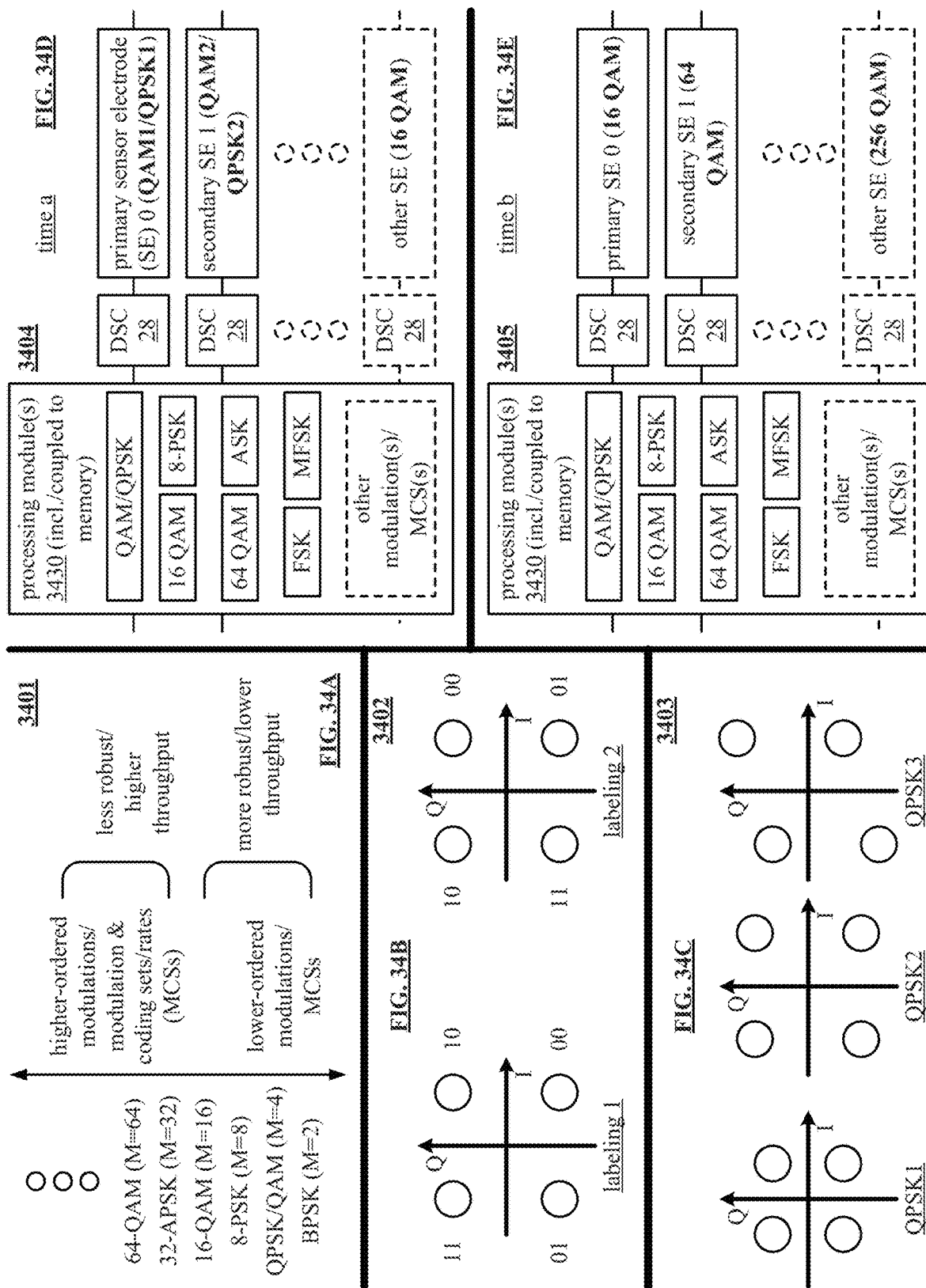

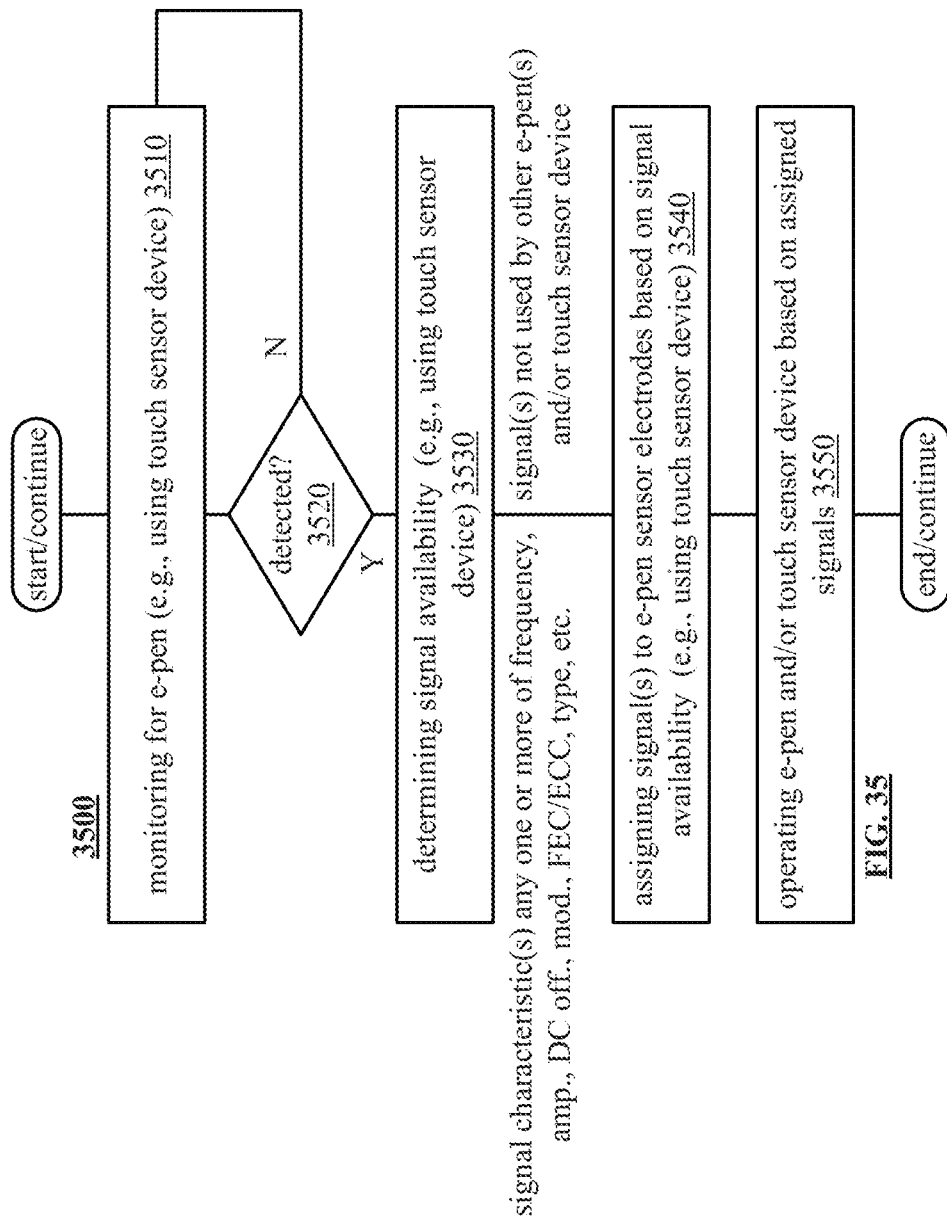

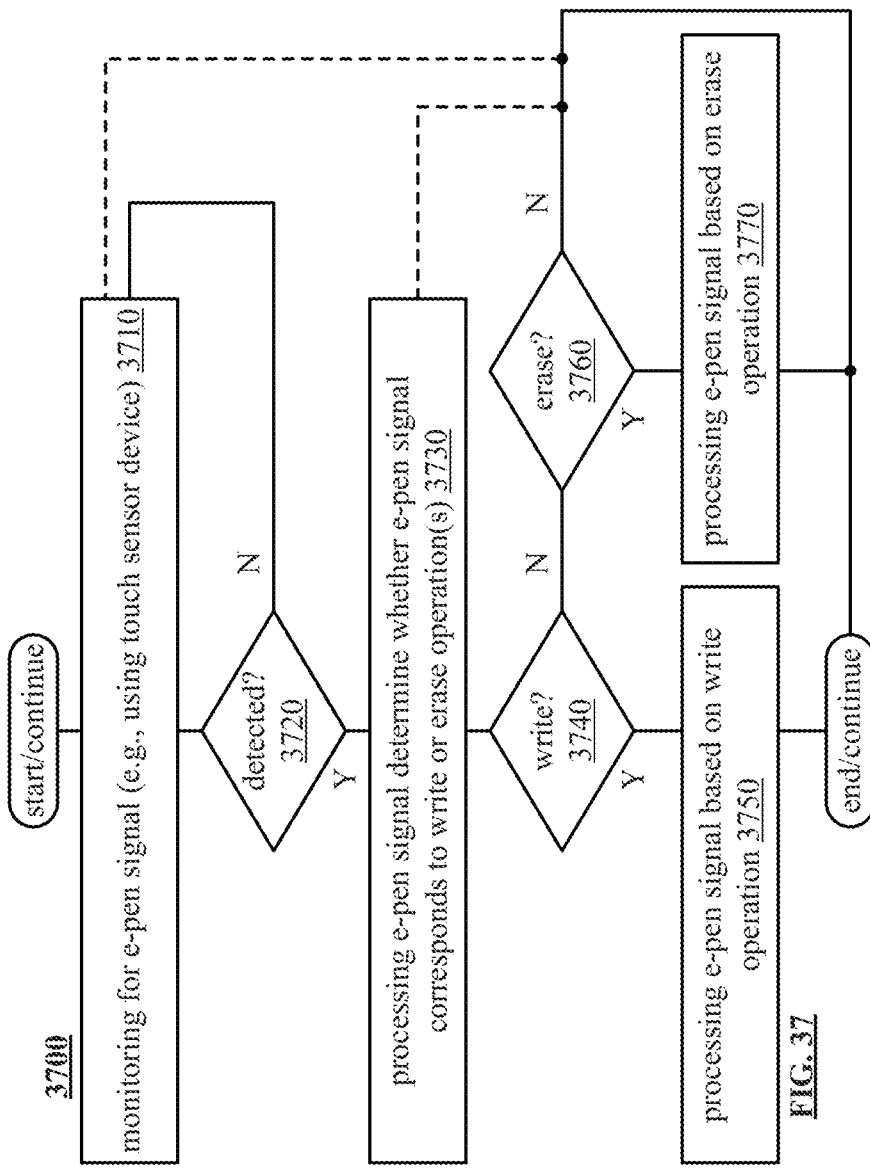

E-PEN ASSOCIATION WITHIN TOUCH SENSOR AND E-PEN SYSTEMS

CROSS REFERENCE TO RELATED PATENTS

The present U.S. Utility Patent Applications claims priority pursuant to 35 U.S.C. § 120 as a continuation of U.S. Utility application Ser. No. 17/552,668, entitled "Frequency diverse e-pen for touch sensor and e-pen systems," filed Dec. 16, 2021, pending, which claims priority pursuant to 35 U.S.C. § 120 as a continuation of U.S. Utility application Ser. No. 17/083,998, entitled "Frequency diverse e-pen for touch sensor and e-pen systems," filed Oct. 29, 2020, now issued as U.S. Pat. No. 11,237,653 on Feb. 1, 2022, which claims priority pursuant to 35 U.S.C. § 120 as a continuation of U.S. Utility application Ser. No. 16/195,041, entitled "Frequency diverse e-pen for touch sensor and e-pen systems," filed Nov. 19, 2018, now issued as U.S. Pat. No. 10,852,857 on Dec. 1, 2020, all of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 6 is a schematic block diagram of a drive center circuit in accordance with the present invention;

FIG. 6A is a schematic block diagram of another embodiment of a drive sense circuit in accordance with the present invention;

FIG. 7 is an example of a power signal graph in accordance with the present invention;

FIG. 8 is an example of a sensor graph in accordance with the present invention;

FIG. 9 is a schematic block diagram of another example of a power signal graph in accordance with the present invention;

FIG. 10 is a schematic block diagram of another example of a power signal graph in accordance with the present invention;

FIG. 11 is a schematic block diagram of another example of a power signal graph in accordance with the present invention;

FIG. 11A is a schematic block diagram of another example of a power signal graph in accordance with the present invention;

FIG. 19 is a schematic block diagram of embodiments of different sensor electrode arrangements within e-pens in accordance with the present invention;

FIG. 27 is a schematic block diagram of an embodiment 2700 of directional mapping determination (e.g., North, South, East, and West (NSEW)) and orientation determination of an e-pen in accordance with the present invention;

FIG. 30 is a schematic block diagram of another embodiment of a method for execution by one or more devices in accordance with the present invention;

FIG. 33A is a schematic block diagram of an embodiment of forward error correction (FEC)/error checking and correction (ECC) assignment to signals associated with e-pen sensor electrodes in accordance with the present invention;

FIG. 33B is a schematic block diagram of another embodiment of FEC/ECC assignment to signals associated with e-pen sensor electrodes in accordance with the present invention;

FIG. 34A is a schematic block diagram of an embodiment of different types of modulations or modulation coding sets (MCSs) used for modulation of different bit or symbol streams;

FIG. 34B is a schematic block diagram of an embodiment of different labeling of constellation points in a constellation;

FIG. 34C is a schematic block diagram of an embodiment of different arrangements of constellation points in a type of constellation;

FIG. 34D is a schematic block diagram of an embodiment of adaptive symbol mapping/modulation for different transmission streams;

FIG. 34E is a schematic block diagram of an embodiment of adaptive symbol mapping/modulation for different transmission streams;

FIG. 35 is a schematic block diagram of another embodiment of a method for execution by one or more devices in accordance with the present invention;

FIG. 37 is a schematic block diagram of another embodiment of a method for execution by one or more devices in accordance with the present invention.

DETAILED DESCRIPTION OF THE INVENTION

Figure 1:
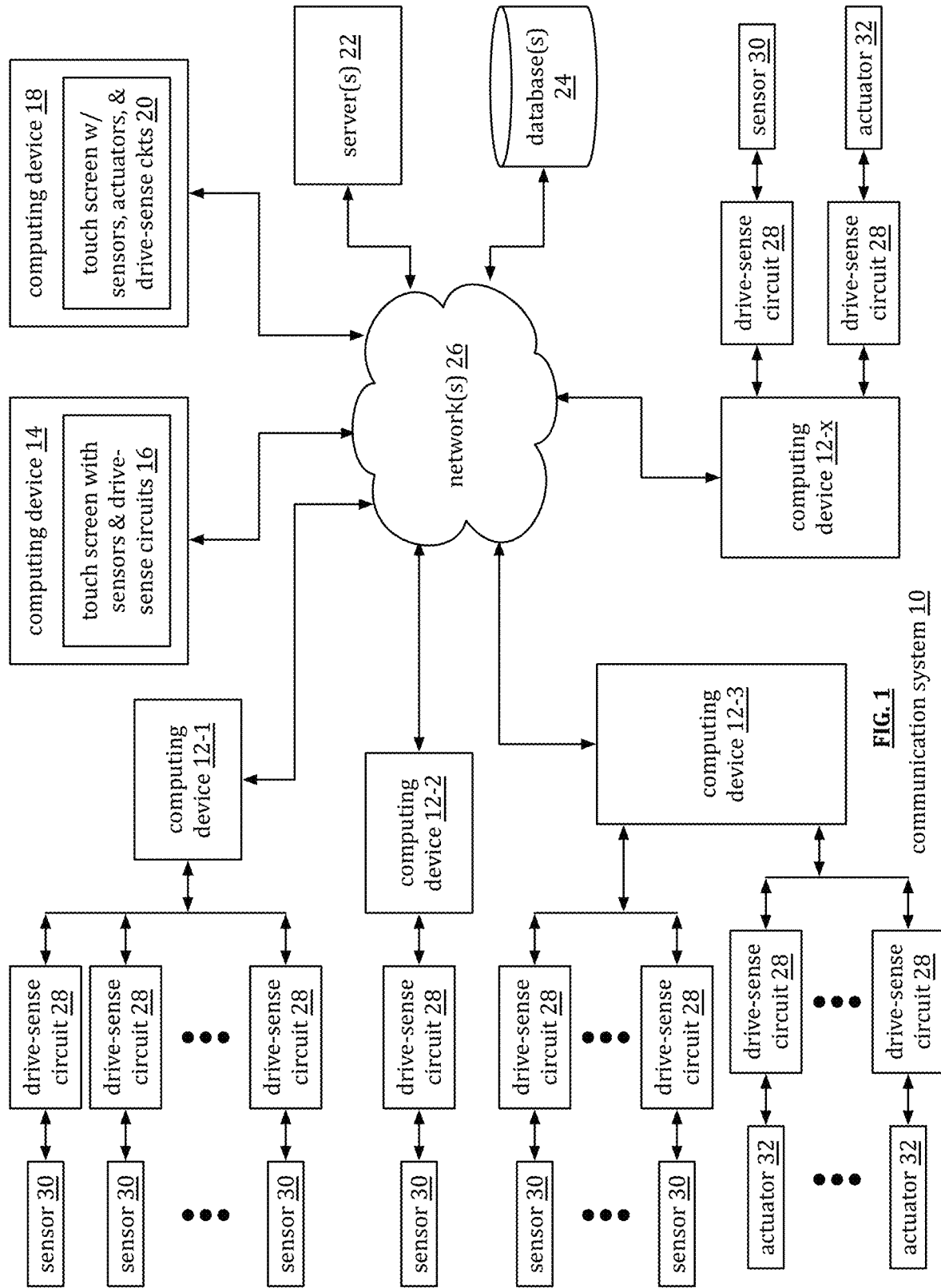
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-$x$ is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-$x$. For example, the sensor 30 may be a piezoelectric microphone and the actuator 32 may be a piezoelectric speaker.

Figure 2:
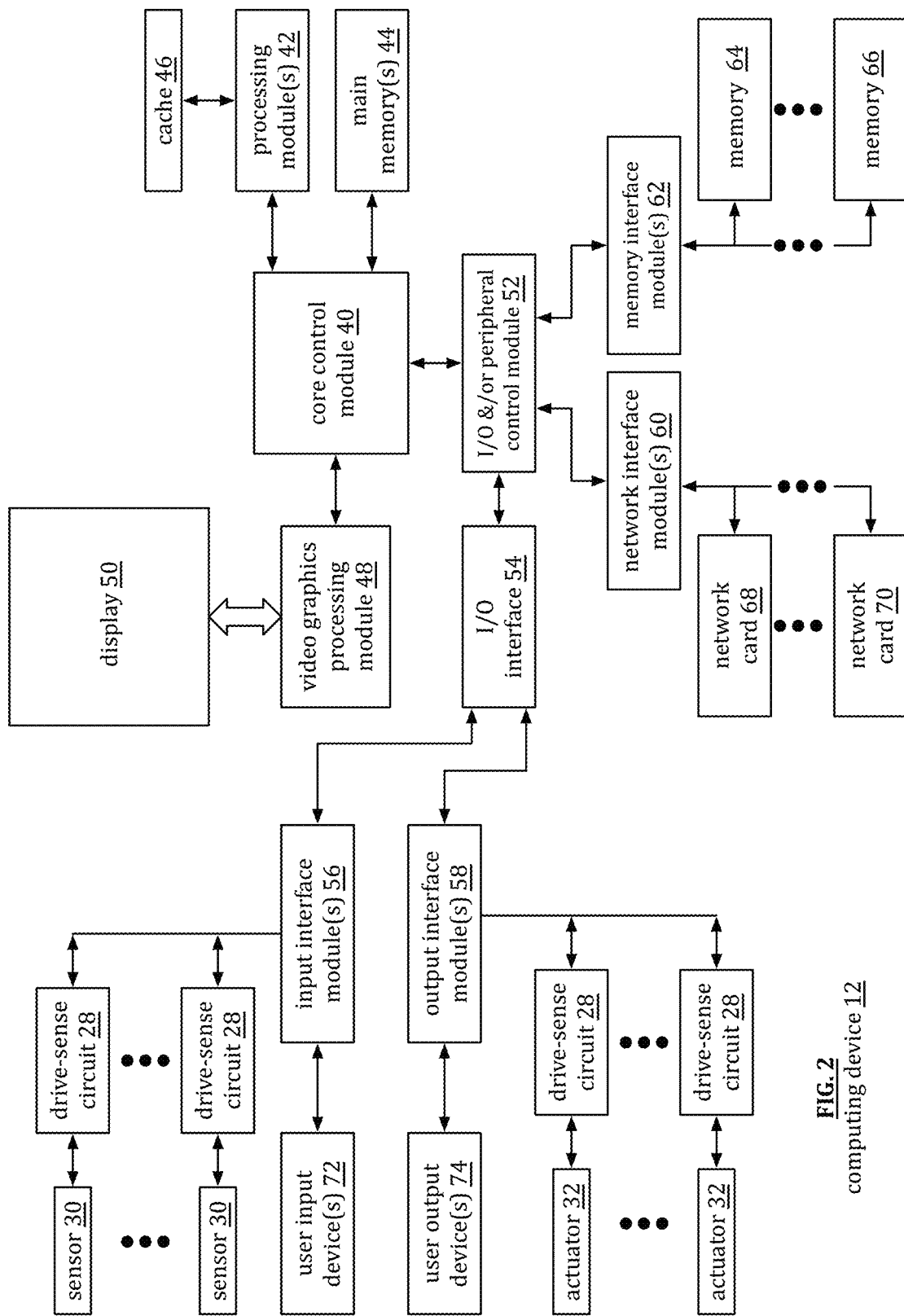
FIG. 2 is a schematic block diagram of an embodiment of a computing device in accordance with the present invention.

FIG. 2 is a schematic block diagram of an embodiment of a computing device 12 (e.g., any one of 12-1 through 12-$x$). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
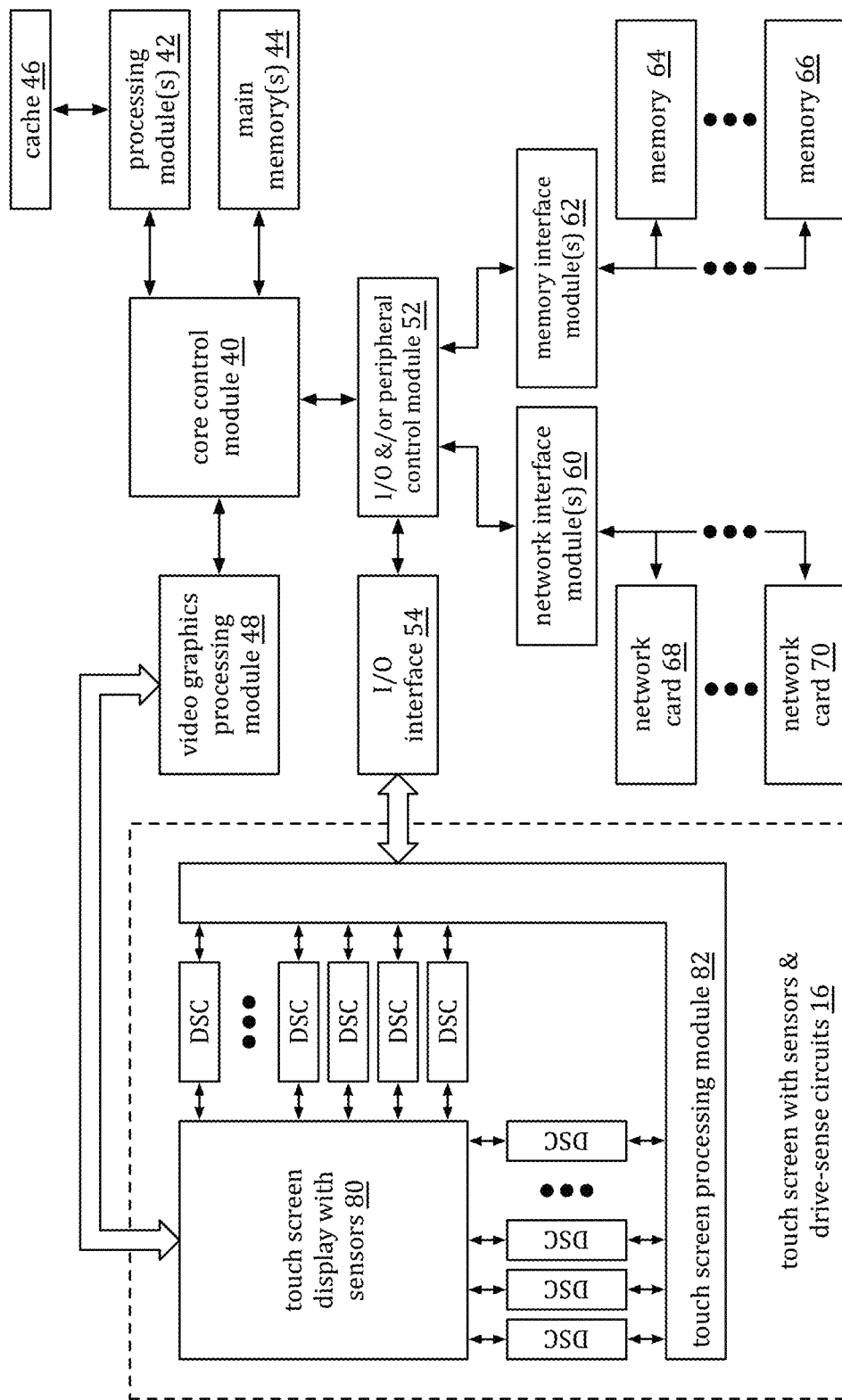
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touch screen 16, an Input-Output (I/O) peripheral control module 52, one or more input interface modules 56, one or more output interface modules 58, one or more network interface modules 60, and one or more memory interface modules 62. The touch screen 16 includes a touch screen display 80, a plurality of sensors 30, a plurality of drive-sense circuits (DSC), and a touch screen processing module 82.

Computing device 14 operates similarly to computing device 12 of FIG. 2 with the addition of a touch screen as an input device. The touch screen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
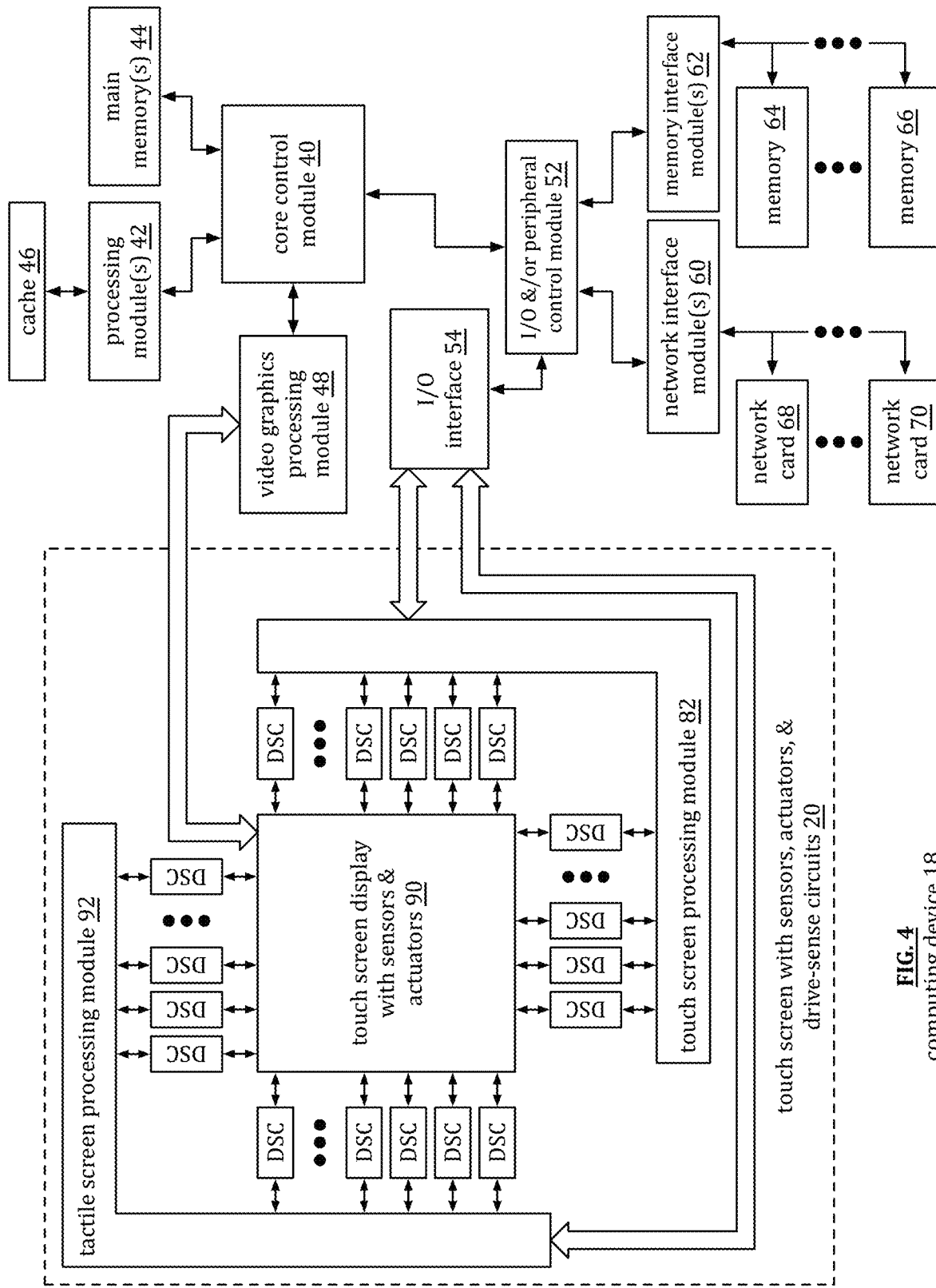
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5A:
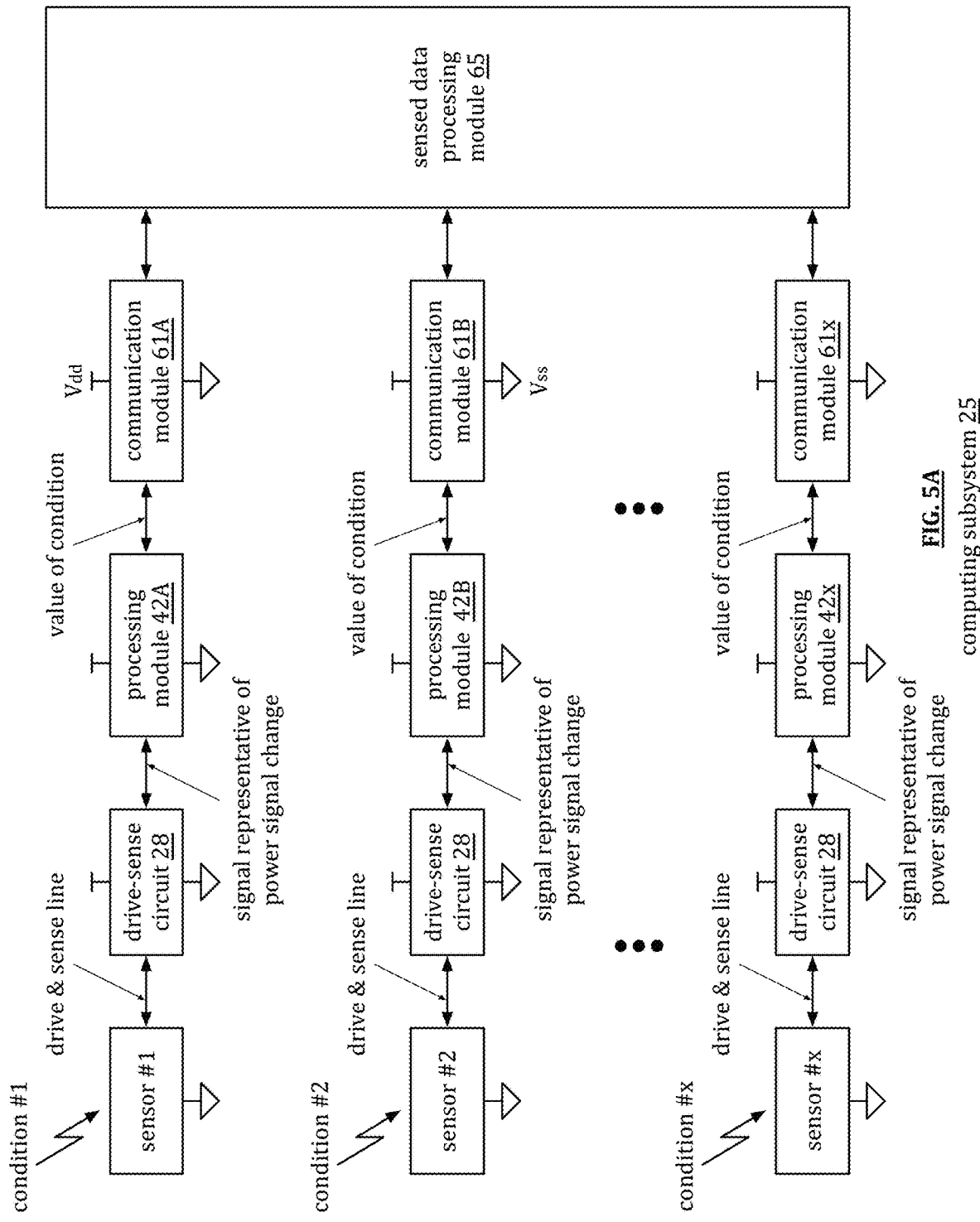
FIG. 5A is a schematic plot diagram of a computing subsystem in accordance with the present invention.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

Figure 5B:
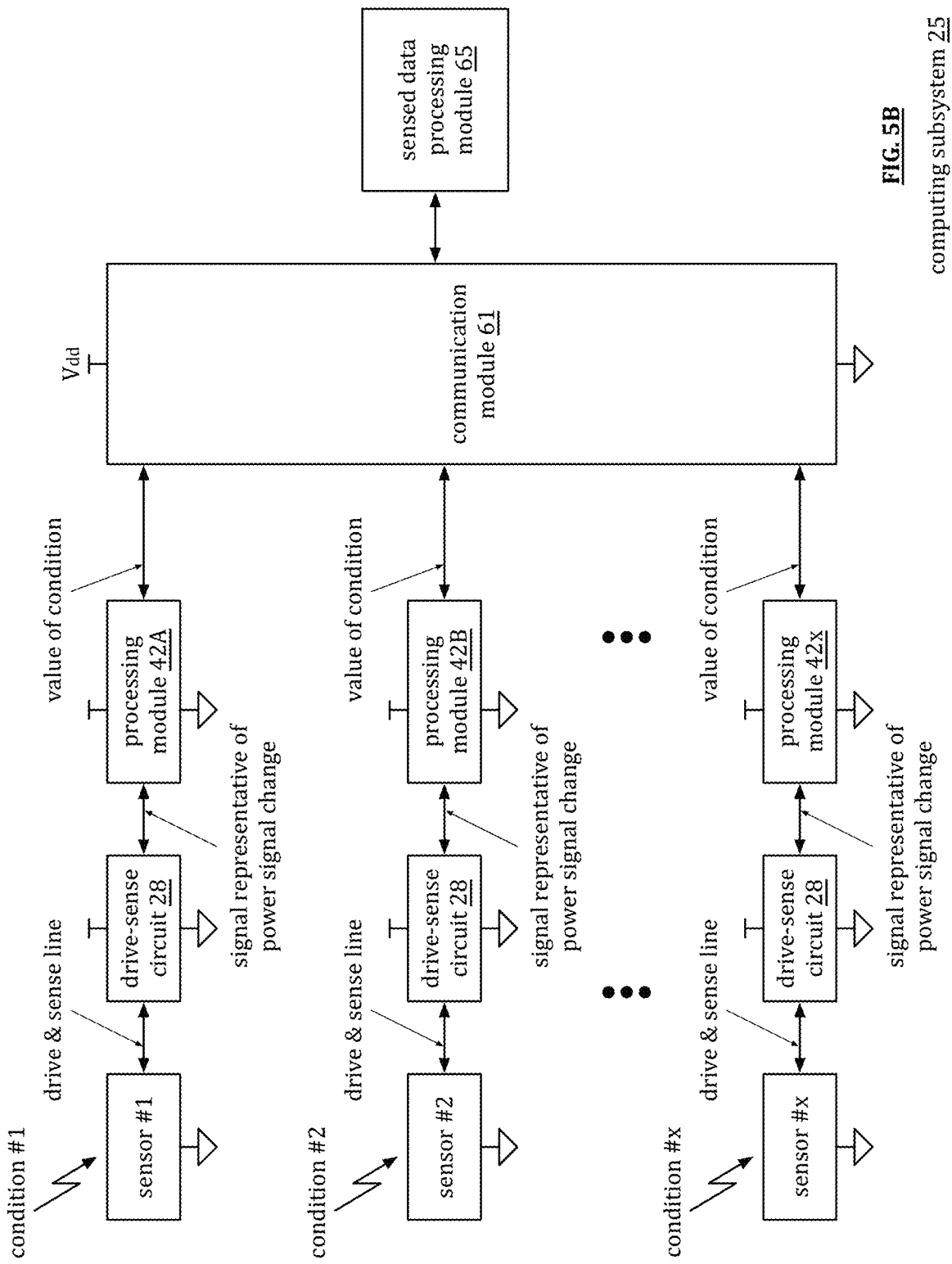
FIG. 5B is a schematic block diagram of another embodiment of a computing subsystem in accordance with the present invention.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

Figure 5C:
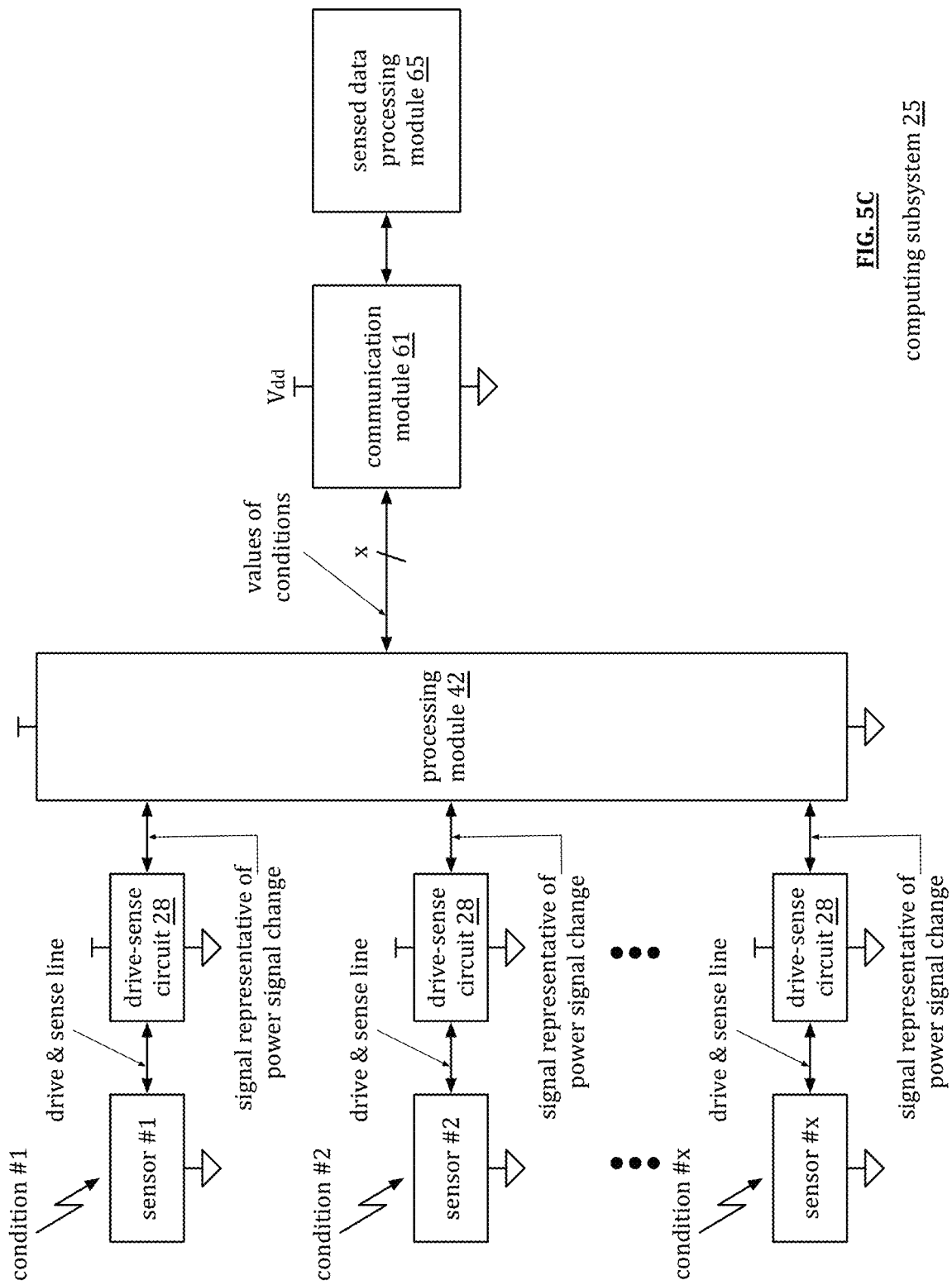
FIG. 5C is a schematic block diagram of another embodiment of a computing subsystem in accordance with the present invention.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

Figure 5D:
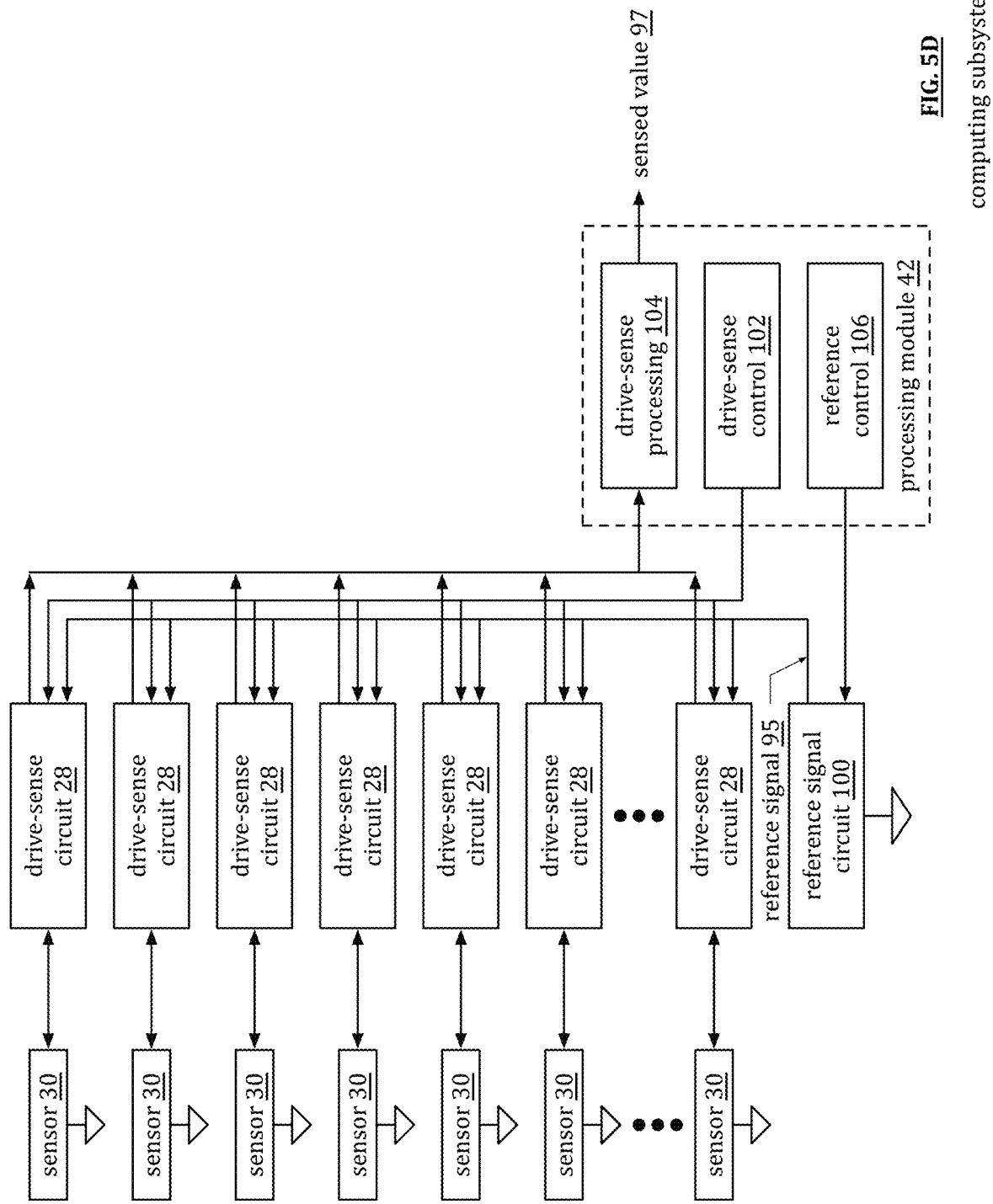
FIG. 5D is a schematic block diagram of another embodiment of a computing subsystem in accordance with the present invention.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
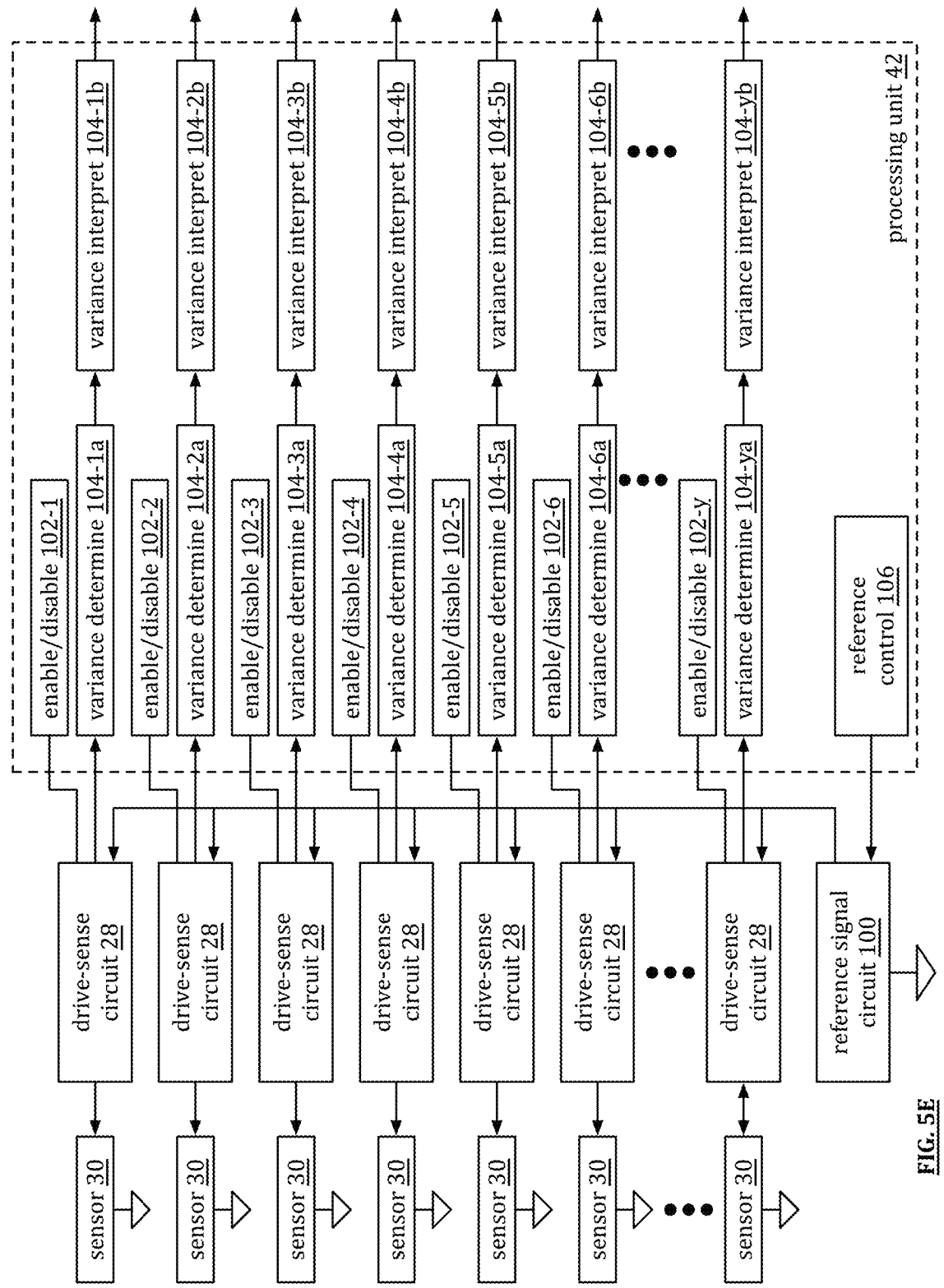
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256) =25+33.6=58.6 degrees Celsius.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-a1 coupled to a sensor 30. The drive sense-sense circuit 28-a1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

Figure 12:
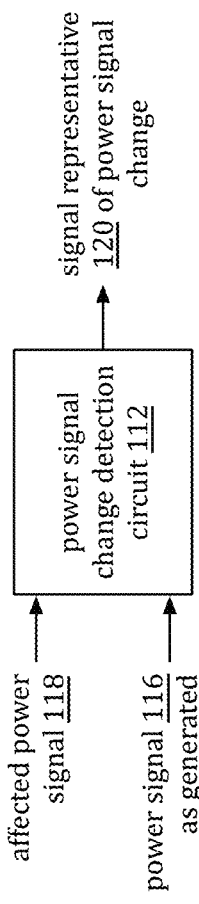
FIG. 12 is a schematic block diagram of an embodiment of a power signal change detection circuit in accordance with the present invention.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
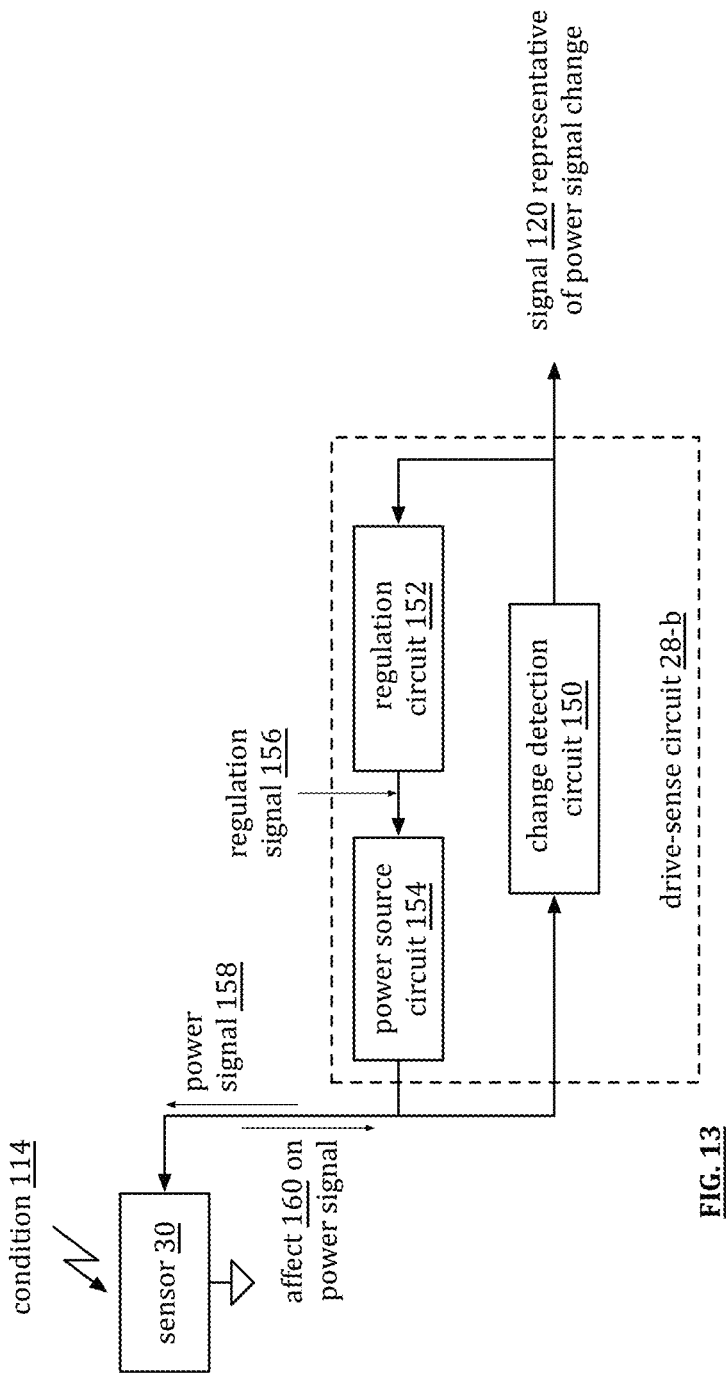
FIG. 13 is a schematic block diagram of another embodiment of a drive-sense circuit in accordance with the present invention.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits are described in U.S. Utility patent application Ser. No. 16/113,379, entitled "DRIVE SENSE CIRCUIT WITH DRIVE-SENSE LINE,", filed Aug. 27, 2018, pending. Any instantiation of a drive-sense circuit as described herein may be implemented using any of the various implementations of various drive-sense circuits described in U.S. Utility patent application Ser. No. 16/113, 379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing module (e.g., one or more controllers) such that the one or more DSC is/are directed by the one or more processing modules regarding which frequency or frequencies and/or which other one or more characteristics of the one or more signals to use at one or more respective times and/or in one or more particular situations.

Figure 14:
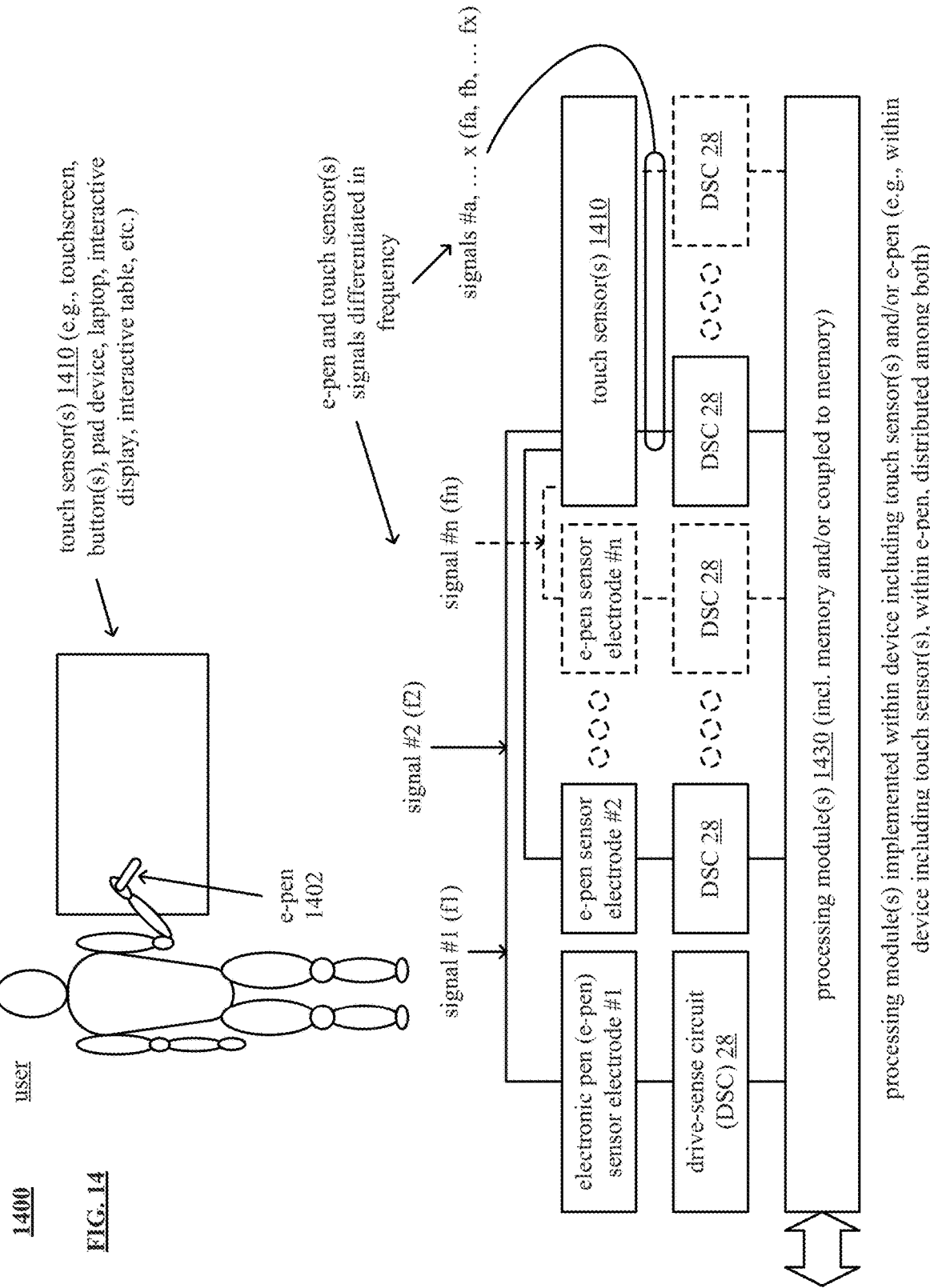
FIG. 14 is a schematic block diagram of an embodiment of a computing device operative with an e-pen (an electronic or electrical pen with electrical and/or electronic functionality) in accordance with the present invention.

FIG. 14 is a schematic block diagram of an embodiment 1400 of a computing device operative with an e-pen (an electronic or electrical pen with electrical and/or electronic functionality) in accordance with the present invention. Within this diagram as well as any other diagram described herein, or their equivalents, the one or more touch sensors 1410 (e.g., touch sensor electrodes) may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. Note that the one or more touch sensors 1410 may be implemented within any of a variety of devices including any one or more of touchscreen, pad device, laptop, cell phone, smartphone, whiteboard, interactive display, navigation system display, in vehicle display, etc., and/or any other device in which one or more touch sensors 1410 may be implemented.

Note that such interaction of a user with a touch sensor may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor). With respect to the various embodiments, implementations, etc. of various respective touch sensors as described herein, note that they may also be of any such variety of one or more types. For example, touch sensors may be implemented or include any one or more of touch sensor electrodes, capacitive buttons, capacitive sensors, row and column implementations of touch sensor electrodes such as in a touchscreen, etc.

One example of such user interaction with the one or more touch sensors 1410 is via capacitive coupling to a touch sensor. Such capacitive coupling may be achieved from a user, via a stylus, an active element such as an electronic pen (e-pen), and/or any other element implemented to perform capacitive coupling to the touch sensor. In some examples, note that the one or more touch sensors 1410 are also implemented to detect user interaction based on user touch (e.g., via capacitive coupling (CC) from a user, such as a user's finger, to the one or more touch sensors 1410).

At the top of the diagram, a user interacts with one or more touch sensors 1410 using one or more electronic pens (e-pens). An e-pen 1402 is configured to transmit one or more signals that is/are detected by the one or more touch sensors 1410. When different respective signals are transmitted from the different respective sensor electrodes of an e-pen, the one or more touch sensors 1410 is implemented to detect the signals and distinguish among them. For example, the one or more touch sensors 1410 is configured to detect, process, and identify the different respective signals provided from the different respective sensor electrodes of the e-pen 1402.

At the bottom of the diagram, one or more processing modules 1430 is coupled to drive-sense circuits (DSCs) 28. Note that the one or more processing modules 1430 may include integrated memory and/or be coupled to other memory. At least some of the memory stores operational instructions to be executed by the one or more processing modules 1430. In some examples, the one or more processing modules 1430 includes a first subset of the one or more processing modules 1430 that are in communication and operative with a first subset of the DSCs 28 (e.g., those in communication with the e-pen sensor electrodes) and a second subset of the one or more processing modules 1430 that are in communication and operative with a second subset of the DSCs 28 (e.g., those in communication with the one or more touch sensors 1410).

In some examples, these two different subsets of the one or more processing modules 1430 are also in communication with one another (e.g., via communication effectuated via the e-pen sensor electrodes and the one or more touch sensors 1410 themselves, via one or more alternative communication means such as a backplane, a bus, a wireless communication path, etc., and/or other means). In some particular examples, these two different subsets of the one or more processing modules 1430 are not in communication with one another directly other than via the signal coupling between the e-pen sensor electrodes and the one or more touch sensors 1410 themselves.

In addition, in certain examples, note that the detection and sensing capability of a DSC as described herein is such that detection of signals being coupled from the e-pen sensor electrodes to the one or more touch sensors 1410, and vice versa, may be effectuated without the e-pen 1402 (e.g., a writing and/or erasing tip of the e-pen 1402) being in contact with a touchscreen associated with the one or more touch sensors 1410. For example, as the e-pen 1402 is above (e.g., hovering over) or within sufficient proximity for signal coupling between the e-pen sensor electrodes to the one or more touch sensors 1410, and vice versa, then detection and sensing of such signals may be made.

A first group of one or more DSCs 28 is/are implemented simultaneously to drive and to sense respective one or more signals provided to the one or more touch sensors 1410. In addition, a second group of one or more DSCs 28 is/are implemented simultaneously to drive and to sense respective one or more other signals provided to the respective sensor electrodes of the e-pen 1402.

For example, a first DSC 28 is implemented simultaneously to drive and to sense a first signal via a first sensor electrode (e.g., a primary sensor electrode) of the e-pen 1402. A second DSC 28 is implemented simultaneously to drive and to sense a second signal via a second sensor electrode (e.g., a first secondary sensor electrode) of the e-pen 1402. Note that any number of additional DSCs implemented simultaneously to drive and to sense additional signals to additional sensor electrodes of the e-pen 1402 as may be appropriate in certain embodiments. Note also that the respective DSCs 28 may be implemented in a variety of ways. For example, they may be implemented within a device that includes the one or more touch sensors 1410, they may be implemented within the e-pen 1402, they may be distributed among the device that includes the one or more touch sensors 1410 and the e-pen 1402, etc.

In an example of operation and implementation, the one or more processing modules 1430 is configured to generate a first signal. A first DSC 28 is configured simultaneously to drive and to sense the first signal via a first sensor electrode. In some examples, the one or more processing modules 1430 is configured to generate a number of other signals such as a second signal, third signal, fourth signal, etc. In general, the one or more processing modules 1430 is configured to generate any one or more signals to be provided via one or more DSCs 28. In this example of operation and implementation, the one or more processing modules 1430 is also configured to generate a second signal. A second DSC 28 is configured simultaneously to drive and to sense the second signal via a second sensor electrode. As may be appropriate in certain embodiments, the one or more processing modules 1430 is also configured to generate additional signals up to an nth signal (e.g., where n is a positive integer greater than or equal to 3). An nth DSC 28 is configured simultaneously to drive and to sense the nth signal via a nth sensor electrode.

Note that the different respective signals provided via the different DSCs 28 are differentiated in frequency. For example, if first signal has a first frequency, and a second signal has a second frequency that is different than the first frequency. When implemented, a third signal has a third frequency that is different than the first frequency and the second frequency. In general, any number of different respective signals generated by the one or more processing modules 1430 are differentiated in frequency.

In addition, note that different respective signals having different respective frequencies are provided from the DSCs 28 that are associated with the one or more touch sensors 1410 (e.g., on the lower right-hand portion of the diagram). Each of those respective DSCs 28 is also configured simultaneously to drive and to sense its respective signal.

Note that the signals that are provided via the different respective sensor electrodes are coupled into one or more of the touch sensors 1410 when the e-pen 1402 is interacting with the device that includes the one or more touch sensors 1410. For example, when the e-pen 1402 is within sufficient proximity to the one or more touch sensors 1410 and such that the respective DSCs 28 that are associated with the one or more touch sensors 1410 and that are configured simultaneously to drive and to sense their respective signals detect one or more of the signals that are provided via the different respective sensor electrodes are coupled into one or more of the touch sensors 1410, then the signals that are provided from the different respective sensor electrodes of the e-pen 1402 will be coupled into and detected by the DSCs 28 that are associated with the one or more touch sensors 1410. The one or more processing modules 1430 is configured to process signals provided from the various DSCs 28 to determine various information regarding the e-pen 1402. Such information includes the location of the e-pen 1402 with respect to the one or more touch sensors 1410, the orientation of the e-pen 1402 with respect to the one or more touch sensors 1410, which one or more signals coupled from the one or more sensor electrodes of the e-pen 1402 are being coupled into the one or more touch sensors 1410, etc.

In some examples, note that the converse operation is also performed. Those signals that are driven and simultaneously sensed by the DSCs 28 via the one or more touch sensors 1410 may also be detected, process, and identified by the DSCs 28 that simultaneously drive and sense their respective signals via the e-pen sensor electrodes 1-*n*. For example, a signal that is driven by a DSC 28 via one of the touch sensors 1510 may also be coupled into and detected by one or more of the DSCs 28 that simultaneously drive and sense their respective signals via the e-pen sensor electrodes 1-*n*.

The coupling of signals between the various e-pen sensor electrodes and the one or more touch sensors 1410 is performed bidirectionally in some implementations. Note that detection, processing, identification, etc. may be performed by the one or more processing modules 1430 based only on signals associated with the DSCs 28 that are coupled to the e-pen sensor electrodes, based only on signals associated with the DSCs 28 that are coupled to the one or more touch sensors 1410, and/or based on both signals associated with the DSCs 28 that are coupled to the e-pen sensor electrodes and also to the one or more touch sensors 1410.

In addition, note that certain examples, embodiments, etc. are implemented such that a DSC is operative to perform both drive and sense of a signal (e.g., transmit and detect) simultaneously. However, as may be desired in certain applications, a DSC may be implemented only to perform drive (e.g., transmit) of a signal. In an example of operation and implementation, no generation of a digital signal that is representative of an electrical characteristic of an element (e.g., sensor electrode, sensor, transducer, etc.) is made.

In certain examples that include more than one DSC, a first DSC is implemented to perform both drive and sense of a first signal (e.g., transmit and detect) simultaneously, and a second DSC is implemented to perform only drive (e.g., transmit) of a second signal. Any desired combination of DSCs may be implemented such that one or more DSCs are configured to perform both drive and sense of signals (e.g., transmit and detect) simultaneously as one or more other DSCs are configured to perform only drive (e.g., transmit) of other signals.

With respect to any signal that is driven and simultaneously detected by a DSC 28, note that any additional signal that is coupled into the sensor electrode or touch sensor associated with that DSC 28 is also detectable. For example, a DSC 28 that is associated with a touch sensor will detect any signal from one or more of the e-pen sensor electrodes that gets coupled into that touch sensor. Similarly, a DSC 28 that is associated with an e-pen sensor electrode will detect any signal from one or more of the touch sensors 1410 that gets coupled into that e-pen sensor electrode.

Note that the different respective signals that are driven and simultaneously sensed via the respective e-pen sensor electrodes on the one or more sensors 1410 are differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

In an example of operation and implementation, the e-pen 1402 includes a plurality of e-pen sensor electrodes including a first e-pen sensor electrode and a second e-pen sensor electrode and a plurality of drive-sense circuits (DSCs), including a first DSC and a second DSC, operably coupled to the plurality of e-pen sensor electrodes. The first DSC, when enabled, is configured to drive a first e-pen signal having a first frequency via a first single line coupling to the first e-pen sensor electrode and simultaneously sense, via the first single line, the first e-pen signal, wherein based on interaction of the e-pen with a touch sensor device, the first e-pen signal is coupled into at least one touch sensor electrode of the touch sensor device. Also, the first DSC, when enabled, is configured to process the first e-pen signal to generate a first digital signal that is representative of a first electrical characteristic of the first e-pen sensor electrode.

The second DSC, when enabled, is configured to drive a second e-pen signal having a second frequency that is different than the first frequency via a second single line coupling to the second e-pen sensor electrode and simultaneously sense, via the second single line, the second e-pen signal, wherein based on the interaction of the e-pen with the touch sensor device, the second e-pen signal is coupled into the at least one touch sensor electrode. Also, the second DSC, when enabled, is configured to process the second e-pen signal to generate a second digital signal that is representative of a second electrical characteristic of the second e-pen sensor electrode.

In some examples, the e-pen 1402 also includes memory that stores operational instructions, and a processing module operably coupled to the first DSC and the second DSC and to the memory. The processing module when enabled, is configured to execute the operational instructions to process at least one of the first digital signal or the second digital signal to detect the interaction of the e-pen with the touch sensor device.

In other examples, the touch sensor device also includes a third DSC operably coupled to a first touch sensor electrode of the at least one touch sensor electrode. The third DSC, when enabled, is configured to drive a touch sensor signal having a third frequency via a third single line coupling to the first touch sensor electrode and simultaneously sense, via the third single line, the touch sensor signal, wherein based on the interaction of the e-pen with the touch sensor device, sensing the touch sensor signal includes sensing at least one of the first e-pen signal that is coupled from the first e-pen sensor electrode into the first touch sensor electrode or the second e-pen signal that is coupled from the second e-pen sensor electrode into the first touch sensor electrode. Also, the third DSC, when enabled, is configured to process the touch sensor signal to generate a third digital signal that is representative of a third electrical characteristic of the first touch sensor electrode.

In addition, in certain examples, the touch sensor device also includes memory that stores operational instructions, and a processing module operably coupled to the third DSC and to the memory. The processing module when enabled, is configured to execute the operational instructions to process the third digital signal to determine location of at least one of the first e-pen sensor electrode or the second e-pen sensor electrode based on the interaction of the e-pen with the touch sensor device.

In yet other examples, the touch sensor device also includes another plurality of DSCs, including a third DSC and a fourth DSC, operably coupled to a plurality of touch sensor electrodes, including a first touch sensor electrode and a second touch sensor electrode, including the at least one touch sensor electrode.

The third DSC, when enabled, is configured to drive a first touch sensor signal having a third frequency via a third single line coupling to the first touch sensor electrode and simultaneously sense, via the third single line, the first touch sensor signal, wherein based on the interaction of the e-pen with the touch sensor device, sensing the first touch sensor signal includes sensing at least one of the first e-pen signal that is coupled from the first e-pen sensor electrode into the first touch sensor electrode or the second e-pen signal that is coupled from the second e-pen sensor electrode into the second touch sensor electrode. Also, the third DSC, when enabled, is configured to process the first touch sensor signal to generate a third digital signal that is representative of a third electrical characteristic of the first touch sensor electrode.

The second DSC, when enabled, configured to drive a second touch sensor signal having a fourth frequency that is different than the first frequency via a fourth single line coupling to the second touch sensor electrode and simultaneously sense, via the fourth single line, the second touch sensor signal, wherein based on the interaction of the e-pen with the touch sensor device, sensing the second touch sensor signal includes sensing at least one of the first e-pen signal that is coupled from the first e-pen sensor electrode into the first touch sensor electrode or the second e-pen signal that is coupled from the second e-pen sensor electrode into the second touch sensor electrode. Also, the fourth DSC, when enabled, is configured to process the second touch sensor signal to generate a fourth digital signal that is representative of a fourth electrical characteristic of the second touch sensor electrode.

In even other examples, the touch sensor device also includes memory that stores operational instructions, and a processing module operably coupled to the third DSC, the fourth DSC, and to the memory. The processing module when enabled, is configured to execute the operational instructions to process the third digital signal and the fourth digital signal to determine location of at least one of the first e-pen sensor electrode or the second e-pen sensor electrode based on the interaction of the e-pen with the touch sensor device and also based on a two-dimensional mapping of a touchscreen of the touch sensor device that uniquely identifies an intersection of the first touch sensor electrode and the second touch sensor electrode.

Also, in some particular examples, the first DSC also includes a power source circuit operably coupled to the first e-pen sensor electrode via the first single line. When enabled, the power source circuit is configured to provide the first e-pen signal that includes an analog signal via the first single line coupling to the first e-pen sensor electrode, and wherein the analog signal includes at least one of a DC (direct current) component or an oscillating component. Also, the first DSC includes a power source change detection circuit operably coupled to the power source circuit. When enabled, the power source change detection circuit is configured to detect an effect on the analog signal that is based on the first electrical characteristic of the first e-pen sensor electrode, and to generate the first digital signal that is representative of the first electrical characteristic of the first e-pen sensor electrode.

In certain additional examples, the power source circuit includes a power source to source at least one of a voltage or a current to the first e-pen sensor electrode via the first single line. Also, the power source change detection circuit includes a power source reference circuit configured to provide at least one of a voltage reference or a current reference, and a comparator configured to compare the at least one of the voltage and the current provided to the first e-pen sensor electrode to the at least one of the voltage reference and the current reference to produce the analog signal.

In various examples, embodiments, etc., note that one or more processing modules are in communication with one or more of DSCs, touch sensor electrodes, e-pen sensor electrodes, etc. and are configured to perform processing of the various signals associated with them for various purposes.

Figure 15:
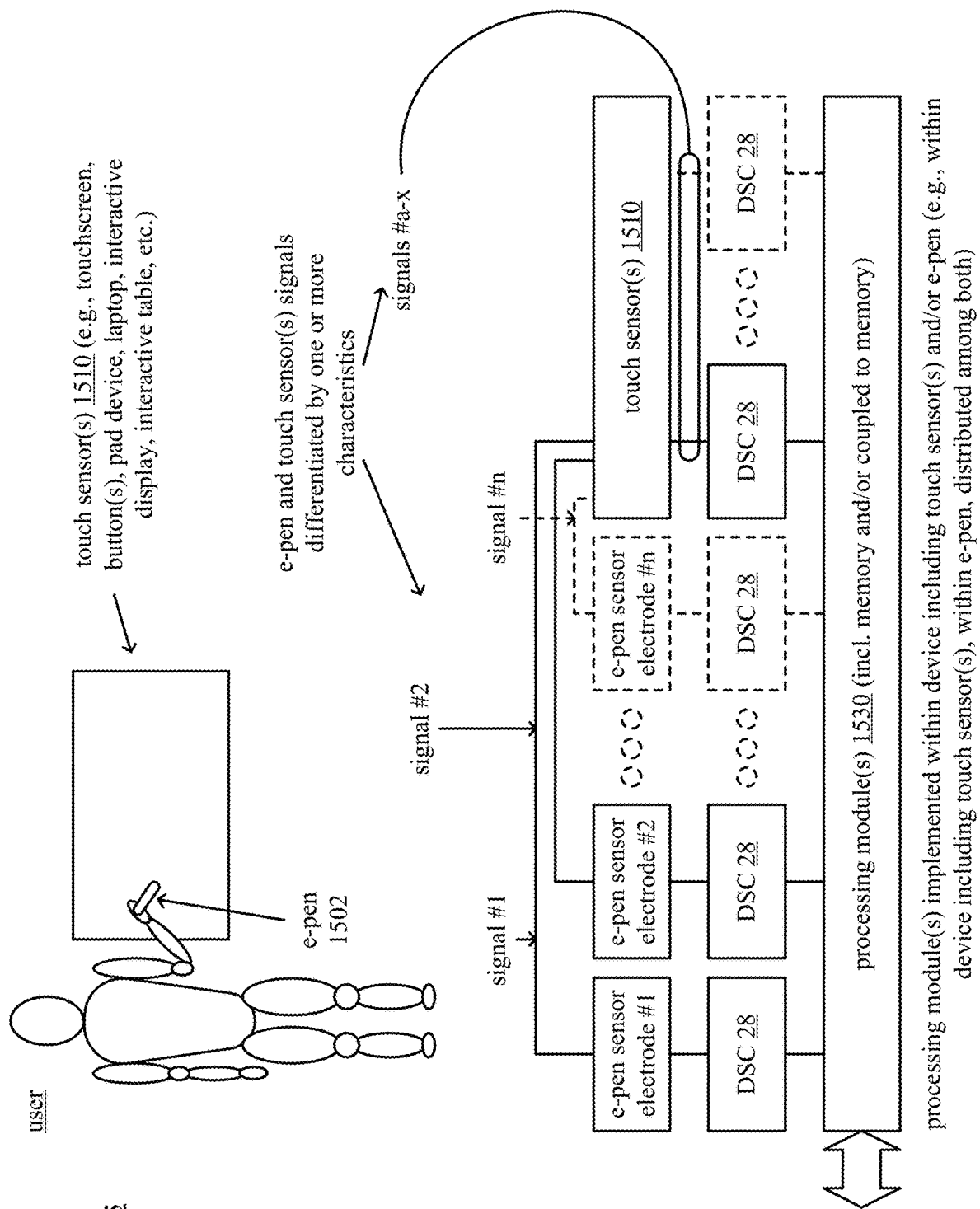
FIG. 15 is a schematic block diagram of another embodiment of a computing device operative with an e-pen in accordance with the present invention.

FIG. 15 is a schematic block diagram of another embodiment 1500 of a computing device operative with an e-pen in accordance with the present invention. This diagram has some similarities to the previous diagram with at least one difference being that the respective e-pen and touch sensor signals are differentiated by one or more characteristics that may include any one or more of frequency, amplitude, DC offset, modulation, modulation & coding set/rate (MCS), forward error correction (FEC) and/or error checking and correction (ECC), type, etc.

Within this diagram as well as any other diagram described herein, or their equivalents, the one or more touch sensors 1510 may be of any of a variety of one or more types including any one or more of a touchscreen, a button, an electrode, an external controller, rows of electrodes, columns of electrodes, a matrix of buttons, an array of buttons, a film that includes any desired implementation of components to facilitate touch sensor operation, and/or any other configuration by which interaction with the touch sensor may be performed. Note that the one or more touch sensors 1510 may be implemented within any of a variety of devices including any one or more of touchscreen, pad device, laptop, cell phone, smartphone, whiteboard, interactive display, navigation system display, in vehicle display, etc., and/or any other device in which one or more touch sensors 1510 may be implemented.

Note that such interaction of a user with a touch sensor may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor). With respect to the various embodiments, implementations, etc. of various respective touch sensors as described herein, note that they may also be of any such variety of one or more types.

One example of such user interaction with the one or more touch sensors 1510 is via capacitive coupling to a touch sensor. Such capacitive coupling may be achieved from a user, via a stylus, an active element such as an electronic pen (e-pen), and/or any other element implemented to perform capacitive coupling to the touch sensor. In some examples, note that the one or more touch sensors 1510 are also implemented to detect user interaction based on user touch (e.g., via capacitive coupling (CC) from a user, such as a user's finger, to the one or more touch sensors 1510).

At the top of the diagram, a user interacts with one or more touch sensors 1510 using one or more electronic pens (e-pens). An e-pen 1502 is configured to transmit one or more signals that is/are detected by the one or more touch sensors 1510. When different respective signals are transmitted from the different respective sensor electrodes of an e-pen 1502, the one or more touch sensors 1510 is implemented to detect the signals and distinguish among them. For example, the one or more touch sensors 1510 is configured to detect, process, and identify the different respective signals provided from the different respective sensor electrodes of the e-pen 1502.

At the bottom of the diagram, one or more processing modules 1530 is coupled to drive-sense circuits (DSCs) 28. Note that the one or more processing modules 1530 may include integrated memory and/or be coupled to other memory. At least some of the memory stores operational instructions to be executed by the one or more processing modules 1530.

Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

By appropriate processing by the one or more processing modules 1530, the one or more processing modules 1530 is configured, based on, to detect, process, and identify, which signal is being detected based on these one or more characteristics.

Differentiation between the signals based on frequency corresponds to a first signal has a first frequency and a second signal has a second frequency different than the first frequency. Differentiation between the signals based on amplitude corresponds to a that if first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC). Alternatively, differentiation between the different respective signals may be made based on using different types of FEC/ECC for the different respective signals. In an example, signal #1 includes a first frequency, a first amplitude, a first DC offset, a first modulation, a first FEC/ECC, a first type (e.g., f1, amp. 1, DC off. 1, mod. 1, FEC/ECC 1, type, etc.), and signal #2 includes a second frequency, a second amplitude, a second DC offset, a second modulation, a second FEC/ECC, a second type (e.g., f2, amp. 2, DC off. 2, mod. 2, FEC/ECC 2, type, etc.), and so on. Similarly, when additional signals are implemented, signal #n includes a second frequency, a second amplitude, a second DC offset, a second modulation, a second FEC/ECC, a second type (e.g., fn, amp. n, DC off n, mod. n, FEC/ECC n, type, etc.). Generally speaking, the e-pen and touch sensor(s) signals differentiated by one or more characteristics (e.g., frequency, amplitude, DC offset, modulation, FEC/ECC, type, etc.). Also, signals #a-x include differentiated parameters (e.g., fa, amp. a, DC off. a, mod. a, FEC/ECC a, type, etc., . . . fx, amp. x, DC off. x, mod. x, FEC/ECC x, type, etc.).

Differentiation between the signals based on type corresponds to a first signal being or a first type and a second signal being of a second generated, coded, and/or based on a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents.

In an example of operation and implementation, the one or more processing modules 1530 is configured to generate a first signal. A first DSC 28 is configured simultaneously to drive and to sense the first signal via a first sensor electrode. In some examples, the one or more processing modules 1530 is configured to generate a number of other signals such as a second signal, third signal, fourth signal, etc. In general, the one or more processing modules 1530 is configured to generate any one or more signals to be provided via one or more DSCs 28. In this example of operation and implementation, the one or more processing modules 1530 is also configured to generate a second signal. A second DSC 28 is configured simultaneously to drive and to sense the second signal via a second sensor electrode. As may be appropriate in certain embodiments, the one or more processing modules 1530 is also configured to generate additional signals up to an nth signal (e.g., where n is a positive integer greater than or equal to 3). An nth DSC 28 is configured simultaneously to drive and to sense the nth signal via a nth sensor electrode.

Note that the different respective signals provided via the different DSCs 28 are differentiated in frequency. For example, if first signal has a first frequency, and a second signal has a second frequency that is different than the first frequency. When implemented, a third signal has a third frequency that is different than the first frequency and the second frequency. In general, any number of different respective signals generated by the one or more processing modules 1530 are differentiated in based on one or more characteristics.

Note that there may be certain implementations where differentiation between the signals driven and simultaneously sensed via the e-pen sensor electrodes in the one or more touch sensors 1510 may be limited by design. For example, there may be certain implementations where differentiation is desired based on only one characteristic. Other limitations may operate based on differentiation based on two or more characteristics (and generally up to n characteristics, where n is a positive integer greater than or equal to 2). Note that there may be some processing latency introduced in some examples when differentiation between the respective signals is based on multiple different parameters. For example, when identifying a particular signal, processing may be performed across a variety of characteristics to ensure proper detection of the signal when there is differentiation between the respective signals in multiple dimensions.

In addition, note that adaptation between the different respective characteristics may be made. For example, at or during a first time, differentiation may be made based on a first one of the characteristics (e.g., frequency). Then, at or during a second time, differentiation may be based on a second one of the characteristics (e.g., DC offset). Then, at or during a third time, differentiation may be based on a third one of the characteristics (e.g., modulation/MCS), and so on.

Various aspects, embodiments, and/or examples of the invention (and/or their equivalents) provide for individualization and uniqueness with respect to the different respective signals that are driven and simultaneously sensed via the respective DSCs 28. Appropriate detection, processing, and identification based on these one or more characteristics allows for differentiation and identification of the different respective signals as well as the e-pen sensor electrodes and the one or more touch sensors 1510 via which those signals are driven and simultaneously sensed.

For example, consider an implementation in which a mapping of which signals provided via which DSC 28 is known, then detection of a particular signal also allows for identification of which DSC 28 provided that signal. Also, when a mapping of which DSC 28 is connected to which e-pen sensor electrode or which of the one or more touch sensors 1510 is known, then detection of a particular signal also allows for identification of that particular e-pen sensor electrode or a particular touch sensor of the one or more touch sensors 1510.

Note that the transmission, reception, detection, driving, and sensing, of signals by one or more of the various DSCs 28 allows for detection in both directions between the e-pen sensor electrodes and the one or more touch sensors 1510. Various aspects, embodiments, and/or examples of the invention (and/or their equivalents) are provided herein by which such detection, processing, identification, etc. is performed by one or more processing modules associated with an e-pen, associated with one or more touch sensors (e.g., a device that includes the one or more touch sensors), or cooperatively associated with both the e-pen and the one or more touch sensors (e.g., a device that includes the one or more touch sensors).

Figure 16:
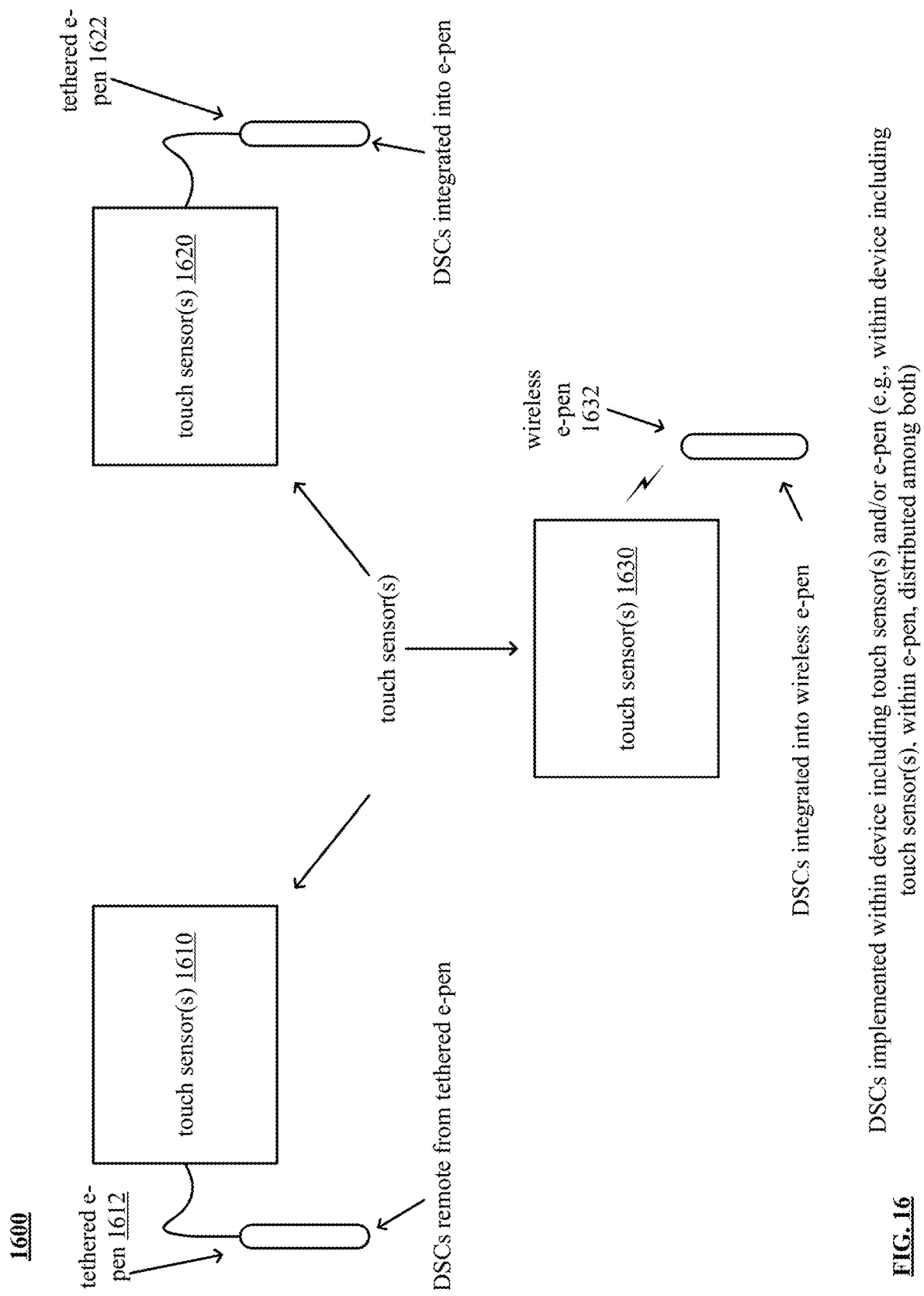
FIG. 16 is a schematic block diagram of embodiments of computing devices operative with different types of e-pens in accordance with the present invention.

FIG. 16 is a schematic block diagram of embodiments 1600 of computing devices operative with different types of e-pens in accordance with the present invention. Different respective groups of one or more touch sensors 1610, 1620, and 1630 are shown. Note that the respective groups of one or more touch sensors 1610, 1620, and 1630 may be included within any of a number of devices as described herein including any one or more of touchscreen, pad device, laptop, cell phone, smartphone, whiteboard, interactive display, navigation system display, in vehicle display, etc., and/or any other device in which one or more touch sensors 1610, 1620, and 1630 may be implemented. For example, the touch sensor(s) may be implemented in a variety of devices including touchscreen, button(s), pad device, laptop, interactive display, interactive table, etc.

In the upper left-hand portion of the diagram, a tethered e-pen 1612 is electrically connected to the one or more touch sensors 1610. In this example, note that the DSCs are implemented remotely from the tethered e-pen 1612. For example, the electrodes in the tethered e-pen 1612 are coupled to remotely implemented DSCs, such as may be implemented within a device that includes the one or more touch sensors 1610. For example, the DSCs are remote from the e-pen, and the electrodes in the e-pen coupled to remotely implemented DSCs, such as in element including touch sensor(s) 1610).

In the upper right-hand portion of the diagram, a tethered e-pen 1622 is electrically connected to the one or more touch sensors 1620. In this example, note that the DSCs are implemented within or integrated into the tethered e-pen 1622. For example, the electrodes in the tethered e-pen 1622 are coupled to locally implemented DSCs within the tethered e-pen 1622. For example, the DSCs in the tethered e-pen 1622 are coupled to a power source within the tethered e-pen 1622. In some examples, the power source is a battery-powered power source within the tethered e-pen 1622. In other examples, the power source is power supply that is energized remotely from a device that includes the one or more touch sensors 1620. For example, the DSCs are integrated into the e-pen, and the DSCs in the e-pen are coupled to power source within e-pen (e.g., battery-powered, powered remotely from device).

In addition, within the respective diagram shown at the top portion of the diagram, when a tethering is implemented between a tethered e-pen and a device that includes one or more touch sensors, note that the DSCs that drive the respective electrodes within the e-pen may alternatively be implemented and distributed between the e-pen itself and the device that includes the one or more touch sensors. For example, a first DSC may be implemented within the device that includes the one or more touch sensors and drives a first signal via the tethering and via a first electrode within the tethered e-pen. A second DSC may be locally implemented within the e-pen and is configured simultaneously to drive and to sense a second signal via a second electrode within the tethered e-pen.

In the bottom portion of the diagram, a wireless e-pen 1632 is communication with the one or more touch sensors 1620. In this example, note that the DSCs are implemented within or integrated into the wireless e-pen 1632. For example, the electrodes in the wireless e-pen 1632 are coupled to locally implemented DSCs within the wireless e-pen 1632. For example, the DSCs in the wireless e-pen 1632 are coupled to a power source within the wireless e-pen 1632. In some examples, the power source is a battery-powered power source within the wireless e-pen 1632. For example, the DSCs are integrated into wireless e-pen (e.g., DSCs in e-pen coupled to power source within e-pen, e.g., battery-powered).

This diagram shows various examples by which DSCs may be implemented within a device that includes one or more touch sensors, implemented within an e-pen that may be of different types including a tethered e-pen, a wireless e-pen, etc., or alternatively be distributed among both the device that includes the one or more touch sensors and the e-pen.

Figure 17A:
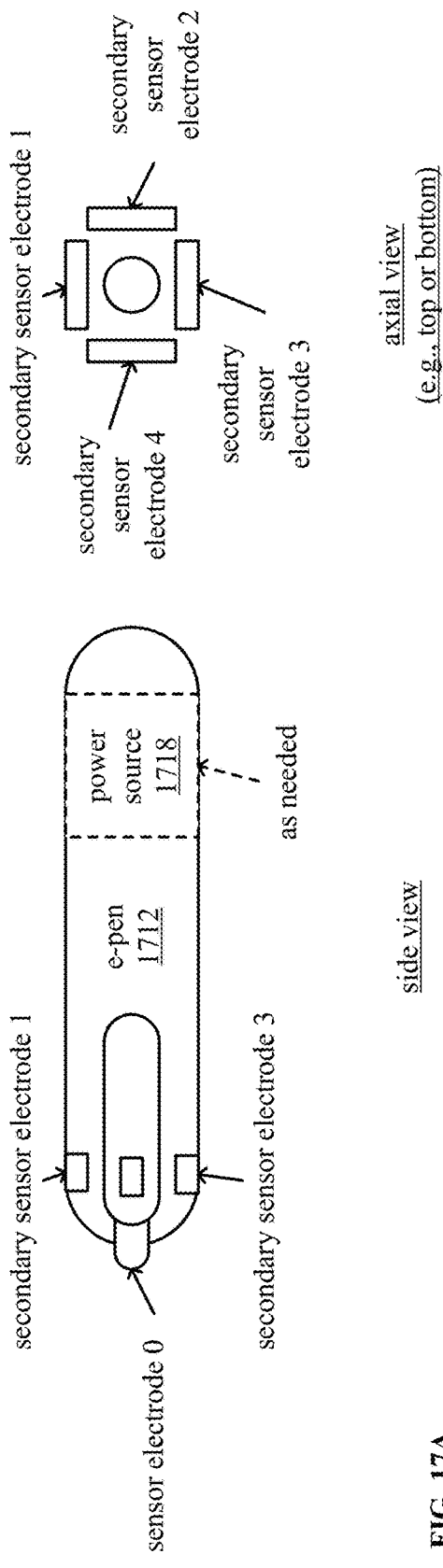
FIG. 17A is a schematic block diagram of an embodiment of an e-pen in accordance with the present invention.

FIG. 17A is a schematic block diagram of an embodiment 1701 of an e-pen in accordance with the present invention. This diagram includes an e-pen 1712 that may optionally include a power source 1718 therein (e.g., such as to provide power to one or more DSCs coupled to the respective sensor electrodes). The e-pen 1712 includes multiple respective sensor electrodes. For example, the e-pen 1712 includes sensor electrodes 0, 1, 2, 3, and 4. The sensor electrode 0 may be viewed as being a center sensor electrode 0, a primary sensor electrode 0, implemented within a pivoting chassis allowing movement within the e-pen 1712. Sensor electrodes 1-4, which may be viewed as being secondary sensor electrodes of the e-pen 1712, are implemented around the sensor electrode 0. Examples of the sensor electrode 0 include center sensor electrode, primary sensor electrode, pivoting, etc.

As the primary sensor electrode 0 moves and pivots such as when in use, its relative location with respect to the secondary sensor electrodes 1-4 will change. For example, the distances between the primary sensor electrode 0 and the secondary sensor electrodes 1-4 will change as the primary sensor electrode 0 moves within a pivot-capable chassis. Different respective DSCs are implemented simultaneously to drive and to sense respective signals via the respective sensor electrodes. For example, a first DSC is implemented simultaneously to drive and to sense a first signal via the primary sensor electrode 0. A second DSC is implemented simultaneously to drive and to sense a second signal via the secondary sensor electrode 1, a third DSC is implemented simultaneously to drive and to sense a third signal via the secondary sensor electrode 2, a fourth DSC is implemented simultaneously to drive and to sense a fourth signal via the secondary sensor electrode 3, and a fifth DSC is implemented simultaneously to drive and to sense a fifth signal via the secondary sensor electrode 4.

As these respective signals are driven the of the respective sensor electrodes of the e-pen 1712, when the e-pen 1712 is interacting with one or more touch sensors (e.g., of such a device that includes the one or more touch sensors), the respective signals provided from the respective sensor electrodes of the e-pen 1712 are coupled into the one or more touch sensors, which are located sufficiently close to the respective sensor electrodes of the e-pen 1712 four signal coupling, such that one or more DSCs associated with those one or more touch sensor electrodes will be able to detect the respective signals provided from the respective sensor electrodes of the e-pen 1712.

For example, consider the first signal that is driven via the primary sensor electrode 0. As the e-pen 1712 is interacting with the one or more touch sensors, then those touch sensors that are within proximity of the primary sensor electrode 0 will detect that first signal. The one or more DSCs associated with those one or more touch sensor electrodes will be able to detect the first signal provided from the primary sensor electrode 0 of the e-pen 1712. Similarly, other signals driven via the other respective sensor electrodes of the e-pen 1712, when those other respective sensor electrodes of the e-pen 1712 are sufficiently close to the one or more touch sensors, will also be coupled into those one or more touch sensors.

Also, with respect to this diagram as well as other examples, embodiments, and their equivalents described herein, note that signal driving and detection may be performed from an e-pen to the one or more touch sensors and also from the one or more touch sensors to the e-pen. Note that while a DSC is configured to perform simultaneous driving and sensing of a respective signal via an e-pen sensor electrode or a touch sensor, note that detection of other signals that are coupled into that e-pen sensor electrode or touch sensor is also performed. In general, any signal that gets coupled into an e-pen sensor electrode or a touch sensor via which DSC is configured to perform simultaneous driving and sensing may be detected. That is to say, not only is simultaneous driving and sensing of the signal that is provided from the DSC to the e-pen sensor electrode or the touch sensor performed, but also detection, sensing, processing, etc. is performed of any other signal that is coupled into that e-pen sensor electrode or touch sensor.

In general, while this diagram shows four secondary sensor electrodes encompassing the primary sensor electrode 0 within the e-pen 1712, note that any desired number of secondary sensor electrodes may be implemented within alternative embodiments of an e-pen (e.g., 3, 5, etc. or any other number of secondary sensor electrodes).

Figure 17B:
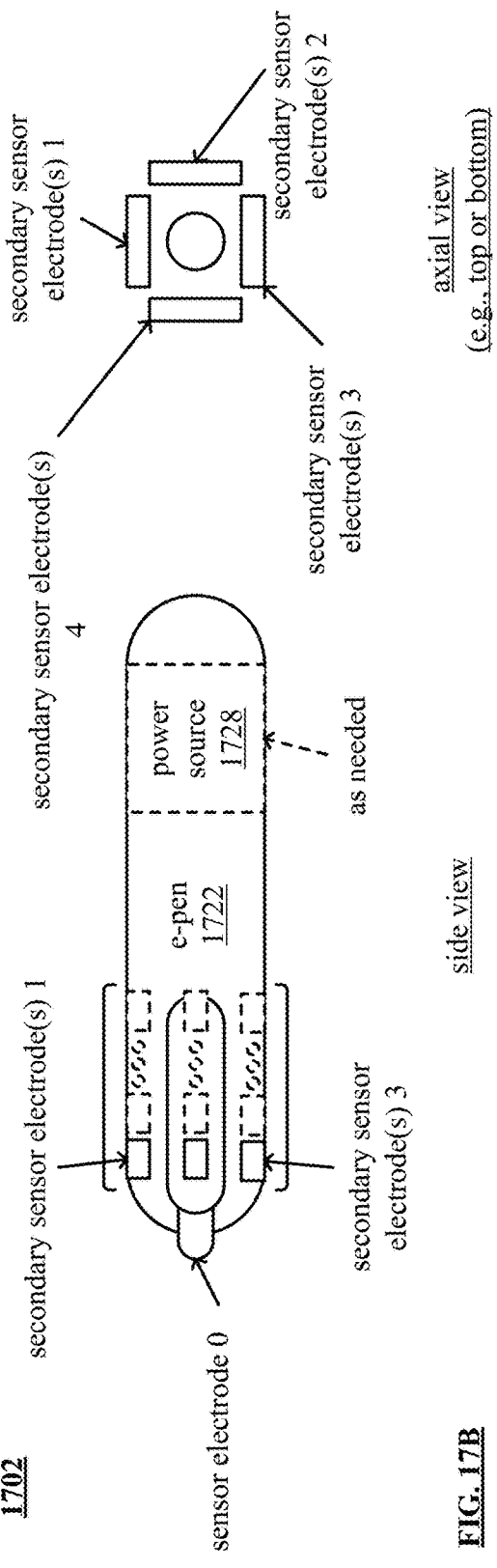
FIG. 17B is a schematic block diagram of another embodiment of an e-pen in accordance with the present invention.

FIG. 17B is a schematic block diagram of another embodiment 1702 of an e-pen in accordance with the present invention. This diagram has some similarities to the prior diagram. This diagram includes an e-pen 1722 that may optionally include a power source 1728 therein (e.g., such as to provide power to one or more DSCs coupled to the respective sensor electrodes). The e-pen 1722 includes multiple respective sensor electrodes. For example, the e-pen 1712 includes sensor electrodes 0, 1a, 2a, 3a, and 4a. The sensor electrode 0 may be viewed as being a center sensor electrode 0, a primary sensor electrode 0, implemented within a pivoting chassis allowing movement within the e-pen 1712. Examples of secondary sensor electrode 0 include center sensor electrode, primary sensor electrode, pivoting, etc.

This diagram is different from the prior diagram such that secondary sensor electrodes 1-4 of the prior diagram are instead implemented based on sets of secondary sensor electrodes. For example, in place of the secondary sensor electrode 1 of the prior diagram is instead implemented with a set of secondary electrodes 1a, 1b, and optionally up to 1n (where n is a positive integer greater than or equal to 3). Examples of secondary sensor electrode(s) 1 include secondary sensor electrode(s) 1a, 1b, . . . 1n). Similarly, the other secondary sensor electrodes 2, 3, 4 are replaced by different respective sets of secondary electrodes. For example, secondary sensor electrode 2 of the prior diagram is instead implemented with a set of secondary electrodes 2a, 2b, and optionally up to 2n (where n is a positive integer greater than or equal to 3). Examples of secondary sensor electrode(s) 2 include secondary sensor electrode(s) 2a, 2b, 2n). Similarly, the other secondary sensor electrodes are instead implemented with respective sets of secondary electrodes. Examples of secondary sensor electrode(s) 3 include secondary sensor electrode(s) 3a, 3b, 3n). Examples of secondary sensor electrode(s) 4 include secondary sensor electrode(s) 4a, 4b, 4n).

The use of more than one secondary sensor electrode around the primary sensor electrode 0 allows for greater granularity regarding the position, orientation, till, etc. of the primary sensor electrode 0 within the e-pen 1722. For example, as the primary sensor electrode 0 tilts within the e-pen 1722, information provided from signals that are driven and sentenced to be a he respective secondary sensor electrodes surrounding the primary sensor electrode 0 allow for greater determination on the position, orientation, till, etc. of the primary sensor electrode 0 within the e-pen 1722.

In general, while these diagrams show sets of four secondary sensor electrodes encompassing the primary sensor electrode 0 within the e-pen 1722, note that any desired number of secondary sensor electrodes may be implemented within alternative embodiments of an e-pen (e.g., 3, 5, etc. or any other number of sets of secondary sensor electrodes). Note also that the arrangement of the different respective secondary sensor electrodes may not be uniform throughout the e-pen 1722. For example, a first set of secondary electrodes encompassing the primary sensor electrode 0 within the e-pen 1722 may include 4 secondary sensor electrodes, and a second set of secondary electrodes encompassing the primary sensor electrode 0 within the e-pen 1722 may include 5 secondary sensor electrodes, etc. The arrangement and configuration of the different respective secondary sensor electrodes may very along the axial length of the primary sensor electrode 0 within the e-pen 1722.

The following two diagrams have some similarity to the previous two diagrams with at least one difference being that one or more sensor electrodes are implemented at an erasing end of an e-pen. For example, the previous two diagrams show various examples of sensor electrodes implemented at a writing end of an e-pen, and the use following two diagrams include both writing any erasing capability. For example, writing capability includes operating in the e-pen, display device, etc. in such a way to produce content on the display device based on interaction of the e-pen with the display device, whereas erasing capability includes operating in the e-pen, display device, etc. in such a way to remove content from the display device based on interaction of the e-pen with the display device.

For example, consider an example where writing operation produces that is visible on the display device based on interaction of the e-pen with the display device (e.g., provides content based on the path that the e-pen travels on a touchscreen, display, etc.). In contradistinction, consider an example where erasing operation removes content that is visible on the display device based on interaction of the e-pen with the display device (e.g., removes based on the path that the e-pen travels on a touchscreen, display, etc.). In certain examples, note that different respective ends of an e-pen are implemented for writing and erasing operation. However, in some examples, note that both writing operation and erasing operation may be implemented using the same end of an e-pen (e.g., such as toggling between the two operations based on user selection, operation of a switch, toggle between writing operation and erasing operation, etc.). In some examples, the e-pen includes one or more means thereon (e.g., one or more button, one or more switches, etc.) by which a user may select writing operation or erasing operation. On other examples, user interaction with a touch sensor device associated with the e-pen effectuates selection of writing operation or erasing operation (e.g., a button, user interface, etc. shown on a display of a touch sensor device allows a user to select writing operation or erasing operation).

Figure 18A:
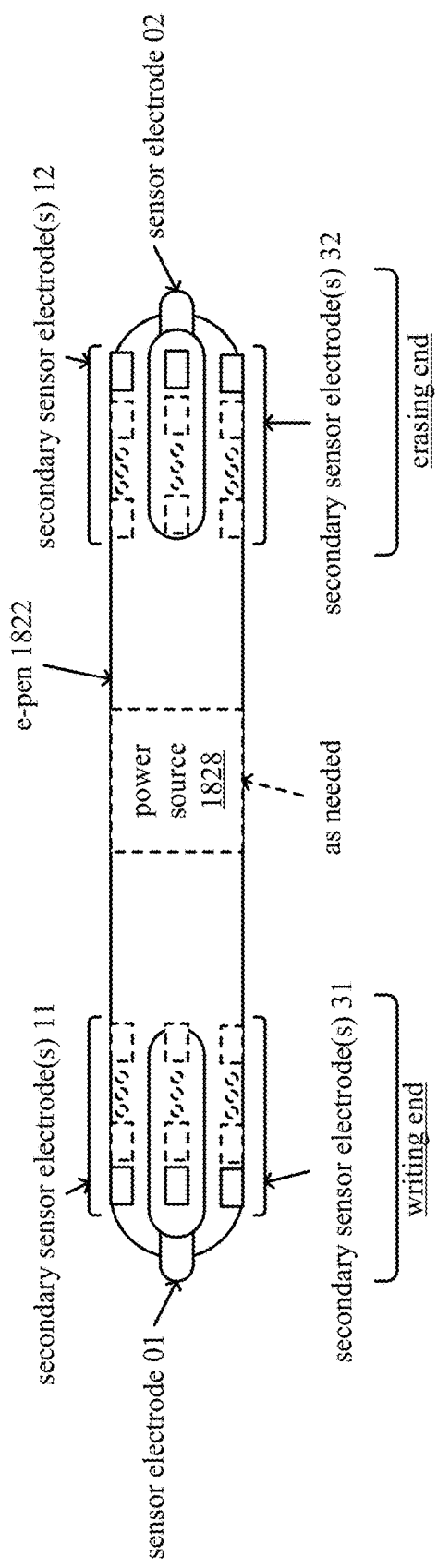
FIG. 18A is a schematic block diagram of another embodiment of an e-pen in accordance with the present invention.

FIG. 18A is a schematic block diagram of another embodiment 1801 of an e-pen in accordance with the present invention. This diagram includes an e-pen 1822 that may optionally include a power source 1818 therein (e.g., such as to provide power to one or more DSCs coupled to the respective sensor electrodes). The e-pen 1822 includes multiple respective sensor electrodes including at both ends of the e-pen 1822.

For example, the e-pen 1822 includes sensor electrodes 01, 11a, 21a, 31a, and 41a and optionally up to 11a, 21n, 31n, and 41n on the writing end of the e-pen 1822. The sensor electrode 01 may be viewed as being a center sensor electrode 01, a primary sensor electrode 01, implemented within a pivoting chassis allowing movement within the e-pen 1822 on the writing end of the e-pen 1822. Examples of secondary sensor electrode 01 include center sensor electrode, primary sensor electrode, pivoting, etc. Examples of secondary sensor electrode(s) 11 include secondary sensor electrode(s) 11a, 11b, . . . 11n). Examples of secondary sensor electrode(s) 31 include secondary sensor electrode(s) 31a, 31b, . . . 31n).

Similarly, on an erasing end of the e-pen 1822, the e-pen 1822 includes sensor electrodes 02, 12a, 22a, 32a, and 42a and optionally up to 12a, 22n, 31n, and 42n. The sensor electrode 01 may be viewed as being a center sensor electrode 02, a primary sensor electrode 02, implemented within a pivoting chassis allowing movement within the e-pen 1822 on the erasing end of the e-pen 1822. Examples of secondary sensor electrode 02 include center sensor electrode, primary sensor electrode, pivoting, etc. Examples of secondary sensor electrode(s) 12 include secondary sensor electrode(s) 12a, 12b, . . . 12n). Examples of secondary sensor electrode(s) 32 include secondary sensor electrode(s) 32a, 32b, 32n).

The construction and implementation of the different respective ends of the e-pen 1822 may be similar, but the functionality thereof is different. On one end of the e-pen 1822, the respective signals that are driven and simultaneously sent via the DSCs associated with those sensor electrodes correspond to writing operations. On the other end of the e-pen 1822, the respective signals that are driven and simultaneously sent via the DSCs associated with those sensor electrodes correspond to erasing operations.

Figure 18B:
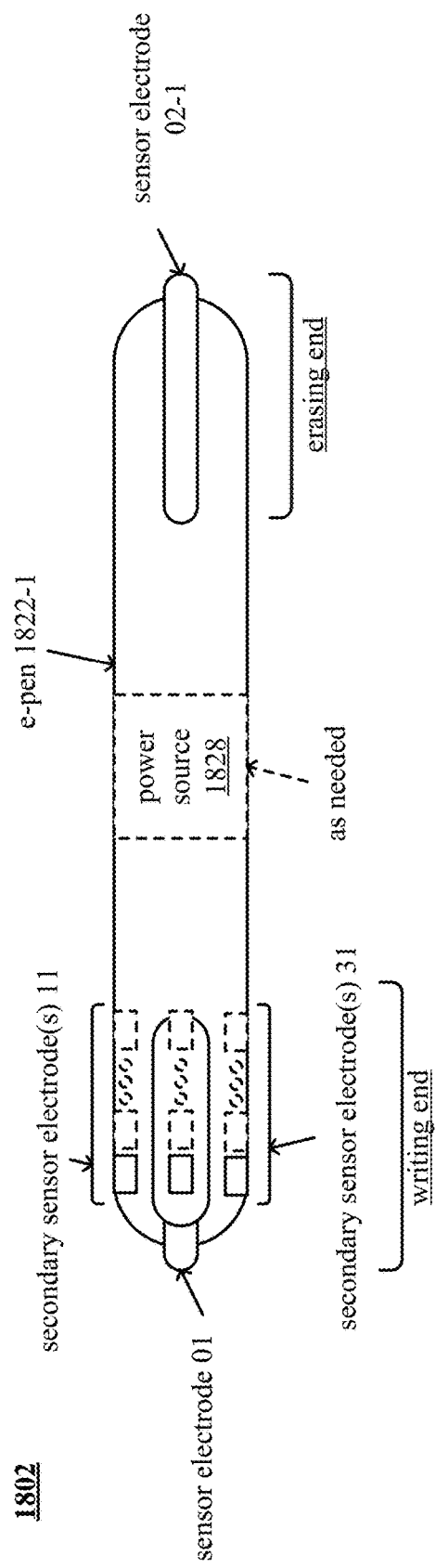
FIG. 18B is a schematic block diagram of another embodiment of an e-pen in accordance with the present invention.

FIG. 18B is a schematic block diagram of another embodiment 1802 of an e-pen in accordance with the present invention. This diagram includes an e-pen 1822-1 that may optionally include a power source 1828 therein (e.g., such as to provide power to one or more DSCs coupled to the respective sensor electrodes). The e-pen 1822-1 includes multiple respective sensor electrodes including a singular sensor electrode at the erasing end of the e-pen 1822-1.

For example, the e-pen 1822-1 includes sensor electrodes 01, 11a, 21a, 31a, and 41a and optionally up to 11a, 21n, 31n, and 41n on the writing end of the e-pen 1822-1. The sensor electrode 01 may be viewed as being a center sensor electrode 01, a primary sensor electrode 01, implemented within a pivoting chassis allowing movement within the e-pen 1822-1 on the writing end of the e-pen 1822-1. Examples of secondary sensor electrode 01 include center sensor electrode, primary sensor electrode, pivoting, etc. Examples of secondary sensor electrode(s) 11 include secondary sensor electrode(s) 11a, 11b, . . . 11n). Examples of secondary sensor electrode(s) 31 include secondary sensor electrode(s) 31a, 31b, . . . 31n).

However, on an erasing end of the e-pen 1822-1, the e-pen 1822-1 includes a single sensor electrode 02-1, which may be viewed as being a center sensor electrode 02-1, a primary sensor electrode 02-1, implemented on the erasing end of the e-pen 1822-1. Examples of single sensor electrode 02-01 include center sensor electrode, primary sensor electrode, pivoting, etc.

The construction and implementation of the different respective ends of the e-pen 1822-1 is different in this diagram. On one end of the e-pen 1822-1, the respective signals that are driven and simultaneously sent via the DSCs associated with those sensor electrodes correspond to writing operations. On the other end of the e-pen 1822-1, the singular signal provided via DSC associated with the single sensor electrode 02-1 corresponds to erasing operations.

In general, note that any combination of writing and/or erasing ends and implementations thereof of an e-pen may be implemented. For example, an the e-pen may include a primary sensor electrode surrounded by one single set of secondary sensor electrodes. An e-pen may alternatively include a primary sensor electrode surrounded by multiple sets of secondary sensor electrodes. Any such e-pen may include any desired implementation of an erasing end (e.g., which may be implemented using a single sensor electrode or multiple sensor electrodes).

FIG. 19 is a schematic block diagram of embodiments 1900 of different sensor electrode arrangements within e-pens in accordance with the present invention. This diagram shows different respective numbers of secondary electrodes implemented to surround a primary sensor electrode. Note that such a primary sensor electrode may be implemented in a pivot-capable type chassis that allows movement of it with respect to the secondary sensor electrodes that surround it. In an example, a primary sensor electrode (PE) 0, is implemented as being movable, pivoting within e-pen based on user operation and/or interaction with touch sensor device.

As can be seen with respect to reference numeral 1901, 4 secondary sensor electrodes are implemented around a primary sensor electrode. In this example, the respective secondary sensor electrodes are approximately and/or substantially and/or substantially of a common size and shape, being rectangular in shape, and distributed evenly around the primary sensor electrode.

Reference numeral 1902 shows 6 secondary electrodes implemented around the primary sensor electrode. In this example, the respective secondary sensor electrodes are also approximately and/or substantially of a common size and shape, being rectangular in shape, and distributed evenly around the primary sensor electrode.

Reference numeral 1903 shows 8 secondary electrodes implemented around the primary sensor electrode. In this example, the respective secondary sensor electrodes are also approximately and/or substantially of a common size and shape, being rectangular in shape, and distributed evenly around the primary sensor electrode.

Reference numeral 1904 shows 4 secondary sensor electrodes are implemented around a primary sensor electrode. In this example, the respective secondary sensor electrodes are not of a common size and shape. The sensor electrode (SE) 1 and 3 are approximately and/or substantially the common first size and first shape, and the SEs 2 and 4 are approximately and/or substantially the common second size and second shape. Note that while they are all approximately and/or substantially rectangular in shape, they are of different sizes and shapes.

Reference numeral 1905 shows 3 secondary electrodes implemented around the primary sensor electrode. In this example, the respective secondary sensor electrodes are also approximately and/or substantially of a common size and shape, being each being curved and partially concentric around the primary sensor electrode and distributed evenly around the primary sensor electrode.

Reference numeral 1905 shows 4 secondary electrodes implemented around the primary sensor electrode. In this example, the respective secondary sensor electrodes are also approximately and/or substantially of a common size and shape, being each being curved and partially concentric around the primary sensor electrode and distributed evenly around the primary sensor electrode.

With respect to any of these examples or their equivalents, note that more than one sensor may be implemented along the axis of the primary sensor electrode. For example, as described above with respect to certain diagrams that include more than one set of secondary sensor electrodes encompassing the primary sensor electrode, any of these examples or their equivalents may also include more than one set of secondary sensor electrodes encompassing the primary sensor electrode. Note also that, along the axis of the primary sensor electrode, the different respective sets of secondary sensor electrodes may vary. For example, a set of secondary sensor electrodes based on the implementation of reference 1901 may be implemented first, a set of secondary sensor electrodes based on the limitation of reference numeral 1905 may be implemented next, and so on. Any desired implementation having varied types of secondary sensor electrodes may be implemented as desired in various embodiments and examples. Generally speaking, any desired number n of sensor electrodes may be implemented around primary/center sensor electrode and in any configuration, shape, size, etc., uniform, non-uniform, etc., combination of different types, etc.

Figure 20:
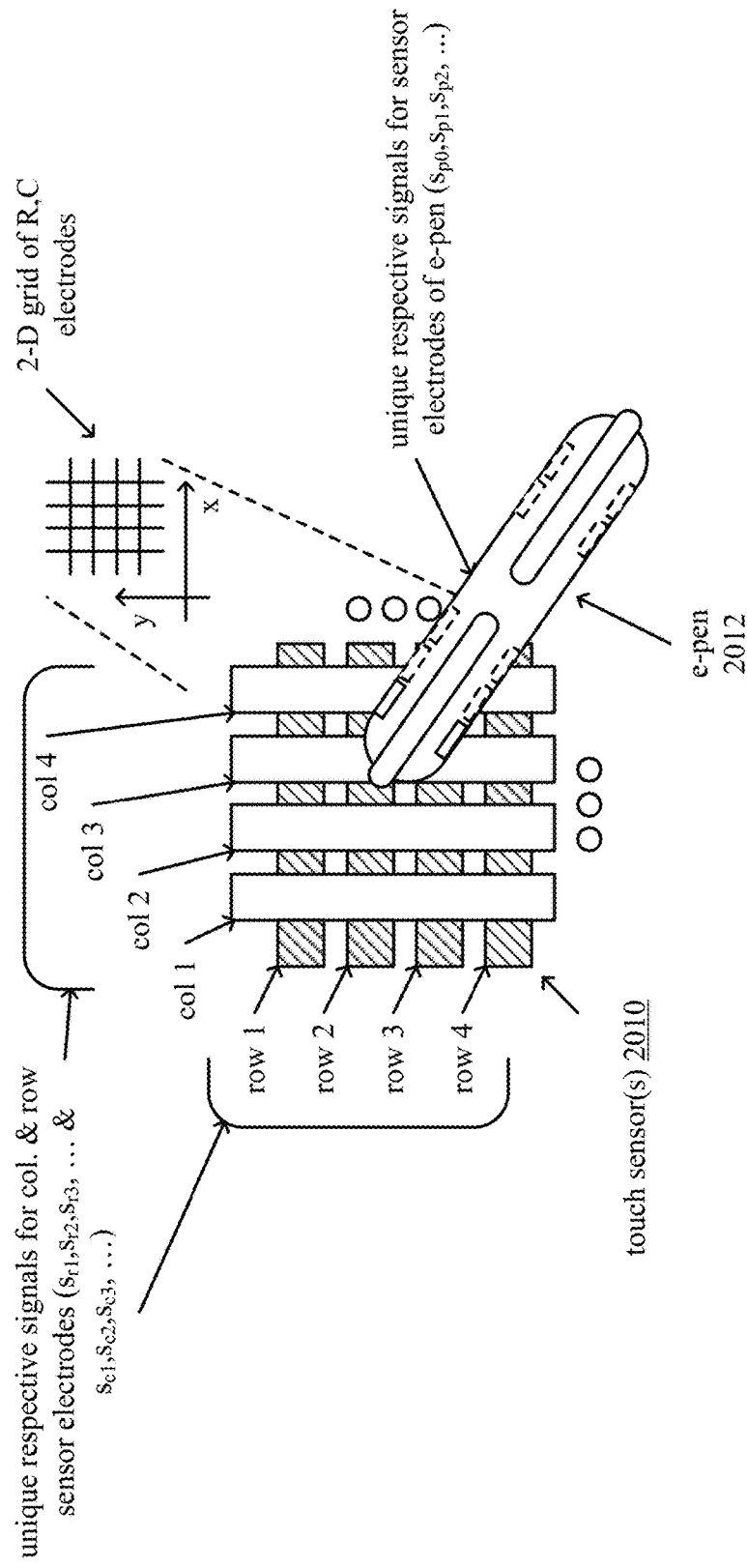
FIG. 20 is a schematic block diagram of an embodiment of an e-pen interacting touch sensors (e.g., touch sensor electrodes) in accordance with the present invention.

FIG. 20 is a schematic block diagram of an embodiment 2000 of an e-pen interacting touch sensors in accordance with the present invention. This diagram shows an e-pen 2012 implemented to interact with one or more touch sensors 2010 (e.g., touch sensor electrodes). Note that the one or more touch sensors 2010 may be implemented within any type of device as described herein. In an example, unique respective signals are implemented for each column and row sensor electrode and element within an e-pen (e.g., for any desired combination of operation such as some drive/TX only and with others TX/RX, drive/sense). In an alternative implementation, time-division is used in accordance with signal re-use. Consider a 2-D grid of row and column (R,C) electrodes (e.g., cross-sections, intersections, etc. of R,C electrodes used to ID location of e-pen signals, cross-coupling locations, x-y mapping, etc.).

This diagram shows a cross-section of rows and columns of a touchscreen and portions of the associated one or more touch sensors 2010. Multiple DSCs are implemented simultaneously to drive and to sense signals provided via the respective sensor electrodes of the e-pen 2012 and the touch sensors. Note that the different respective signals provided to the respective sensor electrodes of the e-pen 2012 and the touch sensors may be differentiated using any one or more characteristics as described herein including frequency, amplitude, DC offset, modulation, FEC/ECC, type, etc. and/or any other characteristic that may be used to differentiate signals provided to different respective e-pen sensor electrodes and touch sensors.

For example, unique respective signals are provided to the column and row sensor electrodes of a touchscreen. The signals provided to the column sensor electrodes of the touchscreen are depicted as $s_{r1}$, $s_{r2}$, and so on, and the column signals are signals are depicted as $s_{c1}$, $s_{c2}$, and so on. The signals provided to the sensor electrodes of the e-pen 2012 are depicted as $s_{p0}$, $s_{p1}$, $s_{p2}$, and so on. In an example, signal #a includes a first frequency, a first amplitude, a first DC offset, a first modulation, a first FEC/ECC, a first type (e.g., fa, amp. a, DC off. a, mod. a, FEC/ECC a, type, etc.), and signal #b includes a second frequency, a second amplitude, a second DC offset, a second modulation, a second FEC/ECC, a second type (e.g., fb, amp. b, DC off. b, mod. b, FEC/ECC b, type, etc.).

Again, note that coupling of signals from the sensor electrodes of the e-pen 2012 may be made into the column and row sensor electrodes of the touchscreen, and vice versa. For example, signals coupled from the column and row sensor electrodes of the touchscreen into the sensor electrodes of the e-pen 2012 may be detected by the one or more DSCs that are configured simultaneously to drive in to sense signals via the respective sensor electrodes of the e-pen 2012.

One or more processing modules associated with a device that includes the one or more touch sensors 2010 and the e-pen 2012 is configured to process information associated with the signals that are driven and simultaneously sensed by the DSCs that are associated with the column and row sensor electrodes of the touchscreen and the sensor electrodes of the e-pen 2012 to determine various information including the location of the e-pen 2012 with respect to the touchscreen, the orientation, tilt, etc. of the e-pen 2012, which particular signals are coupled from the one or more touch sensors 2010 to the e-pen 2012, and vice versa, the amount of signal coupling from the one or more touch sensors 2010 to the e-pen 2012, and vice versa, etc.

In an example of operation and implementation, one or more processing modules is configured to process information corresponding to one or more signals that are detected as being coupled from the e-pen 2012 to the row and column electrodes of the touch sensors 2010. Based on a mapping (e.g., x-y, a two-dimensional mapping) of the row and column electrodes relative to the touchscreen, and based on the particular locations at which those one or more signals are detected as being coupled from the e-pen 2012 to the row and column electrodes, the one or more processing modules is configured to determine particularly the locations of the sensor electrodes of the e-pen 2012 based on the row and column electrodes of the touch sensors 2010. For example, location of coupling of a signal from a sensor electrode of the e-pen 2012 may be determined based on that signal being detected within a particular row electrode and column electrode. The cross-section of that row electrode and that column electrode, based on the mapping of the row and column electrodes, provides the location of the sensor electrode of the e-pen 2012. This process may be performed with respect to any one or more of the different respective signals coupled from the sensor electrodes of the e-pen 2012 to the row and column electrodes of the touch sensors 2010.

Figure 21:
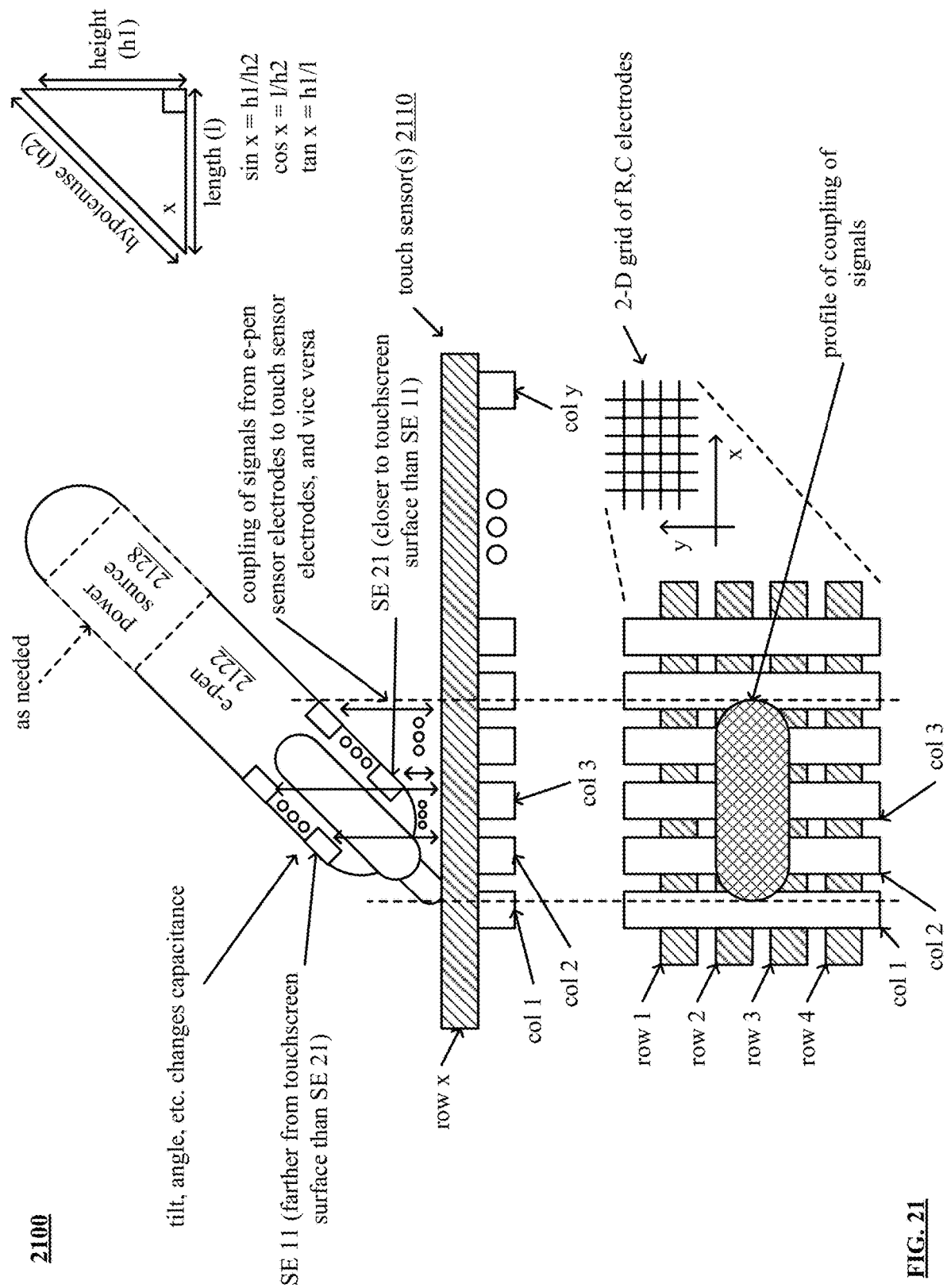
FIG. 21 is a schematic block diagram of another embodiment of an e-pen interacting with touch sensors (e.g., touch sensor electrodes) in accordance with the present invention.

FIG. 21 is a schematic block diagram of another embodiment 2100 of an e-pen interacting with touch sensors in accordance with the present invention. The top portion of this diagram includes a side view of an e-pen 2122, which may optionally include a power source 2128 as needed, that is interacting with one or more touch sensors 2110. This includes a cross-section of rows and columns of a touchscreen. Consider a 2-D grid of row and column (R,C) electrodes (e.g., cross-sections, intersections, etc. of R,C electrodes used to ID location of e-pen signals, cross-coupling locations, x-y mapping, etc.).

In this implementation, the e-pen 2122 includes a primary sensor electrode and one or more sets of secondary sensor electrodes that surround the primary sensor electrode. The tilt, angle, etc. of the e-pen 2122 relative to the touchscreen changes the capacitance between the respective sensor electrodes of the e-pen and the row and column sensor electrodes of the touchscreen. In an example, the tilt, angle, etc. changes capacitance between respective sensor electrodes of e-pen and/or to sensor electrodes (rows/cols. of touchscreen). There is also coupling of signals from e-pen sensor electrodes to touch sensor electrodes, and vice versa. Considering an example in which the e-pen 2122 is perfectly normal to the surface of the touchscreen, meaning the axis of the primary sensor electrode is perpendicular to the surface of the touchscreen in all respects, then the capacitance of the secondary sensor electrodes and row and column electrodes of the touchscreen would be the same (e.g., assuming a uniform implementation of the secondary sensor electrodes within the e-pen 2122).

However, as the e-pen 2122 is tilted relative to the surface of the touchscreen, then some of the secondary sensor electrodes will be closer to the row and column electrodes of the touchscreen than others. As can be seen in the diagram, considering the secondary sensor electrodes closer to the writing end/tip the e-pen 2122 that surround the primary sensor electrode, as the e-pen 2122 is tilted. For example, consider secondary sensor electrode, SE 11 and SE 21. As the e-pen 2122 is tilted, SE 11 will be farther from the surface of the touchscreen than SE 21. More effective capacitive coupling will be provided from SE 21 to the proximately located row and column electrodes of the touchscreen than from SE 11 in this instance.

The bottom portion of this diagram includes a top view of the coupling of signals from the e-pen sensor electrodes to the row and column electrodes of the touchscreen, and vice versa. Note that there will be a spatial mapping of signals coupled from the e-pen 2122 to the row and column electrodes of the touchscreen, and vice versa. This diagram does not specifically show the different intensities of the respective signals on a per sensor electrode basis, but shows the general area via which coupling of signals is made between the e-pen 2122 and the row and column electrodes of the touchscreen.

Note that as the e-pen 2122 is interacting with touchscreen and as the location of the e-pen 2122 changes, such as from user control of the e-pen 2122 in writing, drawing, erasing, etc. operations, the profile of coupling of signals between the e-pen 2122 and the row and column electrodes of the touchscreen, will be changing. A dynamic mapping of the profile of signals between the e-pen 2122 and the row and column electrodes of the touchscreen as well as identification of particular signals being within the profile may be used to provide for specific location of the sensor electrodes of the e-pen 2122 at any given time and as a function of time. In an example, there is generated a profile of coupling of signals from the e-pen sensor electrodes to the touch sensor(s), and vice versa (e.g., spatial mapping of signals, indicative of e-pen orientation). The spatial mapping of these signals provides information related to location of the e-pen 2122 with respect to the touchscreen and also provides information related to the tilt, orientation, position, etc. of the e-pen 2122. As described with respect to other embodiments, examples, etc. note that particular configurations of sensor electrodes within an e-pen may provide for greater granularity and resolution regarding its particular location respect the touchscreen and also information related to its tilt, orientation, position, etc.

Figure 22:
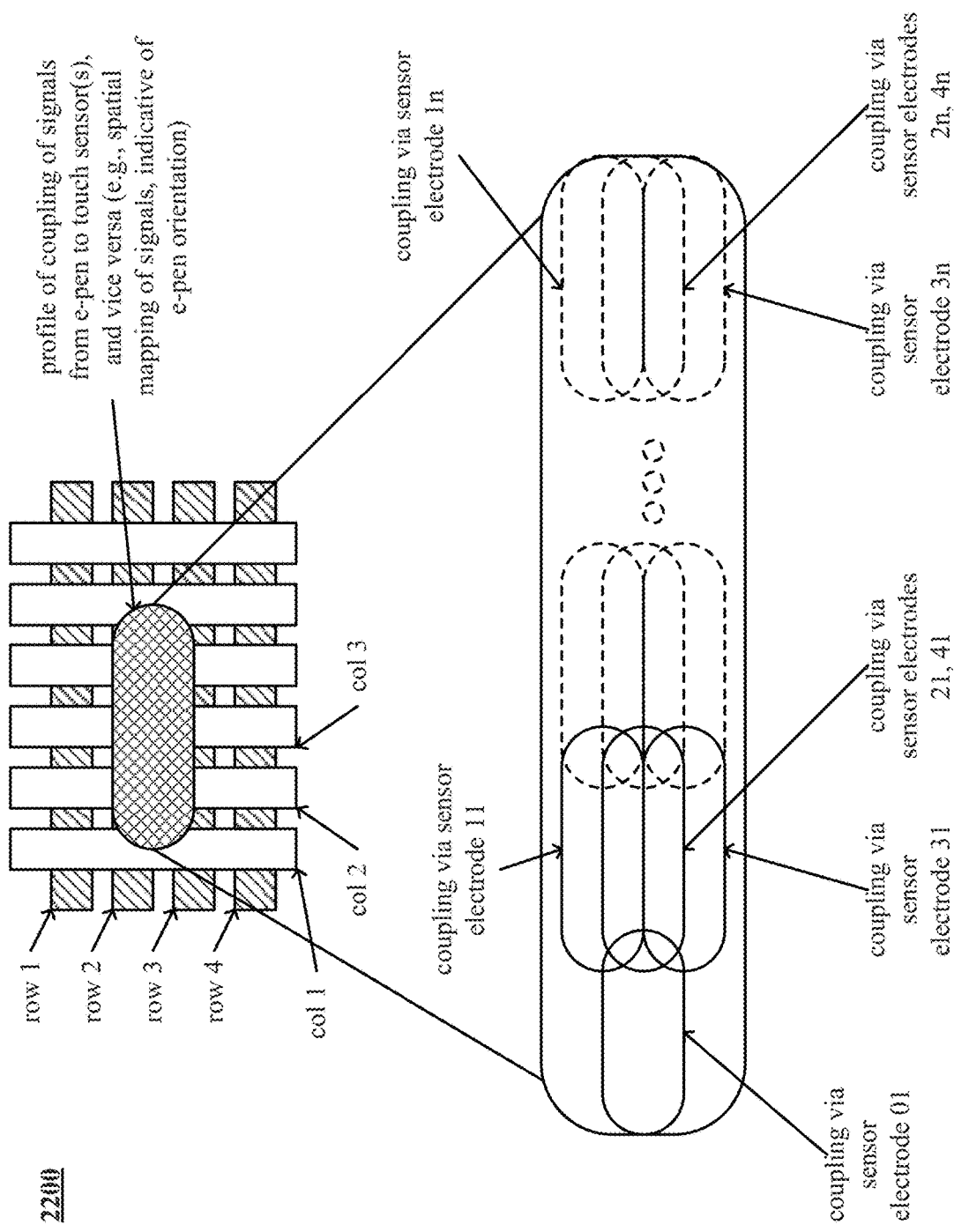
FIG. 22 is a schematic block diagram of another embodiment of an e-pen interacting with touch sensors (e.g., touch sensor electrodes) in accordance with the present invention.

FIG. 22 is a schematic block diagram of another embodiment 2200 of an e-pen interacting with touch sensors in accordance with the present invention. This diagram shows particularly coupling between the respective sensor electrodes of an e-pen and the row and column electrodes of the touchscreen. At the top of the diagram, the profile of the coupling of the signals is shown, which is similar to the profile of coupling of signals in the prior diagram.

At the bottom portion of the diagram, an enlargement of the coupling of the respective sensor electrodes of the e-pen are shown. The e-pen of this diagram may be viewed as being similar to the e-pen 1722 of FIG. 17B, the e-pen 1822 of FIG. 18A (writing end), or the e-pen 1822-1 of FIG. 18B (writing end) that includes a primary sensor electrode 01 and multiple sets of secondary sensor electrodes (e.g., a first set including secondary sensor electrodes 11, 21, 31, 41, and optionally up to an nth set including secondary sensor electrodes 1n, 2n, 3n, 4n).

In an example of operation and implementation, consider an example in which the e-pen is perfectly normal to the surface of the touchscreen, meaning the axis of the primary sensor electrode is perpendicular to the surface of the touchscreen in all respects, then the capacitance of the secondary sensor electrodes and row and column electrodes of the touchscreen would be the same. There would be very strong capacitive coupling of the driven via the primary sensor electrode of the e-pen to the row and or column electrodes of the touchscreen closest to the primary sensor electrode of the e-pen. In addition, the capacitive coupling from the respective secondary sensor electrodes 11, 21, 31, 41 would be approximately and/or substantially uniform to row and or column electrodes of the touchscreen surrounding the location of the primary sensor electrode of the e-pen.

In another example of operation and implementation, consider an example of operation and implementation based on the location and orientation of the e-pen the prior diagram, the coupling via primary sensor electrode 01 would be greatest among the sensor electrodes of the e-pen given that it is in physical contact with the surface of the touchscreen. As the e-pen 2122 is tilted, sensor electrode (SE) 11 will be farther from the surface of the touchscreen than SE 21. More effective capacitive coupling will be provided from SE 21 to the proximately located row and column electrodes of the touchscreen than from SE 11 in this instance. In addition, more effective coupling will be provided from the sensor electrodes (SEs) 11, 21, 31, 41 than from the SEs 1n, 2n, 3n, 4n based on the location and orientation of the e-pen the prior diagram. For example, analysis of a signal profile of the coupling from the sensor electrodes aligned along the e-pen (e.g., SEs 11, 12, up to 1n) provide information regarding the angular position of the e-pen relative to the service of the touchscreen. Based on a signal profile of the coupling from those sensor electrodes aligned along the e-pen (e.g., SEs 11, 12, up to 1n) being uniform, meaning approximately and/or substantially same signal coupling from each of the those sensor electrodes aligned along the e-pen (e.g., SEs 11, 12, up to 1n), then a determination that the axis of the e-pen is parallel to the surface of the touchscreen may be made. In addition, analysis of how much signal coupling is provided from the respective sensor electrodes will provide information regarding the proximity of the e-pen to the service of the touchscreen.

In general, analysis of the location, signal strength, intensity, and or other characteristics associated with the different respective signals coupled from the sensor electrodes of the e-pen to the row and column electrodes of the touchscreen provides for information regarding the location of the e-pen with respect to the service of the touchscreen as well as the tilt, orientation, etc. of the e-pen. Considering the two extreme examples described above, one in which the e-pen is normal to the surface of the touchscreen and another in which the e-pen is parallel to the surface of the touchscreen, considering when the e-pen is located somewhere in between those two extremes, such as in a tilted implementation shown in the prior diagram, analysis of the relationships between those respective signals will provide that information regarding the location of the e-pen with respect to the service of the touchscreen as well as the tilt, orientation, etc. of the e-pen. In some examples, analysis of the various signals that are coupled from the sensor electrodes of the e-pen to the row and column electrodes of the touchscreen may be associated geometrically with respect to the tilt, orientation, etc. of the e-pen.

As an example, considering a signal profile of the coupling from those sensor electrodes aligned along the e-pen (e.g., SEs 11, 12, up to 1n) degrades by 3 DB is a function of distance (e.g., one half as much capacitive coupling of the signal via SE 12 is made as the signal via SE 11, and one half as much capacitive coupling of the signal via SE 13 is made as the signal via SE 12, etc.), then an estimation of the angle of the e-pen with respect to the service of the touchscreen can be made. In one example, an estimation of that angle x is made based on the geometric function sin x where the vertical component of a right triangle opposite the angle x corresponds to the difference between the signal coupling via SE 12 and via SE 13 (e.g., height, h1, of the right triangle), and the hypotenuse of that same right triangle corresponds to the distance between the SE 12 and via SE 13 within the e-pen (e.g., hypotenuse, h2, of the right triangle).

Other geometric estimations may be made using various geometric functions such as cos x, tan x, etc. based on the known or determined physical parameters of an e-pen (e.g., the physical configuration of the sensor electrodes therein, their relationship to one another, their spacing, etc.) and associating those relationships to the characteristics associated with the signals detected as being capacitively coupled from the sensor electrodes of the e-pen to the row and column electrodes of the touchscreen.

In an example of operation and implementation, one or more processing modules is configured to perform appropriate processing of the relative signal strengths, intensities, magnitude, of the signals coupled from the sensor electrodes of the e-pen to the row and column sensor electrodes of the touchscreen to determine the location of the e-pen with respect to the touchscreen as well as the tilt, orientation, etc. of the e-pen.

Figure 23:
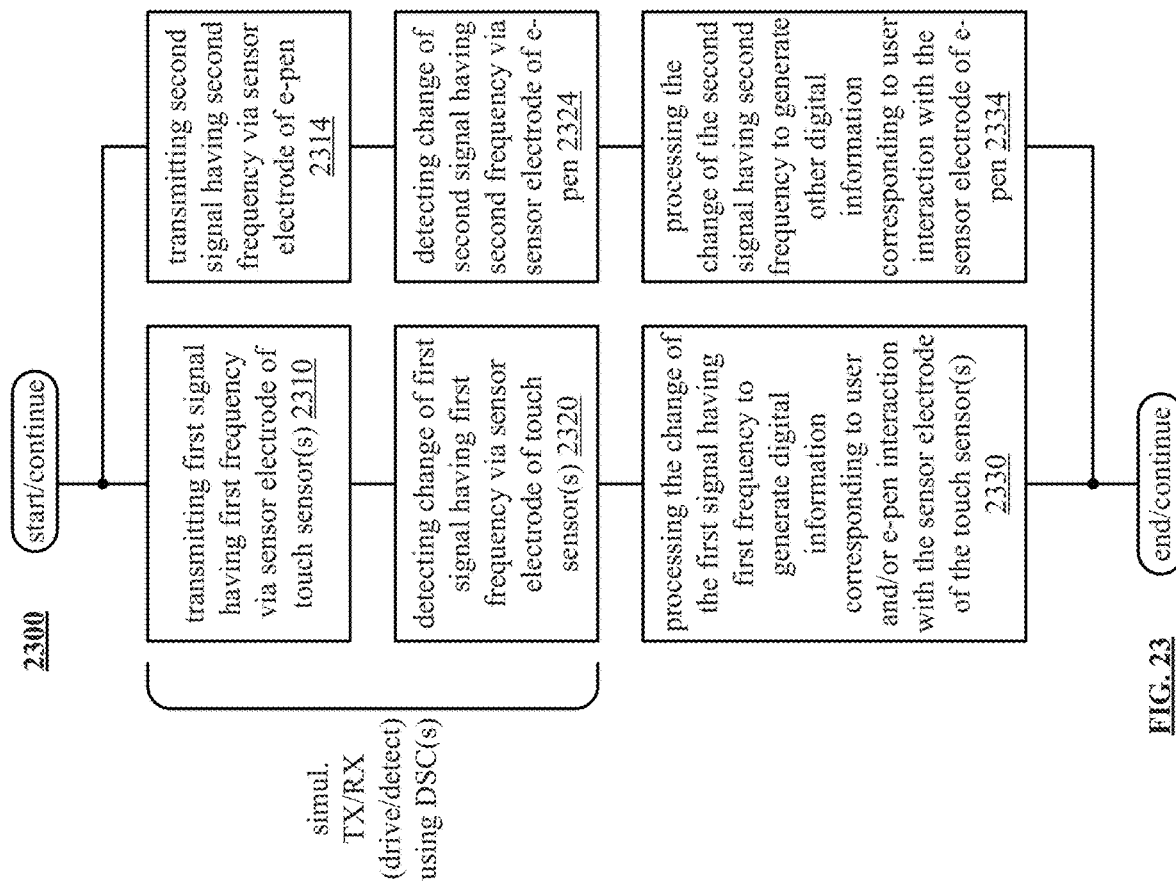
FIG. 23 is a schematic block diagram of an embodiment of a method for execution by one or more devices in accordance with the present invention.

FIG. 23 is a schematic block diagram of an embodiment of a method 2300 for execution by one or more devices in accordance with the present invention. The method 2300 operates in step 2310 by transmitting a first signal having a first frequency via a sensor electrode of one or more touch sensors. The method 2300 also operates in step 2320 by detecting a change of a first signal having a first frequency via the sensor electrode of the one or more touch sensors. Note that the operations depicted within the steps 2310 and 2320 may be performed in accordance with any of the variations, examples, embodiments, etc. of one or more DSCs as described herein that is/are configured to perform simultaneous transmit and receipt of signals (simultaneous drive and detect of signals).

The method 2300 continues in step 2330 by processing the change of the first signal having the first frequency to generate digital information corresponding to user interaction and/or e-pen interaction with the sensor electrode of the one or more touch sensors.

In some examples, note that such operations as depicted within the steps 2310, 2320, and 2330 may be performed using one or more additional signals and one or more sensor electrodes. For example, in some instances, a second signal having a second frequency is associated with a first sensor electrode of an e-pen. In such examples, the method 2300 also operates in step 2314 by transmitting the second signal having the second frequency via the first sensor electrode of an e-pen. The method 2300 also operates in step 2324 by detecting a change of the second signal having the second frequency via the sensor electrode of the e-pen.

The method 2300 continues in step 2334 by processing the change of the second signal having the second frequency to generate other digital information corresponding to user interaction with the sensor electrode of the e-pen.

As also described elsewhere herein with respect to other examples, embodiments, etc., note that coupling of signals may be performed from sensor electrodes of the e-pen to sensor electrodes of the touch sensors, and vice versa. Detection of signals being coupled from the e-pen to the sensor electrodes of the touch sensors, and vice versa, may be performed by appropriate signal processing including analysis of the digital information corresponding to such user and/or e-pen interaction with the various sensor electrodes. In this method 2300, differentiation between the different respective signals provided via the sensor electrode of the touch sensors and the sensor electrode of the e-pen is made in frequency.

Variants of the method 2300 operate by operating a first drive-sense circuit (DSC) of the e-pen, which includes a plurality of e-pen sensor electrodes including a first e-pen sensor electrode and a second e-pen sensor electrode, and a plurality of drive-sense circuits (DSCs), including the first DSC and a second DSC, operably coupled to the plurality of e-pen sensor electrodes, to drive a first e-pen signal having a first frequency via a first single line coupling to the first e-pen sensor electrode and simultaneously sense, via the first single line, the first e-pen signal, wherein based on interaction of the e-pen with a touch sensor device, the first e-pen signal is coupled into at least one touch sensor electrode of the touch sensor device. This also involves operating the first DSC of the e-pen to process the first e-pen signal to generate a first digital signal that is representative of a first electrical characteristic of the first e-pen sensor electrode.

This also involves operating the second DSC to drive a second e-pen signal having a second frequency that is different than the first frequency via a second single line coupling to the second e-pen sensor electrode and simultaneously sense, via the second single line, the second e-pen signal, wherein based on the interaction of the e-pen with the touch sensor device, the second e-pen signal is coupled into the at least one touch sensor electrode. In addition, this also involves operating the second DSC of the e-pen to process the second e-pen signal to generate a second digital signal that is representative of a second electrical characteristic of the second e-pen sensor electrode.

In some examples, this also involves processing at least one of the first digital signal or the second digital signal to detect the interaction of the e-pen with the touch sensor device.

Certain other examples also operate by operating a third DSC operably coupled to a first touch sensor electrode of the at least one touch sensor electrode to drive a touch sensor signal having a third frequency via a third single line coupling to the first touch sensor electrode and simultaneously sense, via the third single line, the touch sensor signal, wherein based on the interaction of the e-pen with the touch sensor device, sensing the touch sensor signal includes sensing at least one of the first e-pen signal that is coupled from the first e-pen sensor electrode into the first touch sensor electrode or the second e-pen signal that is coupled from the second e-pen sensor electrode into the first touch sensor electrode. This also involves operating the third DSC process the touch sensor signal to generate a third digital signal that is representative of a third electrical characteristic of the first touch sensor electrode. Also, such examples operate by processing the third digital signal to determine location of at least one of the first e-pen sensor electrode or the second e-pen sensor electrode based on the interaction of the e-pen with the touch sensor device.

Even other examples involve a touch sensor device that also includes another plurality of DSCs, including a third DSC and a fourth DSC, operably coupled to a plurality of touch sensor electrodes, including a first touch sensor electrode and a second touch sensor electrode, including the at least one touch sensor electrode. In such examples, the operations also involve operating the third DSC to drive a first touch sensor signal having a third frequency via a third single line coupling to the first touch sensor electrode and simultaneously sense, via the third single line, the first touch sensor signal, wherein based on the interaction of the e-pen with the touch sensor device, sensing the first touch sensor signal includes sensing at least one of the first e-pen signal that is coupled from the first e-pen sensor electrode into the first touch sensor electrode or the second e-pen signal that is coupled from the second e-pen sensor electrode into the second touch sensor electrode. This also involves operating the third DSC to process the first touch sensor signal to generate a third digital signal that is representative of a third electrical characteristic of the first touch sensor electrode.

In such examples, this also involves operating the fourth DSC to drive a second touch sensor signal having a fourth frequency that is different than the first frequency via a fourth single line coupling to the second touch sensor electrode and simultaneously sense, via the fourth single line, the second touch sensor signal, wherein based on the interaction of the e-pen with the touch sensor device, sensing the second touch sensor signal includes sensing at least one of the first e-pen signal that is coupled from the first e-pen sensor electrode into the first touch sensor electrode or the second e-pen signal that is coupled from the second e-pen sensor electrode into the second touch sensor electrode. Note that this also involves operating the fourth DSC to process the second touch sensor signal to generate a fourth digital signal that is representative of a fourth electrical characteristic of the second touch sensor electrode.

In addition, certain variants also include processing the third digital signal and the fourth digital signal to determine location of at least one of the first e-pen sensor electrode or the second e-pen sensor electrode based on the interaction of the e-pen with the touch sensor device and also based on a two-dimensional mapping of a touchscreen of the touch sensor device that uniquely identifies an intersection of the first touch sensor electrode and the second touch sensor electrode.

Figure 24:
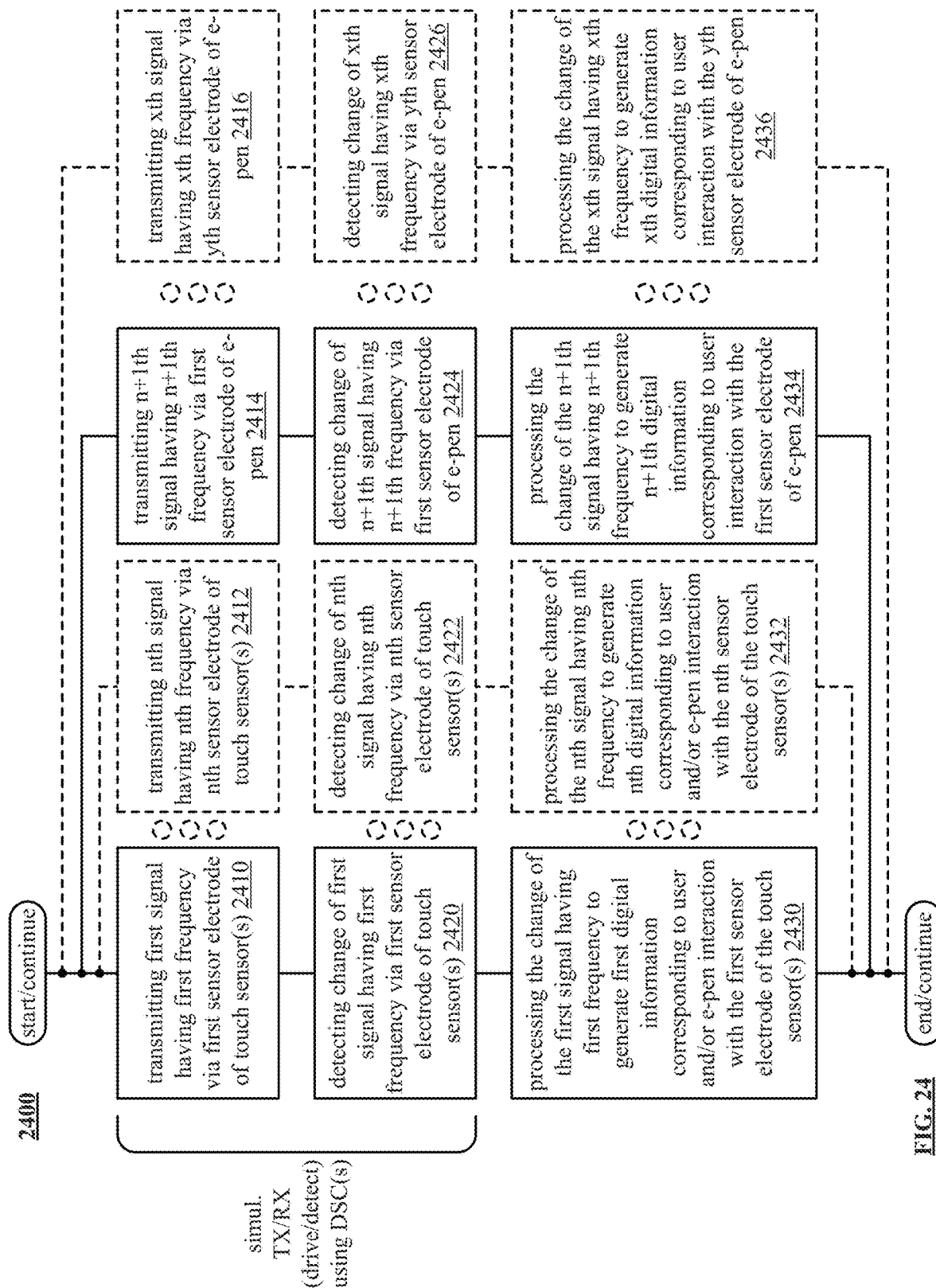
FIG. 24 is a schematic block diagram of another embodiment of a method for execution by one or more devices in accordance with the present invention.

FIG. 24 is a schematic block diagram of another embodiment of a method 2400 for execution by one or more devices in accordance with the present invention. This diagram has similarity to the previous diagram with at least one difference being that more than one signal is driven via more than one sensor electrode of the touch sensors, and more than one signal is driven via more than one sensor electrode of the e-pen. In general, note that any desired number of signals may be simultaneously driven and sensed, and differentiated from one another in frequency, via the respective sensor electrodes of the touch sensors and the e-pen. In this example as well as others, note that more than one e-pen may be operative at a given time in conjunction with a given one or more touch sensors. For example, more than one e-pen associate with more than one user may be interactive and operative with a touch sensor device at a time.

The method 2400 operates in step 2410 by transmitting a first signal having a first frequency via a first sensor electrode of one or more touch sensors. The method 2400 also operates in step 2420 by detecting a change of a first signal having a first frequency via the first sensor electrode of the one or more touch sensors.

The method 2400 continues in step 2430 by processing the change of the first signal having the first frequency to generate digital information corresponding to user interaction and/or e-pen interaction with the first sensor electrode of the one or more touch sensors.

In addition, when multiple sensor electrodes of the one or more touch sensors in implemented in a device (e.g., up to n, where n is a positive integer greater than or equal to 2), similar operations as performed with respect to the first sensor electrode may be performed with respect to the one or more additional sensor electrodes of the one or more touch sensors.

The method 2420 operates in step 2412 by transmitting a nth signal having a nth frequency via a nth sensor electrode of one or more touch sensors. The method 2400 also operates in step 2422 by detecting a change of a nth signal having a nth frequency via the nth sensor electrode of the one or more touch sensors.

The method 2400 continues in step 2432 by processing the change of the nth signal having the nth frequency to generate digital information corresponding to user interaction and/or e-pen interaction with the nth sensor electrode of the one or more touch sensors.

In some examples, note that such operations as depicted within the steps 2410, 2420, and 2430 (and optionally and 2412, 2422, and 2432) may be performed using one or more additional signals and one or more sensor electrodes. For example, in some instances, additional signal having additional frequencies are associated with respective sensor electrodes of an e-pen.

In such examples, the method 2400 also operates in step 2414 by transmitting an nth signal having a nth frequency via a first sensor electrode of an e-pen. The method 2400 also operates in step 2424 by detecting a change of the nth signal having the nth frequency via the first sensor electrode of the e-pen. Note that the operations depicted within the steps 2414 and 2424 may be performed in accordance with any of the variations, examples, embodiments, etc. of one or more DSCs as described herein that is/are configured to perform simultaneous transmit and receipt of signals (simultaneous drive and detect of signals).

The method 2400 continues in step 2434 by processing the change of the nth signal having the nth frequency to generate other digital information corresponding to user interaction with the first sensor electrode of the e-pen.

In addition, when multiple sensor electrodes of the e-pen are implemented (e.g., up to x, where x is a positive integer greater than or equal to (x minus n)), similar operations as performed with respect to the first sensor electrode of the e-pen may be performed with respect to the one or more additional sensor electrodes of the e-pen.

In such examples, the method 2400 also operates in step 2414 by transmitting an xth signal having a xth frequency via a yth sensor electrode of an e-pen (e.g., where x and y are positive integers appropriately selected based on n, n+1, etc.). The method 2400 also operates in step 2424 by detecting a change of the xth signal having the xth frequency via the yth sensor electrode of the e-pen. Note that the operations depicted within the steps 2414 and 2424 may be performed in accordance with any of the variations, examples, embodiments, etc. of one or more DSCs as described herein that is/are configured to perform simultaneous transmit and receipt of signals (simultaneous drive and detect of signals).

The method 2400 continues in step 2434 by processing the change of the xth signal having the xth frequency to generate other digital information corresponding to user interaction with the yth sensor electrode of the e-pen.

In general, note that different respective signals that are simultaneously driven and sensed via the respective sensor electrodes of the touch sensors and/or the e-pen are differentiated in terms of frequency.

Note that the operations depicted within the steps 2410 and 2420, 2422 and 2422, 2414 and 2424, and 2416 and 2426 may be performed in accordance with any of the variations, examples, embodiments, etc. of one or more DSCs as described herein that is/are configured to perform simultaneous transmit and receipt of signals (simultaneous drive and detect of signals).

This two diagram below have some similarities to the previous two diagrams with at least one difference being that the respective e-pen and touch sensor signals are differentiated by one or more characteristics that may include any one or more of frequency, amplitude, DC offset, modulation, modulation & coding set/rate (MCS), forward error correction (FEC) and/or error checking and correction (ECC), type, etc.

Figure 25:
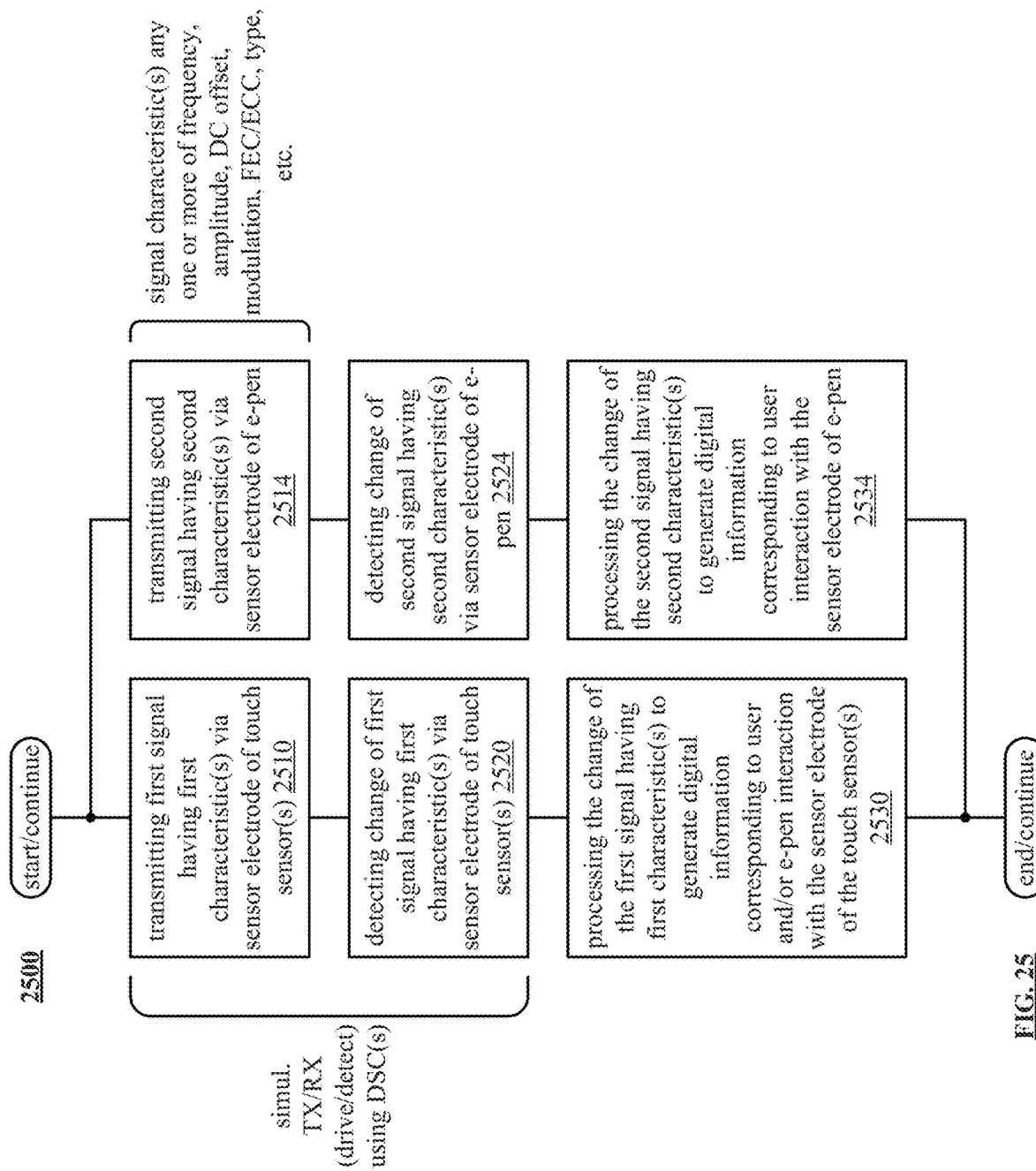
FIG. 25 is a schematic block diagram of another embodiment of a method for execution by one or more devices in accordance with the present invention.

FIG. 25 is a schematic block diagram of another embodiment of a method 2500 for execution by one or more devices in accordance with the present invention. The method 2500 operates in step 2510 by transmitting a first signal having a first one or more characteristics via a sensor electrode of one or more touch sensors. The method 2500 also operates in step 2520 by detecting a change of a first signal having a first one or more characteristics via the sensor electrode of the one or more touch sensors. Note that the operations depicted within the steps 2510 and 2520 may be performed in accordance with any of the variations, examples, embodiments, etc. of one or more DSCs as described herein that is/are configured to perform simultaneous transmit and receipt of signals (simultaneous drive and detect of signals).

The method 2500 continues in step 2530 by processing the change of the first signal having the first one or more characteristics to generate digital information corresponding to user interaction and/or e-pen interaction with the sensor electrode of the one or more touch sensors.

In some examples, note that such operations as depicted within the steps 2510, 2520, and 2530 may be performed using one or more additional signals and one or more sensor electrodes. For example, in some instances, a second signal having a second one or more characteristics is associated with a first sensor electrode of an e-pen. In such examples, the method 2500 also operates in step 2514 by transmitting the second signal having the second one or more characteristics via the first sensor electrode of an e-pen. The method 2500 also operates in step 2524 by detecting a change of the second signal having the second one or more characteristics via the sensor electrode of the e-pen.

The method 2500 continues in step 2534 by processing the change of the second signal having the second one or more characteristics to generate other digital information corresponding to user interaction with the sensor electrode of the e-pen.

As also described elsewhere herein with respect to other examples, embodiments, etc., note that coupling of signals may be performed from sensor electrodes of the e-pen to sensor electrodes of the touch sensors, and vice versa. Detection of signals being coupled from the e-pen to the sensor electrodes of the touch sensors, and vice versa, may be performed by appropriate signal processing including analysis of the digital information corresponding to such user and/or e-pen interaction with the various sensor electrodes. In this method 2500, differentiation between the different respective signals provided via the sensor electrode of the touch sensors and the sensor electrode of the e-pen is made in frequency.

Figure 26:
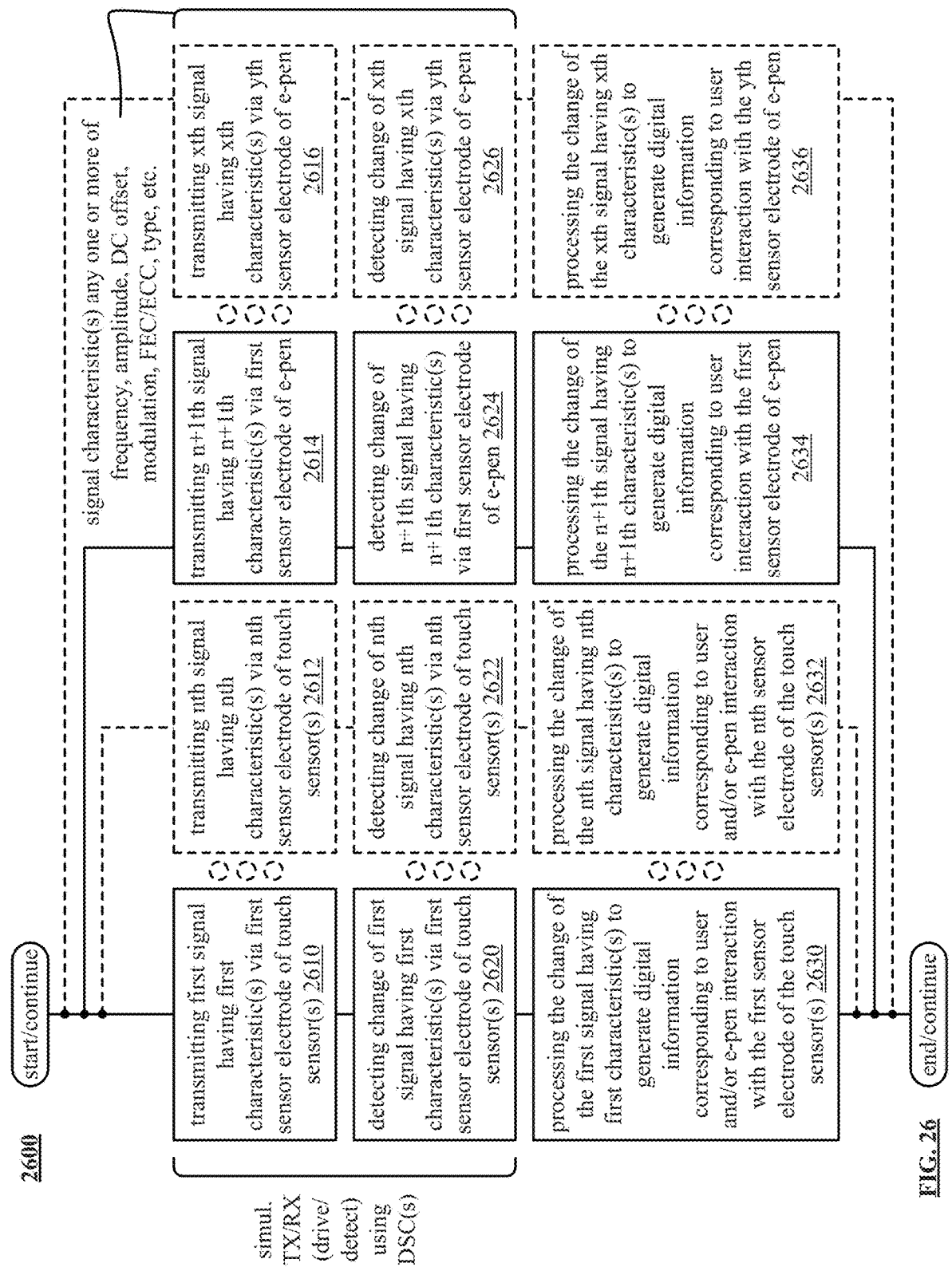
FIG. 26 is a schematic block diagram of another embodiment of a method for execution by one or more devices in accordance with the present invention.

FIG. 26 is a schematic block diagram of another embodiment of a method 2600 for execution by one or more devices in accordance with the present invention. This diagram has similarity to the previous diagram with at least one difference being that more than one signal is driven via more than one sensor electrode of the touch sensors, and more than one signal is driven via more than one sensor electrode of the e-pen. In general, note that any desired number of signals may be simultaneously driven and sensed, and differentiated from one another based on one or more characteristics, via the respective sensor electrodes of the touch sensors and the e-pen. In this example as well as others, note that more than one e-pen may be operative at a given time in conjunction with a given one or more touch sensors. For example, more than one e-pen associate with more than one user may be interactive and operative with a touch sensor device at a time.

The method 2600 operates in step 2610 by transmitting a first signal having a first one or more characteristics via a first sensor electrode of one or more touch sensors. The method 2600 also operates in step 2620 by detecting a change of a first signal having a first one or more characteristics via the first sensor electrode of the one or more touch sensors.

The method 2600 continues in step 2630 by processing the change of the first signal having the first one or more characteristics to generate digital information corresponding to user interaction and/or e-pen interaction with the first sensor electrode of the one or more touch sensors.

In addition, when multiple sensor electrodes of the one or more touch sensors in implemented in a device (e.g., up to n, where n is a positive integer greater than or equal to 2), similar operations as performed with respect to the first sensor electrode may be performed with respect to the one or more additional sensor electrodes of the one or more touch sensors.

The method 2620 operates in step 2612 by transmitting a nth signal having a nth one or more characteristics via a nth sensor electrode of one or more touch sensors. The method 2600 also operates in step 2622 by detecting a change of a nth signal having a nth one or more characteristics via the nth sensor electrode of the one or more touch sensors.

The method 2600 continues in step 2632 by processing the change of the nth signal having the nth one or more characteristics to generate digital information corresponding to user interaction and/or e-pen interaction with the nth sensor electrode of the one or more touch sensors.

In some examples, note that such operations as depicted within the steps 2610, 2620, and 2630 (and optionally and 2612, 2622, and 2632) may be performed using one or more additional signals and one or more sensor electrodes. For example, in some instances, additional signal having additional frequencies are associated with respective sensor electrodes of an e-pen.

In such examples, the method 2600 also operates in step 2614 by transmitting an nth signal having a nth one or more characteristics via a first sensor electrode of an e-pen. The method 2600 also operates in step 2624 by detecting a change of the nth signal having the nth one or more characteristics via the first sensor electrode of the e-pen. Note that the operations depicted within the steps 2614 and 2624 may be performed in accordance with any of the variations, examples, embodiments, etc. of one or more DSCs as described herein that is/are configured to perform simultaneous transmit and receipt of signals (simultaneous drive and detect of signals).

The method 2600 continues in step 2634 by processing the change of the nth signal having the nth one or more characteristics to generate other digital information corresponding to user interaction with the first sensor electrode of the e-pen.

In addition, when multiple sensor electrodes of the e-pen are implemented (e.g., up to x, where x is a positive integer greater than or equal to (x minus n)), similar operations as performed with respect to the first sensor electrode of the e-pen may be performed with respect to the one or more additional sensor electrodes of the e-pen.

In such examples, the method 2600 also operates in step 2614 by transmitting an xth signal having a xth one or more characteristics via a yth sensor electrode of an e-pen (e.g., where x and y are positive integers appropriately selected based on n, n+1, etc.). The method 2600 also operates in step 2624 by detecting a change of the xth signal having the xth one or more characteristics via the yth sensor electrode of the e-pen. Note that the operations depicted within the steps 2614 and 2624 may be performed in accordance with any of the variations, examples, embodiments, etc. of one or more DSCs as described herein that is/are configured to perform simultaneous transmit and receipt of signals (simultaneous drive and detect of signals).

The method 2600 continues in step 2634 by processing the change of the xth signal having the xth one or more characteristics to generate other digital information corresponding to user interaction with the yth sensor electrode of the e-pen.

In general, note that different respective signals that are simultaneously driven and sensed via the respective sensor electrodes of the touch sensors and/or the e-pen are differentiated in terms of one or more characteristics.

Note that the operations depicted within the steps 2610 and 2620, 2622 and 2622, 2614 and 2624, and 2616 and 2626 may be performed in accordance with any of the variations, examples, embodiments, etc. of one or more DSCs as described herein that is/are configured to perform simultaneous transmit and receipt of signals (simultaneous drive and detect of signals).

In addition, it is noted that with respect to any of the various embodiments, examples, etc. described herein and their equivalents, note that there may be instances in which a first at least one signal is simultaneously driven and sensed in accordance with DSC operation as described herein, or its equivalent, while a second at least one signal is only driven or transmitted. For example, note that alternative variations may include situations in which one or more signals are implemented using DSC operation as described, or its equivalent, and one or more other signals are implemented using an alternative technology including only transmission capability. Note that any combination of one or more DSCs in one or more other circuitries implemented to operate two or more signals within a system may be employed in a desired embodiment.

FIG. 27 is a schematic block diagram of an embodiment 2700 of directional mapping determination (e.g., North, South, East, and West (NSEW)) and orientation determination of an e-pen in accordance with the present invention. This diagram shows a user interacting with one or more touch sensors 2710 of the device using an e-pen 2702. With respect to the device that includes the one or more touch sensors 2710, NSEW directionality is shown as North being towards the top, South being for the bottom, West being towards the left, and East being towards the right of the device that includes the one or more touch sensors 2710. Note that alternative types of directionality may be used including those that have different numbers of subdivisions and granularity. For example, with respect to the NSEW directionality described, subdivisions may be included such as a Northwest directionality between North and West, Northeast directionality between North and East, a North Northwest directionality between Northwest and West, etc. In general, any desired directionality and granularity may be used in accordance with such a device. Alternatively, other nomenclature of directionality may be used such as a direction 1, direction 2, direction 3, direction 4, etc.

In an example of operation and implementation, as a user interacts with a device that includes one or more touch sensors 2710 using an e-pen 2702, two different tests are performed in accordance with the e-pen 2702 interaction with the device that includes one or more touch sensors 2710. As described above with respect to other examples, embodiments, etc. note that one or more processing modules, which may include integrated memory and/or be coupled to memory, is in communication with one or more DSCs that are implemented to perform simultaneous driving and sensing of signals via sensor electrodes of the one or more sensors and one or more sensor electrodes of the e-pen 2702.

The first test (test 1) corresponds to determining the e-pen NSEW mapping respect to the device, as shown by reference numeral 2750. The second test (test 2) corresponds to determining the e-pen orientation (e.g., till, angle, etc.), As shown by reference numeral 2760.

Note that these different respective tests may be performed in a variety of different manners. In various examples, the e-pen 2702, the touch sensor device with which the e-pen 2702 is configured to interact, or both the e-pen and the touch sensor device are configured to facilitate the test 1 and test 2.

For example, in one example, one or more processing modules associated with the e-pen 2702 is configured to facilitate both test 1 and test 2. In another example, one or more processing modules associated with the e-pen 2702 is configured to facilitate test 1, and one or more processing modules associated with the touch sensor device is configured to facilitate test 2. In yet another example, one or more processing modules associated with the touch sensor device is configured to facilitate test 1, and one or more processing modules associated with the e-pen 2702 is configured to facilitate test 2. In yet another example, one or more processing modules associated with the touch sensor device is configured to facilitate both test 1 and test 2. In yet another example, one or more processing modules associated with both the e-pen 2702 and the touch sensor device is configured to facilitate both test 1 and test 2. In general, any cooperation of one or more processing modules associated with either the e-pen 2702 or the touch sensor device may be configured to facilitate test 1 and test 2.

As also described elsewhere herein with respect to other embodiments, examples, etc., note that different respective signals may be associated with the different respective electrodes (e.g., row and column electrodes) of the one or more touch sensors 2710 and the sensor electrodes of the e-pen.

In general, the first test associated with the e-pen NSEW mapping determination corresponds to the determination of the respective sensor electrodes of the e-pen 2702 with respect to the touchscreen. For example, this may involve determination of where on the touchscreen the respective signals from the sensor electrodes of the e-pen 2702 are being coupled into the sensor electrodes of the one or more touch sensors 2710.

When information corresponding to the assignment of signals to the respective sensor electrodes of the e-pen 2702 are known, then based on detection of where those signals are being coupled into the touchscreen is determined, the mapping of the respective sensor electrodes of the e-pen 2702 with respect to the NSEW directionality of the touchscreen may be determined.

Note that if the sensor electrode mapping with in the e-pen 2702 is unknown, testing may be performed including coupling a primary signal via a primary sensor electrode of the e-pen 2702 to establish a base/reference location of the e-pen with respect to the touchscreen, and then one or more secondary signals may be coupled via one or more secondary sensor electrodes of the e-pen 2702 to determine the orientation of the e-pen 2702 including where particularly the secondary sensor electrodes are located with respect to the touchscreen. If desired in some embodiments, note that signals may be driven simultaneously via to work more of the sensor electrodes of the e-pen 2702 in accordance with making such determinations. In addition, note that time multiplexed operation may be performed such that the first signal is preliminarily driven via the primary sensor electrode of the e-pen 2702, then a second signal is subsequently driven via a first secondary sensor electrode of the e-pen 2702, and so on such that only one particular signal is driven through one of the sensor electrodes of the e-pen 2702 at a given time in this testing procedure for the e-pen NSEW mapping determination 2750. In such a case when only one particular signal is driven through one of the sensor electrodes of the e-pen 2702 at a given time, then differentiation between that signal and others may not be needed. For example, when only one signal is operated a given time, then differentiation between that signal may be obviated. However, when simultaneous operation is performed by driving more than one signal via more than one sensor electrode of the e-pen 2702, differentiation between the respective signals will facilitate better performance and allow for simultaneous detection and processing. Note that the differentiation between the respective signals may be made using any of the various means described herein including frequency, amplitude, DC offset, modulation, modulation & coding set/rate (MCS), forward error correction (FEC) and/or error checking and correction (ECC), type, etc.

Note also that based on a signal is driven continually via the primary sensor electrode of the e-pen, and based on detection of that signal being coupled into the touchscreen, and based on knowledge of the physical mapping of the secondary sensor electrodes within the e-pen 2702, then by appropriately driving signals via the secondary sensor electrodes of the e-pen in a known manner, accompanied with detection of those signals as they are being coupled into the touchscreen, will provide for the e-pen NSEW mapping determination 2750.

With respect to the second test, the e-pen orientation determination 2760, depending on the orientation, till, angle, etc. of the e-pen relative to the touchscreen service, there will be different capacitance of the sensor electrodes of the e-pen 2702 with respect to the sensor electrodes of the touchscreen. These different capacitances will result in different degrees of capacitive coupling between signals that are transmitted via the sensor electrodes of the e-pen 2702 to the sensor electrodes of the touchscreen. Based on the e-pen NSEW mapping determination 2750, changes and differences of the capacitances between the respective sensor electrodes of the e-pen 2702 as well as between the sensor electrodes of the e-pen 2702 and the sensor electrodes of the touchscreen may be detected based on the simultaneous driving and sensing of signals via these respective electrodes. Once again, note the coupling of signals may be performed not only from the sensor electrodes of the e-pen 2702 to the sensor electrodes of the touchscreen, but also from the sensor electrodes of the touchscreen to the sensor electrodes of the e-pen 2702.

The precision and capability of the simultaneous driving and sensing as may be performed using DSCs as described herein and their equivalents allows for highly accurate detection of particularly which signals are being coupled from the e-pen 2702 to the touchscreen, or vice versa, and also the specific location via which that coupling is being made.

Various methods are described within certain of the following diagrams showing different manners by which the test 1 and test 2 may be implemented. In some examples, certain of the operations are performed using an independent/smart e-pen and/or a dependent e-pen. In other examples, some of the operations are performed using an independent/smart e-pen, while other of the operations are performed using a dependent e-pen. In addition, note that there may be instances in which a handshake, association, etc. between the e-pen and the touch sensor device is performed preliminarily, such as providing feedback from one to the other, or vice versa, though for one or both of the tests is performed. For example, in an implementation in which one or more processing modules associated with the e-pen is implemented to perform processing of the two tests, then, for example, for the first test, the e-pen receives some feedback from the touch sensor device of at least one of the signals to be coupled from the touch sensor device to the e-pen. For example, when the e-pen is to perform identification and processing of signals coupled from the touch sensor device to the e-pen, and based on the e-pen knowing the physical mapping of the sensor electrodes of the e-pen, then the e-pen is then configured to receive those signals and associated them with the physical mapping of the sensor electrodes of the e-pen, process that information in accordance with performing the second step, and then transmit that determined information back to the touch sensor device (e.g., via one or more of the sensor electrodes of the e-pen).

Figure 28:
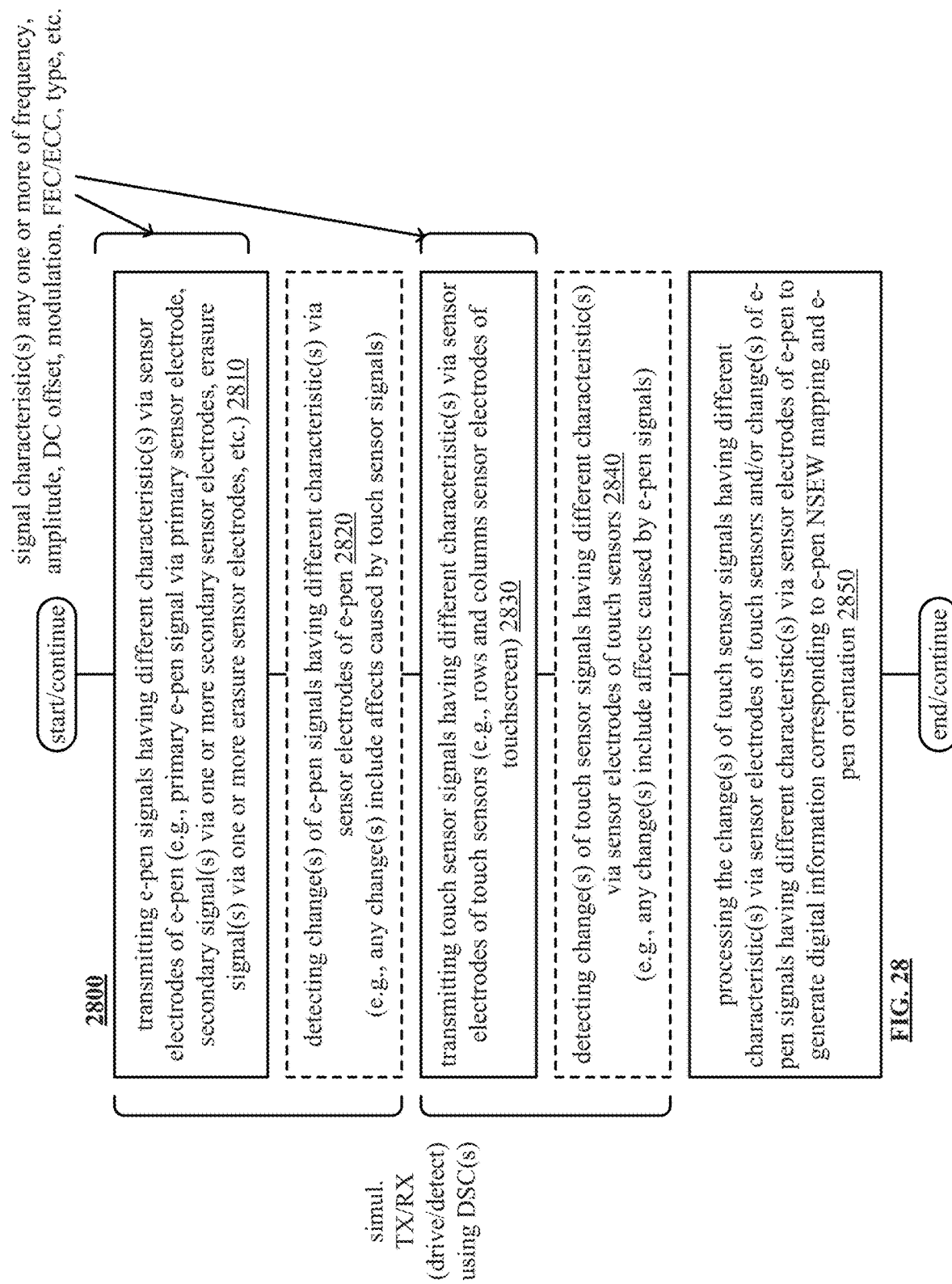
FIG. 28 is a schematic block diagram of another embodiment of a method for execution by one or more devices in accordance with the present invention.

FIG. 28 is a schematic block diagram of another embodiment of a method 2800 for execution by one or more devices in accordance with the present invention. The method 2800 operates in step 2810 by transmitting e-pen signals having different characteristic(s) via sensor electrodes of e-pen (e.g., primary e-pen signal via primary sensor electrode, secondary signal(s) via one or more secondary sensor electrodes, erasure signal(s) via one or more erasure sensor electrodes, etc.).

The method 2800 operates in step 2820 by detecting change(s) of e-pen signals having different characteristic(s) via sensor electrodes of e-pen. note that this also included detection of any change(s) such as those that may include affects caused by touch sensor signals. The method 2800 operates in step 2830 by transmitting touch sensor signals having different characteristic(s) via sensor electrodes of touch sensors (e.g., rows and columns sensor electrodes of touchscreen).

The method 2800 operates in step 2840 by detecting change(s) of touch sensor signals having different characteristic(s) via sensor electrodes of touch sensors (e.g., any change(s) include affects caused by e-pen signals). The method 2800 operates in step 2850 by processing the change(s) of touch sensor signals having different characteristic(s) via sensor electrodes of touch sensors and/or change(s) of e-pen signals having different characteristic(s) via sensor electrodes of e-pen to generate digital information corresponding to e-pen NSEW mapping and e-pen orientation.

Note that the operations depicted within the steps 2810 and 2820, 2830 and 2840, may be performed in accordance with any of the variations, examples, embodiments, etc. of one or more DSCs as described herein that is/are configured to perform simultaneous transmit and receipt of signals (simultaneous drive and detect of signals).

Figure 29:
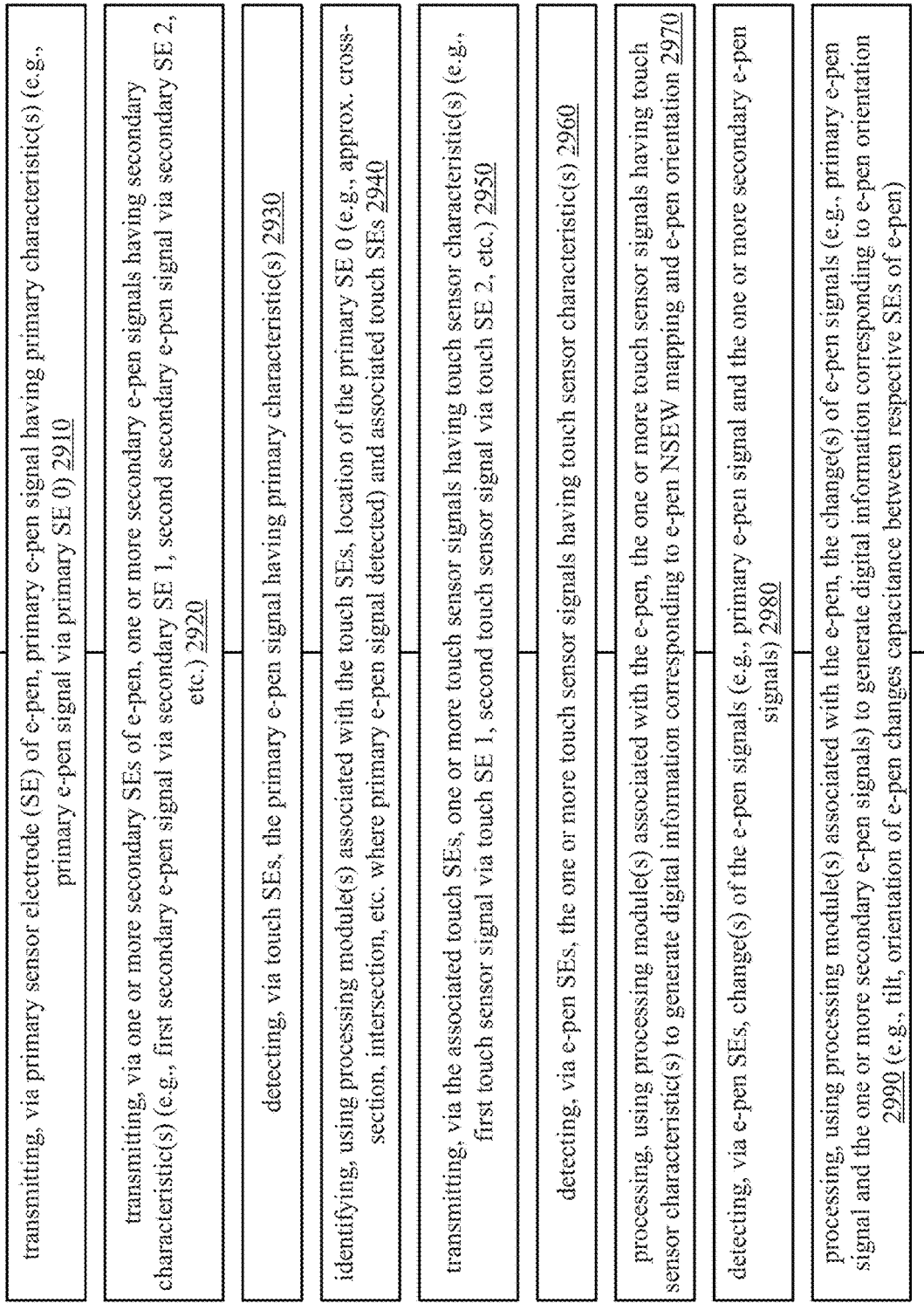
FIG. 29 is a schematic block diagram of another embodiment of a method for execution by one or more devices in accordance with the present invention.

FIG. 29 is a schematic block diagram of another embodiment of a method 2900 for execution by one or more devices in accordance with the present invention. The method 2900 operates in step 2910 by transmitting, via primary sensor electrode of e-pen, primary e-pen signal having primary characteristic(s) (e.g., primary e-pen signal via primary sensor electrode 0). The method 2900 operates in step 2920 by transmitting, via one or more secondary sensor electrodes of e-pen, one or more secondary e-pen signals having secondary characteristic(s) (e.g., first secondary e-pen signal via secondary sensor electrode 1, second secondary e-pen signal via secondary sensor electrode 2, etc.).

The method 2900 operates in step 2930 by detecting, via touch sensor electrodes, the primary e-pen signal having primary characteristic(s). The method 2900 operates in step 2940 by identifying, using processing module(s) associated with the touch sensor electrodes, location of the primary sensor electrode 0 (e.g., approx. cross-section where primary e-pen signal detected) and associated touch sensor electrodes.

The method 2900 operates in step 2950 by transmitting, via the associated touch sensor electrodes, one or more touch sensor signals having touch sensor characteristic(s) (e.g., first touch sensor signal via touch sensor electrode 1, second touch sensor signal via touch sensor electrode 2, etc.).

The method 2900 operates in step 2960 by detecting, via e-pen sensor electrodes, the one or more touch sensor signals having touch sensor characteristic(s). The method 2900 operates in step 2970 by processing, using processing module(s) associated with the e-pen, the one or more touch sensor signals having touch sensor characteristic(s) to generate digital information corresponding to e-pen NSEW mapping and e-pen orientation.

The method 2900 operates in step 2980 by detecting, via e-pen sensor electrodes, change(s) of the e-pen signals (e.g., primary e-pen signal and the one or more secondary e-pen signals).

The method 2900 operates in step 2990 by processing, using processing module(s) associated with the e-pen, the change(s) of e-pen signals (e.g., primary e-pen signal and the one or more secondary e-pen signals) to generate digital information corresponding to e-pen orientation (e.g., tilt, orientation of e-pen changes capacitance between respective sensor electrodes of e-pen).

FIG. 30 is a schematic block diagram of another embodiment of a method 3000 for execution by one or more devices in accordance with the present invention. The method 3000 operates in step 3010 by transmitting, via primary sensor electrode of e-pen, primary e-pen signal having primary characteristic(s) (e.g., primary e-pen signal via primary sensor electrode 0).

The method 3000 operates in step 3020 by transmitting, via one or more secondary e-pen sensor electrodes, one or more secondary e-pen signals having secondary characteristic(s) (e.g., first secondary e-pen signal via secondary sensor electrode 1, second secondary e-pen signal via secondary sensor electrode 2, etc.).

The method 3000 operates in step 3030 by detecting, via electrodes of touch sensors, the first e-pen signal having primary characteristic(s) and at least one of the one or more secondary e-pen signals having secondary characteristic(s).

The method 3000 operates in step 3040 by processing, using processing module(s) associated with the touch sensors, the primary e-pen signal having primary characteristic(s) and at least one of the one or more secondary e-pen signals having secondary characteristic(s) to generate digital information corresponding to e-pen NSEW mapping.

The method 3000 operates in step 3050 by identifying, using processing module(s) associated with the touch sensors, location of the primary sensor electrode based on the sensor electrodes of the touch sensors (e.g., row/column sensor electrodes) and associated touch sensor electrodes (e.g., approx. cross-section of touch sensors where primary first e-pen signal detected).

The method 3000 operates in step 3060 by transmitting, via the associated touch sensor electrodes, one or more touch sensor signals having touch sensor characteristic(s) (e.g., first touch sensor signal via touch sensor electrode 1, second touch sensor signal via touch sensor electrode 2, etc.).

The method 3000 operates in step 3070 by detecting, via the associated touch sensor electrodes, change(s) of the one or more touch sensor signals.

The method 3000 operates in step 3080 by processing, using processing module(s) associated with the touch sensors, change(s) of the one or more touch sensor signals to generate digital information corresponding to e-pen orientation (e.g., tilt, orientation of e-pen changes capacitance between respective sensor electrodes of e-pen).

Figure 31:
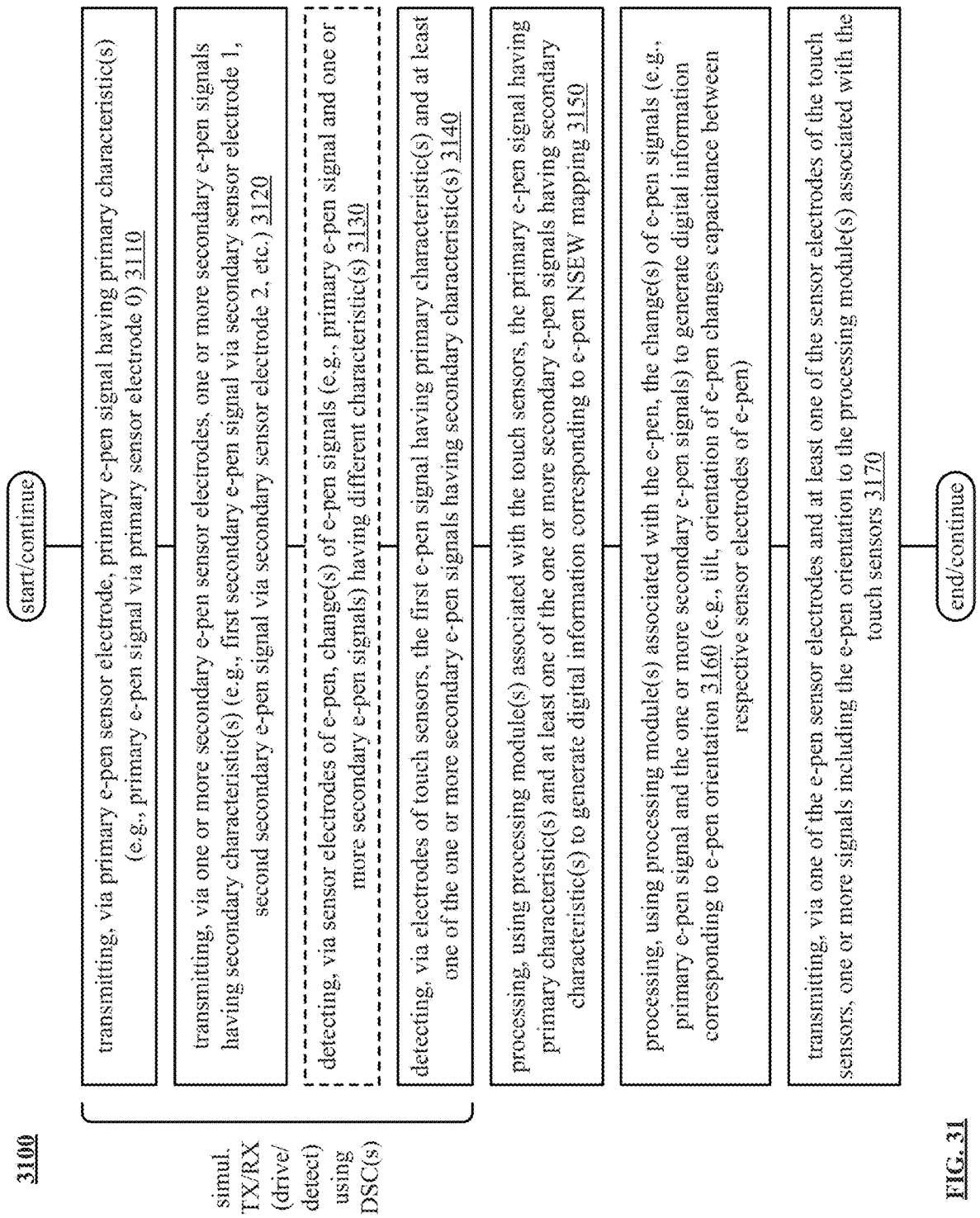
FIG. 31 is a schematic block diagram of another embodiment of a method for execution by one or more devices in accordance with the present invention.

FIG. 31 is a schematic block diagram of another embodiment of a method 3100 for execution by one or more devices in accordance with the present invention. The method 3100 operates in step 3110 by transmitting, via primary e-pen sensor electrode, primary e-pen signal having primary characteristic(s) (e.g., primary e-pen signal via primary sensor electrode 0).

The method 3100 operates in step 3120 by transmitting, via one or more secondary e-pen sensor electrodes, one or more secondary e-pen signals having secondary characteristic(s) (e.g., first secondary e-pen signal via secondary sensor electrode 1, second secondary e-pen signal via secondary sensor electrode 2, etc.).

The method 3100 operates in step 3130 by detecting, via sensor electrodes of e-pen, change(s) of e-pen signals (e.g., primary e-pen signal and one or more secondary e-pen signals) having different characteristic(s).

The method 3100 operates in step 3140 by detecting, via electrodes of touch sensors, the first e-pen signal having primary characteristic(s) and at least one of the one or more secondary e-pen signals having secondary characteristic(s).

The method 3100 operates in step 3150 by processing, using processing module(s) associated with the touch sensors, the primary e-pen signal having primary characteristic(s) and at least one of the one or more secondary e-pen signals having secondary characteristic(s) to generate digital information corresponding to e-pen NSEW mapping. The method 3100 operates in step 3160 by processing, using processing module(s) associated with the e-pen, the change(s) of e-pen signals (e.g., primary e-pen signal and the one or more secondary e-pen signals) to generate digital information corresponding to e-pen orientation (e.g., tilt, orientation of e-pen changes capacitance between respective sensor electrodes of e-pen).

The method 3100 operates in step 3170 by transmitting, via one of the e-pen sensor electrodes and at least one of the sensor electrodes of the touch sensors, one or more signals including the e-pen orientation to the processing module(s) associated with the touch sensors.

Note that the operations depicted within the steps 3110 and 3120, and 3130 and 3140, may be performed in accordance with any of the variations, examples, embodiments, etc. of one or more DSCs as described herein that is/are configured to perform simultaneous transmit and receipt of signals (simultaneous drive and detect of signals).

Figure 32A:
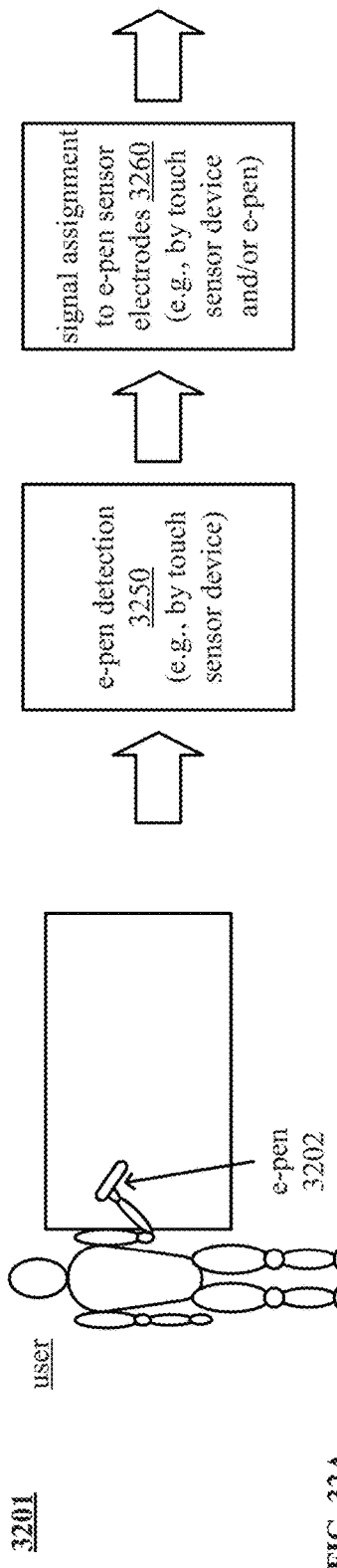
FIG. 32A is a schematic block diagram of an embodiment of signal assignment to signals associated with e-pen sensor electrodes in accordance with the present invention.

FIG. 32A is a schematic block diagram of an embodiment 3201 of signal assignment to signals associated with e-pen sensor electrodes in accordance with the present invention. In general, while certain embodiments, examples, etc. provided herein are described with respect to specific implementations of one or more e-pens (e.g., such that different respective signals are provided to different respective e-pen sensor electrodes), note that, in general, such principles may be applied to any system, computing device, device, etc. that includes more than one sensor electrode that may be used for various applications (e.g., touch sensor, e-pen, etc.). For example, a user that is associated with e-pen 3202 interacts with a touch sensor device that includes one or more touch sensors and that is configured to detect one or more signals from one or more e-pens.

Operation within this diagram includes e-pen detection, as shown by reference numeral 3250, followed by signal assignment to the e-pen sensor electrodes 3260, as shown by reference numeral 3260. Note that the e-pen detection is performed by a touch sensor device in some examples. Note also that the signal assignment to the e-pen sensor electrodes may be performed by the touch sensor device, by the e-pen, or cooperatively by both the touch sensor device and the e-pen in various examples.

In some examples, a handshake, association, etc. between the e-pen and the touch sensor device is performed by which the e-pen 3202 is detected by the touch sensor device, and one or more signals are assigned to the one or more sensor electrodes of the e-pen. In some examples, an association process is performed within a certain time period such as X seconds (e.g., X=500 micro-seconds, 1 milli-seconds, etc.) that allows the touch sensor device and the e-pen to perform various operations including assigning signal(s) to the sensor electrode(s) of the e-pen, learning which signal(s) are assigned to the sensor electrode(s) of the e-pen, etc.

Generally, any signal assignment may be performed to the respective sensor electrodes of the e-pen 3202 based on signals having any of a variety of properties. In some examples, the signals are differentiated based on frequency. In other examples, they are differentiated based on one or more other characteristics including frequency, amplitude, DC offset, modulation, modulation & coding set/rate (MCS), forward error correction (FEC) and/or error checking and correction (ECC), type, etc.

In some examples, when time division multiplex operation is implemented, a given signal may be reused based on it being employed at different times. In an example of operation and implementation, a signal is assigned to a first e-pen sensor electrode and is operative at or during a first time period. Then, those same signal is assigned to a second e-pen sensor electrodes and is operative at or during a second time period.

Alternatively, a first signal is assigned to a first e-pen sensor electrode, and a second signal that is differentiated from the first signal is assigned to a second e-pen sensor electrode, and both the first signal and the second signal operative at or during a first time period. Then, those same signals is assigned to a third and fourth e-pen sensor electrodes and are operative at or during a second time period. When time division multiplex operation is performed, one or more signals may be reused for different sensor electrodes at different times. When simultaneous operation is performed, differentiation between the different respective signals assigned to the different sensor electrodes of the e-pen is performed. Examples of one or more characteristics associated with signals that may be assigned to sensor electrodes of the e-pen may include any one or more of frequency, amplitude, DC offset, modulation, modulation & coding set/rate (MCS), forward error correction (FEC) and/or error checking and correction (ECC), type, etc.

Figure 32B:
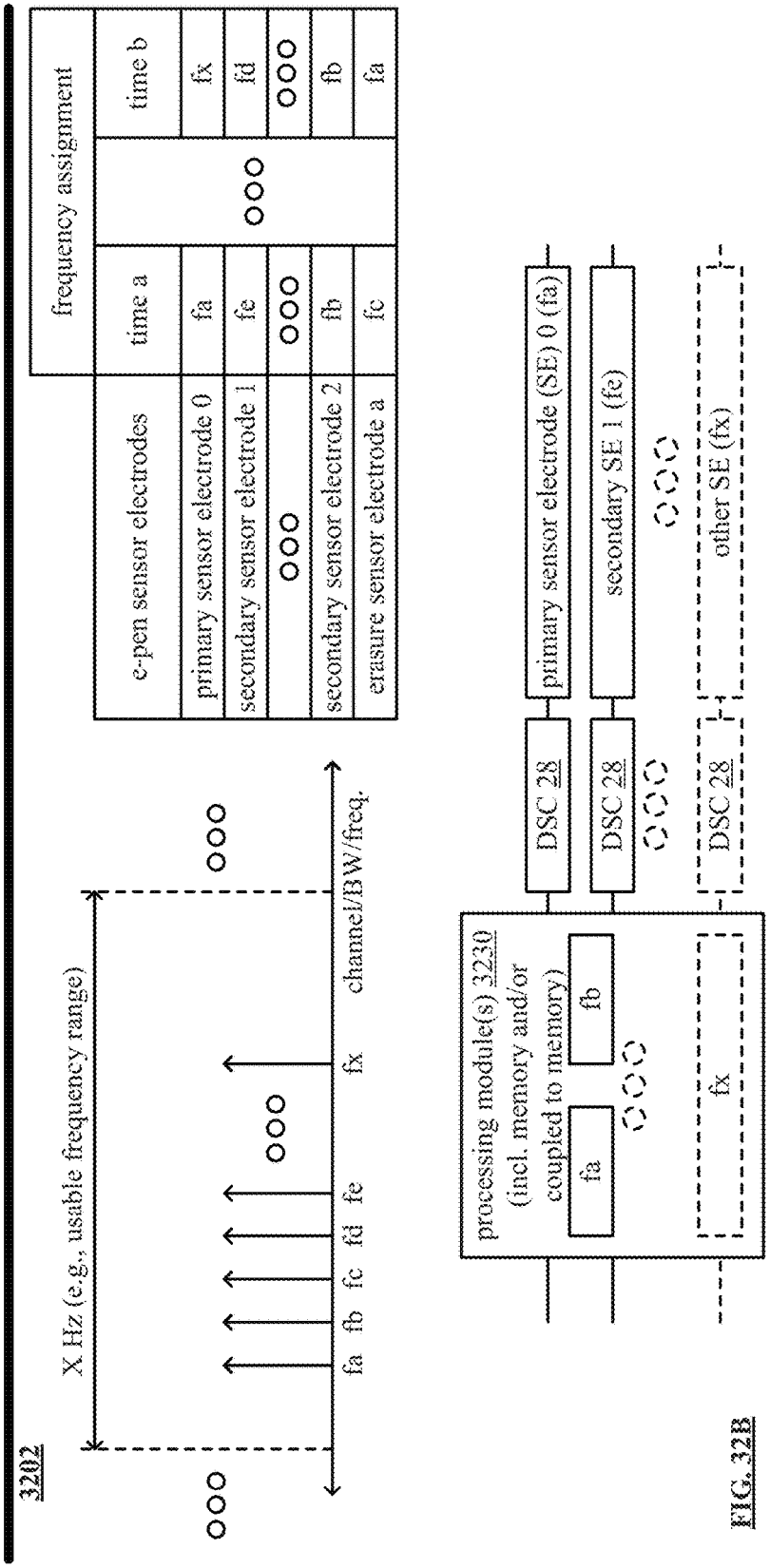
FIG. 32B is a schematic block diagram of an embodiment of frequency assignment to signals associated with e-pen sensor electrodes in accordance with the present invention.

FIG. 32B is a schematic block diagram of an embodiment 3202 of frequency assignment to signals associated with e-pen sensor electrodes in accordance with the present invention. In this diagram, consider a usable frequency range of X Hz (where X may be any desired number and may include frequencies ranging from DC to any frequency within the radio spectrum, such as the radio spectrum including 3 Hz to 3000 GHz/3 THz, and the usable frequency range may be located anywhere within the radio spectrum and may optionally include DC). Generally speaking, such a usable frequency range of X Hz may include any portion of any frequency spectrum via which signaling may be made (e.g., such as varying from DC to any frequency within the radio spectrum, such as varying from DC to frequencies at, near, or within the visible frequency spectrum, etc.).

Within this usable frequency range, consider a number of particular frequencies, shown as fc, fb, and so on up to fx. Based upon a determination of which frequencies within the usable frequency range are available for use, they may be assigned to respective e-pen sensor electrodes. Availability of a particular frequency may be determined based on a number of considerations including whether or not that frequency is being used by a touch sensor device, whether that frequency is problematic such as being susceptible to noise, interference, etc., and/or other considerations. In some examples, a first frequency that is determined to be susceptible to noise, interference, etc. is not selected or used, while a second frequency that is not determined to be susceptible to noise, interference, etc. is selected and used.

In an example of operation and implementation, one or more processing modules 3230 is coupled to drive-sense circuits (DSCs) 28 that are respectively coupled to one or more sensor electrodes. Note that the one or more processing modules 3230 may include integrated memory and/or be coupled to other memory. At least some of the memory stores operational instructions to be executed by the one or more processing modules 3230. For example, the first DSC 28 is coupled to a primary sensor electrode (SE 0), a second DSC 20 is coupled to a first secondary electrode (SE 1), and optionally one or more additional DSCs 28 is coupled to one or more other sensor electrodes.

The one or more processing modules 3230 is configured to identify and perform assignment of different respective signals to the different respective sensor electrodes are it the identification and selection of which signals are to be assigned to which sensor electrodes may be dynamic such that different assignments are made to the different respective sensor electrodes at different times. In certain instances, note that not all of the sensor electrodes have a signal assigned thereto. For example, fewer than all of the sensor electrodes may have a signal assigned to them at a given time.

Considering the example at the right-hand side of the diagram, signal assignment based on frequency is performed dynamically to the respective e-pen sensor electrodes. For example, at or during time a, the frequency fa is assigned to a primary sensor electrode 0 of the e-pen, the frequency fe is assigned to a sensor electrode 1 of the e-pen, and so on as shown is that in the table of the diagram. Then, at or during time b, the frequency fx is assigned to a primary sensor electrode 0 of the e-pen, the frequency fd is assigned to a sensor electrode 1 of the e-pen, and so on as shown is that in the table of the diagram. Note that there may be instances in which a signal having the same frequency is assigned to the same sensor electrode at different times, while signals assigned to another sensor electrode made change in frequency based on assignments made at different times.

Note that while this diagram provides an example of assignment of signals to different respective sensor electrodes of an e-pen based on frequency of the signals, assignment of signals may be made to the different respective sensor electrodes of the e-pen based on a number of different characteristics alternatively to frequency or in combination with frequency. Various examples are included herein including with respect to the following diagrams illustrate assignment of different respective signals having different respective characteristics to different sensor electrodes of an e-pen. In some examples, the assignment is dynamic such that different respective signals having different characteristics are assigned to a given sensor electrode of the e-pen at different times.

FIG. 33A is a schematic block diagram of an embodiment 3301 of forward error correction (FEC)/error checking and correction (ECC) assignment to signals associated with e-pen sensor electrodes in accordance with the present invention. This diagram shows adaptive encoding for different respective signal associated with different respective e-pen sensor electrodes.

In this diagram, one or more processing modules 3330 (which may be implemented to include memory and/or be coupled to memory) is implemented to perform encoding processing using any one or more of different types of FEC codes or ECCs. The one or more processing modules 3330 is configured to generate two or more encoded signals based on the various FEC codes or ECCs. In some examples, two or more encoded signals are based on the same FEC code or ECC. In other examples, two or more encoded signals are based on different FEC codes or ECCs. In this example, at or during a first time, the processor 3330 generates a first encoded signal based on low density parity check (LDPC) code, and a second encoded signal based on Reed-Solomon (RS) code. Generally, any number of additional encoded signals may be generated based on any one or more FEC codes or ECCs (e.g., up to an nth encoded signal based on turbo code).

Note that these encoded signals subsequently are provided respective to one or more DSCs 28 that are in communication with one or more sensor electrodes. In an example of operation and implementation, a first encoded signal is provided via a first DSC 28 to a primary sensor electrode (SE) 0. In some examples, this first encoded signal is an LDPC coded signal. Also, a second encoded signal is provided via a second DSC 28 to a secondary SE 1. In some examples, this second encoded signal is an RS coded signal. if desired in some embodiments, an nth (e.g., where n is a positive integer greater than or equal to 3) encoded signal is provided via an nth DSC 28 to another SE. In some examples, this nth encoded signal is a turbo coded signal.

FIG. 33B is a schematic block diagram of another embodiment 3302 of FEC/ECC assignment to signals associated with e-pen sensor electrodes in accordance with the present invention. The operations of this diagram may be viewed as being at or during a different time than the first time of FIG. 33A. Based on one or more considerations, the one or more processing modules 3330 adapts one or more of the FEC codes or ECCs used to generate the two or more encoded signals. For example, based on the one or more considerations, the one or more processing modules 3330 selects different one or more FEC codes or ECCs to generate the two or more encoded signals.

In an example of operation and implementation, at or during a second time, the one or more processing modules 3330 generates the first encoded signal based on BCH (Bose and Ray-Chaudhuri, and Hocquenghem) code, the second encoded signal based on RS code, and an nth encoded signal based on turbo code. Generally speaking adaptation between different FEC codes or ECCs may be made for the various encoded signals at different times based on different criteria.

FIG. 34A is a schematic block diagram of an embodiment 3401 of different types of modulations or modulation coding sets (MCSs) used for modulation of different bit or symbol streams. In this diagram, different types of modulations or modulation coding sets (MCSs) used for modulation of different bit or symbol streams. Information, data, signals, etc. may be modulated using various modulation coding techniques. Examples of such modulation coding techniques may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.).

Generally speaking, and considering a communication system type implementation including at least two devices (e.g., a transmitting device and a recipient device), a device that generates two or more transmission streams based on different parameters can generate a first transmission stream based on a first at least one parameter such as a first MCS that is relatively more robust and provides for relatively lower throughput than a second transmission stream based on a second at least one parameter such as a second MCS that is relatively less robust and provides for relatively higher throughput. Relatively lower-ordered modulation/MCS (e.g., relatively fewer bits per symbol, relatively fewer constellation points per constellation, etc.) may be used for the first transmission stream to ensure reception by a recipient device and so that the recipient device can successfully recover information therein (e.g., being relatively more robust, easier to demodulate, decode, etc.). Relatively higher-ordered modulation/MCS (e.g., relatively more bits per symbol, relatively more constellation points per constellation, etc.) may be used for the second transmission stream so that any recipient device that can successfully recover information there from can use it as well. This second information within the second transmission stream may be separate and independent from first information included within the first transmission stream or may be intended for use in conjunction with the first information included within the first transmission stream.

FIG. 34B is a schematic block diagram of an embodiment 3402 of different labeling of constellation points in a constellation. This diagram includes an example of different labeling of constellation points in a constellation. This diagram uses an example of a QPSK/QAM shaped constellation having different labeling of the constellation points therein that may be used at different times. In an example operation, a device generates a transmission stream based on the labeling 1 at or during a first time and based on the labeling 2 at or during a second time. The particular labeling of constellation points within a constellation is one example of a parameter that may be used to generate a transmission stream and that may change and vary over time.

FIG. 34C is a schematic block diagram of an embodiment 3403 of different arrangements of constellation points in a type of constellation. This diagram includes different arrangements of constellation points in a type of constellation. This diagram also uses an example of a QPSK/QAM shaped constellation but with varying placement of the four constellation points based on different forms of QPSK (e.g., QPSK1, QPSK2, and QPSK3). Note that the relative distance of the four constellation points may be scaled differently at different times, yet such that each constellation point is included within a separate quadrant. Comparing QPSK2 to QPSK1, the constellation points of QPSK2 are relatively further from the origin than QPSK1. Comparing QPSK3 to QPSK2, the constellation points of QPSK3 are shifted up or down relative to QPSK2.

Note that any other type of shape of constellation may similarly be varied based on the principles described with respect to FIG. 34B and FIG. 34C. For example, the labeling and or placement of the constellation points within an 8-PSK type constellation, a 16 QAM type constellation, and/or any other type constellation may change in very as a function of time based on any desired consideration as well.

FIG. 34D is a schematic block diagram of an embodiment 3404 of adaptive symbol mapping/modulation for different transmission streams. This diagram includes adaptive symbol mapping/modulation for different transmission streams. In this diagram, one or more processing modules 3430 of a device is/are implemented to perform symbol mapping or modulation based on different modulations, symbol mappings, MCSs, etc. at or during different times. In some examples, two or more encoded streams are based on the same modulation, symbol mapping, MCS, etc. In other examples, two or more encoded streams are based on different modulations, symbol mappings, MCSs, etc. In this example, at or during a first time, the one or more processing modules 3430 generates a first symbol stream based on a first QAM/QPSK mode (e.g., QPSK1 of FIG. 34C) and a second symbol stream based on a second QAM/QPSK mode (e.g., QPSK2 of FIG. 34C). Generally, any number of additional symbol streams may be generated based on any one or more modulations, symbol mappings, MCSs, etc. (e.g., up to an nth symbol stream based on 16 QAM).

In an example of operation and implementation, a first signal having a first modulation provided via a first DSC 28 to a primary SE 0. In some examples, this first modulated signal is a $1^{st}$ QAM signal (e.g., QAM1/QPSK1). Also, a second signal is provided via a second DSC 28 to a secondary SE 1. In some examples, this second signal is a $2^{nd}$ QAM signal (e.g., QAM2/QPSK2). if desired in some embodiments, an nth (e.g., where n is a positive integer greater than or equal to 3) signal is provided via an nth DSC 28 to another SE. In some examples, this nth encoded signal is a 16 QAM signal.

In general, note that any number, type, etc. of various modulations and/or MCSs may be implemented and used by the one or more processing modules 3430. Also, note that characteristics of a particular type of modulation may be varied to generate different variants of a common type of modulation (e.g., using different constellation point labeling/mapping such as with respect to FIG. 34B as applied for QPSK and such principles may be applied to any type, shape, etc. modulation, differently located constellation points such as with respect to FIG. 34E as applied for QPSK and such principles may be applied to any type, shape, etc. modulation, etc.)

In addition, note that alternative forms of modulation may be used such as frequency-shift keying (FSK) (e.g., a frequency modulation scheme using discrete frequency changes of a carrier signal/wave in accordance with a frequency modulation, a simplest form of which is binary FSK using a pair of frequencies corresponding to binary information [e.g., first frequency for transmitting 0s and second frequency for transmitting 1s], such a scheme may be used in a continuous time, very fast signaling approach, such as in a multi-frequency analog system, in which multiple continuous transmission may be performed over carrier(s), etc.), multiple frequency-shift keying (MFSK) (e.g., a variant of FSK using two or more frequency, e.g., such as being an M-ary orthogonal modulation, where M is a positive integer), amplitude-shift keying (ASK) (e.g., an amplitude modulation implemented to represent digital data based on changes of the amplitude in a carrier signal/wave), etc. and/or any other form of analog modulation, digital modulation, hierarchical modulation, etc.

FIG. 34E is a schematic block diagram of an embodiment 3405 of adaptive symbol mapping/modulation for different transmission streams. This diagram includes adaptive symbol mapping/modulation for different transmission streams. The operations of this diagram may be viewed as being at or during a different time than the first time of FIG. 34D. Based on one or more considerations, the one or more processing module 3430 adapts one or more of the modulations, symbol mappings, MCSs, etc. used to generate the two or more symbol streams. For example, based on feedback provided from a recipient device to which the two or more encoded streams of FIG. 6D have been transmitted, the one or more processing module 3430 selects different one or more modulations, symbol mappings, MCSs, etc. to generate the two or more symbol streams. In this example, at or during a second time, the one or more processing module 3430 generates the first symbol stream based on 16 QAM, the second symbol stream based on 64 QAM, and optional an nth symbol stream based on 256 QAM.

In an example of operation and implementation, at or during a second time, the one or more processing modules 3430 generates a first symbol stream based on 16 QAM and a second symbol stream based on 64 QAM. Generally, any number of additional symbol streams may be generated based on any one or more modulations, symbol mappings, MCSs, etc. (e.g., up to an nth symbol stream based on 256 QAM).

FIG. 35 is a schematic block diagram of another embodiment of a method 3500 for execution by one or more devices in accordance with the present invention. The method 3500 begins in step 3510 by monitoring for an e-pen. In some examples, this is performed using a touch sensor device. For example, one or more processing modules implemented within a touch sensor device or operative with the touch sensor device is configured to perform processing of signals associated with monitoring for the e-pen. For example, the one or more processing modules is configured to perform monitoring for one or more signals being coupled from one or more sensor electrodes of an e-pen to the row and column electrodes of the touchscreen.

Then, based on no detection of an e-pen in step 3520, the method 3500 loops back to the step 3510 to continue monitoring for an e-pen. Alternatively, based on detection of an e-pen in step 3520, the method 3500 branches to step 3530 and operates by determining signal availability. For example, the determination of signal availability may be made based upon a variety of considerations. In some examples, one or more signal characteristics (e.g., frequency, amplitude, DC offset, modulation, modulation & coding set/rate (MCS), forward error correction (FEC) and/or error checking and correction (ECC), type, etc.) of one or more signals being used is considered as the basis, at least in part, by which signal availability is determined. In other examples, one or more signals not being used by one or more e-pens and/or the touch sensor device is the basis, at least in part, by which signal availability is determined. Generally speaking, signal availability determination is based on determining which signals may be available to be used within the system. For example, those signals that are not currently being used and are available may be selected and used for one or more purposes.

The method 3500 also operates in step 3540 by assigning one or more signals to e-pen sensor electrodes based on the signal availability that is determined. For example, in an implementation in which the e-pen does not have specific signals already assigned and associated with the e-pen sensor electrodes therein, dynamic assignment of one or more signals, among those signals that are available, may be made to the e-pen sensor electrodes. This assigning operation is performed by the touch sensor device and is communicated to the e-pen. The method 3500 also operates in step 3550 by operating the e-pen and/or the touch sensor device based on the assigned signals.

This method 3500 provides a means by which different respective signals may be assigned for various purposes within an e-pen and touch sensor device system based on signal availability. Note that adaptation and reassignment of signals may be made at different times and based on various considerations. For example, based on a determination that operation using a first one or more assigned signals compares unfavorably to one or more performance criteria (e.g., poor performance, noise, noisy signaling, interference, latency, etc.), then different assignment of signals may be made for subsequent operation of the e-pen and/or the touch sensor device.

Figure 36:
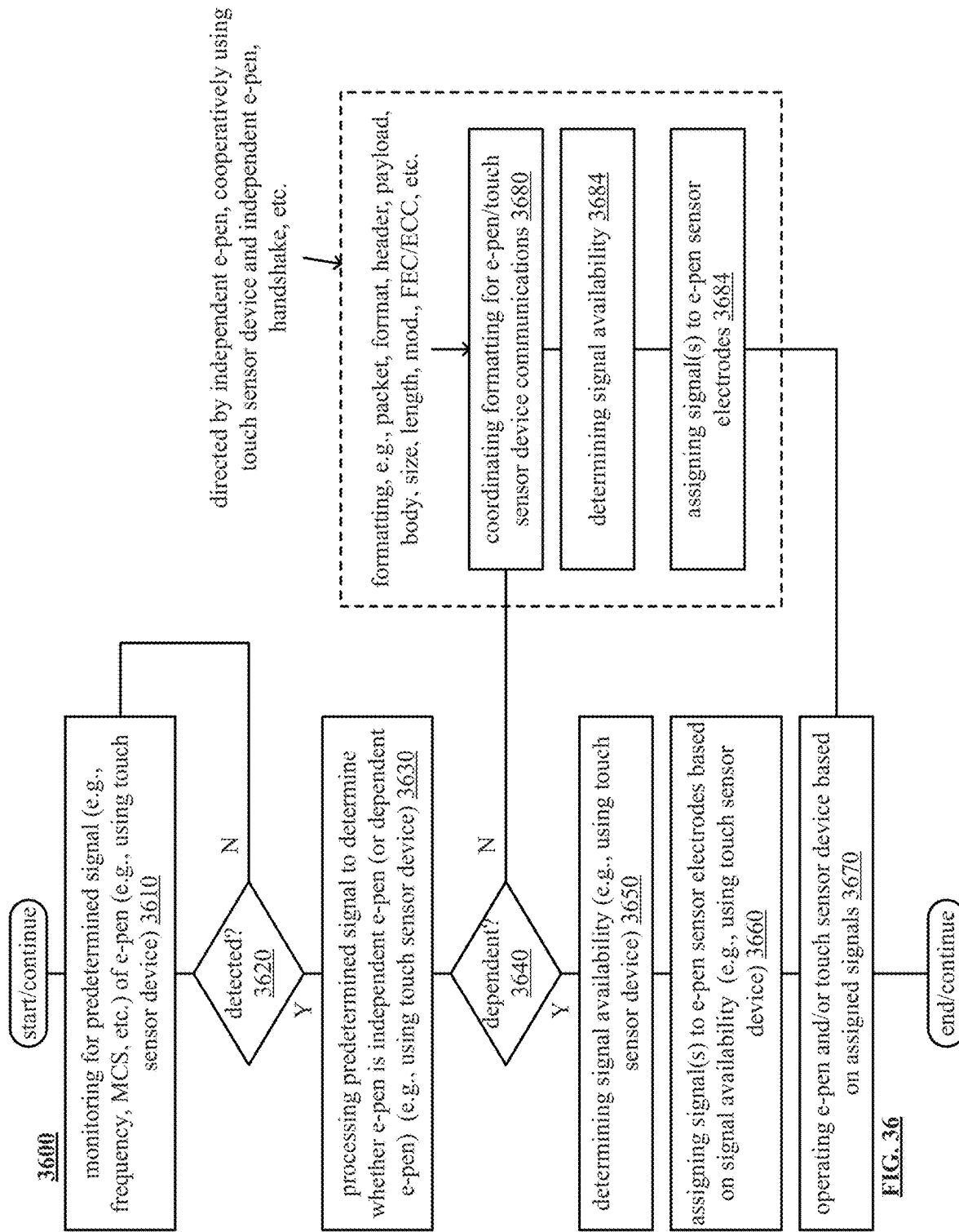
FIG. 36 is a schematic block diagram of another embodiment of a method for execution by one or more devices in accordance with the present invention.

FIG. 36 is a schematic block diagram of another embodiment of a method 3600 for execution by one or more devices in accordance with the present invention. The method 3600 operates in step 3610 by monitoring for a predetermined signal of an e-pen. For example, the predetermined signal may be a signal having any one or more predetermined characteristics such as frequency, amplitude, DC offset, modulation, modulation & coding set/rate (MCS), forward error correction (FEC) and/or error checking and correction (ECC), type, etc.

Based on no detection of the predetermined signal in step 3620, the method 3600 loops back to step 3610 to continue monitoring for the predetermined signal. Alternatively, based on detection of the predetermined signal in step 3620 this method 3600 branches to step 3630 and operates by processing the predetermined signal to determine whether an e-pen associated with the predetermined signal is an independent e-pen. Examples of different types of e-pens include independent e-pens and dependent e-pens. Generally speaking, an independent e-pen may be viewed as an e-pen that is a smart e-pen and that includes intelligence and associated processing capability therein. In some examples, an independent e-pen includes one or more processing modules that may include integrated memory and/or be coupled to other memory. At least some of the memory stores operational instructions to be executed by the one or more processing modules. Generally speaking, a dependent e-pen may be viewed as an e-pen the that is not a smart e-pen and that does not include intelligence and associated processing capability therein.

Based on a determination that the e-pen is an independent e-pen in step 3640, the method 3600 branches to perform various operations associated with independent e-pen/smart e-pen operation. For example, determination of formatting of information to be provided via communications between the e-pen and the touch sensor device is made. For example, the method 3600 operates in step 3680 by coordinating formatting for e-pen/touch sensor device communications. Examples of formatting information related to communications between the e-pen and the touch sensor device may include any one or more of packet type, format, header format, payload, body, size, length, modulation, FEC/ECC, etc. Such determination may include the number of bits or bytes of the packet (e.g., 4-bits, 16-bits, etc.), the number of bits or bytes of various portions of the packet including different respective fields, information related to interpretation of the respective fields of packet used in those communication, etc.

Details regarding the type of communications provided between the e-pen and the touch sensor device may be performed in a variety of ways. In one example, they are determined independently by an independent e-pen and communicated to the touch sensor device. In another example, they are determined cooperatively by both the touch sensor device and the independent e-pen. For example, this may be performed based on a handshake between the e-pen and the touch sensor device.

When operating based on this path of the method 3600, the method 3600 also operates in step 3684 by determining signal availability. This availability is performed by an independent e-pen or cooperatively using the touch sensor device and the independent e-pen. The signal availability is based on a number of factors as described herein including information regarding those signals already assigned to or in use by the touch sensor device, favorable or unfavorable comparison to one or more performance criteria (e.g., poor performance, noise, noisy signaling, interference, latency, etc.), etc. Then, based on one or more signals being available for use, the method 3600 operates in step 3684 by assigning one or more of those signals to the one or more e-pen sensor electrodes. This assigning operation is performed by an independent e-pen or cooperatively using the touch sensor device and the independent e-pen.

Alternatively, based on a determination that the e-pen is a dependent e-pen in step 3640, the method 3600 branches to step 3650 and operates by determining signal availability. For example, the determination of signal availability may be made based upon a variety of considerations. In some examples, one or more signal characteristics (e.g., frequency, amplitude, DC offset, modulation, modulation & coding set/rate (MCS), forward error correction (FEC) and/or error checking and correction (ECC), type, etc.) of one or more signals being used is considered and is the basis, at least in part, by which signal availability is determined. In other examples, one or more signals not being used by one or more e-pens and/or the touch sensor device is the basis, at least in part, by which signal availability is determined. Generally speaking, signal availability determination is based on determining which signals may be available to be used within the system. For example, those signals that are not currently being used and are available may be selected and used for one or more purposes.

The method 3600 also operates in step 3660 by assigning one or more signals to e-pen sensor electrodes based on the signal availability that is determined. For example, in an implementation in which the e-pen does not have specific signals already assigned and associated with the e-pen sensor electrodes therein, dynamic assignment of one or more signals, among those signals that are available, may be made to the e-pen sensor electrodes. This assigning operation is performed by the touch sensor device and is communicated to the dependent e-pen. The method 3600 also operates in step 3670 by operating the e-pen and/or the touch sensor device based on the assigned signals.

FIG. 37 is a schematic block diagram of another embodiment of a method 3700 for execution by one or more devices in accordance with the present invention. The method 3700 begins in step 3710 by monitoring for an e-pen. In some examples, this is performed using a touch sensor device. For example, one or more processing modules implemented within a touch sensor device or operative with the touch sensor device is configured to perform processing of signals associated with monitoring for the e-pen. For example, the one or more processing modules is configured to perform monitoring for one or more signals being coupled from one or more sensor electrodes of an e-pen to the row and column electrodes of the touchscreen.

Then, based on no detection of an e-pen in step 3720, the method 3700 loops back to the step 3710 to continue monitoring for an e-pen. Alternatively, based on detection of an e-pen in step 3720, the method 3700 branches to step 3730 and operates by processing the e-pen signal that is detected to determine whether the e-pen signal corresponds to write or erase operation. For example, based on assignment of different respective signals to different respective sensor electrodes of an e-pen, detection, processing, and analysis of a signal will provide information regarding whether or not the e-pen signal corresponds to write or erase operation. For example, different respective sensor electrodes of an e-pen are implemented for various operation including write and/or erase operation. When a signal is detected, and that signal corresponds to a sensor electrode of the e-pen implemented for write operation, then the e-pen signal is determined to correspond to write operation. Alternatively, when a signal is detected, and that signal corresponds to a sensor electrode of the e-pen implemented for read operation, then the e-pen signal is determined to correspond to read operation.

The method 3700 continues via step 3740 and branches to step 3750 by processing the e-pen signal based on write operation based on a determination that the e-pen signal corresponds to write operation. The method 3700 continues via step 3740 and step 3760 and branches to step 3760 by processing the e-pen signal based on erase operation based on a determination that the e-pen signal corresponds to erase operation.

Alternatively, based on a failure to determine whether the e-pen signal corresponds to write or erase operation, the method 3700 continues via step 3740 and step 3760 and ends. In an alternative implementation, the method 3700 continues via step 3740 and step 3760 and loops back to the step 3710 or the step 3730 to continue monitoring foreign e-pen signal (step 3710) or alternatively processing that e-pen signal to determine whether the e-pen signal corresponds to write or erase operation (step 3730). For example, a failure in processing of the e-pen signal may result in a failure to perform proper identification of the e-pen signal corresponding to write or erase operation. Additional processing, reprocessing, etc. of the e-pen signal may result in proper determination of the correspondence of the e-pen signal.

In some alternative embodiments of the various methods, systems, devices, etc. described herein, note that all touch sensing related processing is performed using the one or more processing modules included within a sensor device or associated with the touch sensor device, and all e-pen related processing is performed using one or more processing modules of the e-pen or that are associated with the e-pen.

In other alternative embodiments of the various methods, systems, devices, etc. described herein, note that all touch sensing related processing as well as e-pen related processing is performed using the one or more processing modules included within a sensor device or associated with the touch sensor device.

In yet other alternative embodiments of the various methods, systems, devices, etc. described herein, note that all touch sensing related processing as well as e-pen related processing is performed using the one or more processing modules of the e-pen or that are associated with the e-pen.

In further alternative embodiments of the various methods, systems, devices, etc. described herein, note that the touch sensing related processing and the e-pen related processing is distributed among one or more processing modules included within a sensor device or associated with the touch sensor device and/or one or more processing modules of the e-pen or that are associated with the e-pen (e.g., in a hybrid implementation in which some processing for each of the touch sensing related processing and the e-pen related processing is performed in a distributed manner involving one or both of one or more processing modules corresponding to the touch sensor device and/or the e-pen).

In addition, note that the functionality, methods, operations, capability, etc. described in associated with the various embodiments, examples, etc. and/or their equivalents may be performed in a variety of different ways. In certain limitations, one or more processing modules is/are coupled to one or more drive-sense circuits (DSCs). Note that the one or more processing modules may include integrated memory and/or be coupled to other memory. At least some of the memory stores operational instructions to be executed by the one or more processing modules. In some examples, one or more of the DSCs generates digital information corresponding to one or more signals being simultaneously transmitted and sensed to one or more elements (e.g., such as to e-pen sensor electrodes, touch sensor electrodes, etc. and via single respective lines via which both transmission and sensing is performed simultaneously).

Note that such one or more processing modules may also be in communication with and interact with one or more other elements in a given implementation. For example, one or more processing modules may be in communication with one or more other processing modules via various communication means (e.g., communication links, communication networks, etc.). Certain of the various functionality, methods, operations, capability, etc. described in associated with the various embodiments, examples, etc. and/or their equivalents as described herein may be implemented using appropriately connected one or more processing modules, DSCs, sensors (e.g., such as e-pen sensor electrodes, touch sensor electrodes, etc.). The one or more processing modules is configured to process one or more digital signals, provided from the one or more DSCs, that a representative of one or more electrical characteristics of the one or more elements of via which one or more signals are simultaneously driven and sensed (simultaneously transmitted and received) from the one or more DSCs.

For example, considering a physical imitation in which one or more processing modules is in communication with one or more DSCs that are in communication with one or more e-pen sensor electrodes, touch sensor electrodes, sensors, transducers, etc., appropriate operation of the one or more DSCs, such as may be directed by the one or more processing modules or cooperatively performed with the one or more processing modules, facilitates implementation of various embodiments, examples, etc. and/or their equivalents as described herein.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system including an electronic pen (e-pen) and a touch sensor device comprising:
    the e-pen that includes one or more e-pen sensor electrodes;
    the touch sensor device including a drive-sense circuit (DSC) operably coupled to a touch sensor electrode of the touch sensor device via a single line, wherein, when enabled, the DSC configured to:
        drive a touch sensor signal via the single line coupling to the touch sensor electrode of the touch sensor device and simultaneously sense, via the single line, change of the touch sensor signal based on interaction of the e-pen with the touch sensor electrode of the touch sensor device; and
        process the change of the touch sensor signal to generate a digital signal that is representative of an electrical characteristic of the touch sensor electrode;
    a memory that stores operational instructions; and
    a processing module operably coupled to the DSC and to the memory, wherein, when enabled, the processing module is configured to execute the operational instructions to:
        process the digital signal to detect the interaction of the e-pen with the touch sensor electrode of the touch sensor device and to determine whether the e-pen is an independent e-pen or a dependent e-pen that is dependent on the touch sensor device;
        based on a determination that the e-pen is the dependent e-pen that is dependent on the touch sensor device, determine availability of one or more signals to be assigned to the one or more e-pen sensor electrodes to facilitate communication between the e-pen and the touch sensor device; and
        assign at least one of the one or more signals that is determined to be available to the one or more e-pen sensor electrodes to facilitate communication between the e-pen and the touch sensor device.

2. The system of claim 1, wherein, when enabled, the processing module is further configured to execute the operational instructions to:
    assign a first signal that is determined to be available to a first e-pen sensor electrode of the one or more e-pen sensor electrodes to facilitate communication between the e-pen and the touch sensor device; and
    assign a second signal that is determined to be available to a second e-pen sensor electrode of the one or more e-pen sensor electrodes to facilitate communication between the e-pen and the touch sensor device.

3. The system of claim 2, wherein, when enabled, the processing module is further configured to execute the operational instructions to:
    after communication between the e-pen and the touch sensor device based on the first signal being assigned to the first e-pen sensor electrode, assign a third signal that is determined to be available to the first e-pen sensor electrode to facilitate communication between the e-pen and the touch sensor device; and
    after communication between the e-pen and the touch sensor device based on the second signal being assigned to the second e-pen sensor electrode, assign a fourth signal that is determined to be available to the second e-pen sensor electrode to facilitate communication between the e-pen and the touch sensor device.

4. The system of claim 2, wherein, when enabled, the e-pen is further configured to:
    transmit first information to the touch sensor device using the first signal; and
    transmit second information to the touch sensor device using the second signal.

5. The system of claim 4, wherein:
    the first signal includes a first frequency; and
    the second signal includes a second frequency.

6. The system of claim 4, wherein:
    the first signal includes at least one of a first amplitude, a first direct current (DC) offset, a first modulation, a first modulation & coding set/rate (MCS), or a first forward error correction (FEC); and
    the second signal includes at least one of a second amplitude, a second DC offset, a second modulation, a second MCS, or a second FEC.

7. The system of claim 1, when enabled, the processing module is further configured to execute the operational instructions to:
    based on a determination that the e-pen is the independent e-pen, facilitate operation of the touch sensor device to operate cooperatively with the independent e-pen to assign at least one of one or more signals that is determined to be available to one or more e-pen sensor electrodes to facilitate communication between the e-pen and the touch sensor device.

8. The system of claim 7, wherein, when enabled, the touch sensor device is further configured to operate cooperatively with the independent e-pen to:
    assign a first signal that is determined to be available to a first e-pen sensor electrode to facilitate communication between the e-pen and the touch sensor device; and
    assign a second signal that is determined to be available to a second e-pen sensor electrode to facilitate communication between the e-pen and the touch sensor device.

9. The system of claim 8, wherein, when enabled, the touch sensor device is further configured to operate cooperatively with the independent e-pen to:
    after communication between the e-pen and the touch sensor device based on the first signal being assigned to the first e-pen sensor electrode, assign a third signal that is determined to be available to the first e-pen sensor electrode to facilitate communication between the e-pen and the touch sensor device; and
    after communication between the e-pen and the touch sensor device based on the second signal being assigned to the second e-pen sensor electrode, assign a fourth signal that is determined to be available to the second e-pen sensor electrode to facilitate communication between the e-pen and the touch sensor device.

10. The system of claim 8, wherein, when enabled, the e-pen is further configured to:
    transmit first information to the touch sensor device using the first signal; and
    transmit second information to the touch sensor device using the second signal.

11. The system of claim 10, wherein:
the first signal includes a first frequency; and
the second signal includes a second frequency.

12. The system of claim 10, wherein:
the first signal includes at least one of a first amplitude, a first direct current (DC) offset, a first modulation, a first modulation & coding set/rate (MCS), or a first forward error correction (FEC); and
the second signal includes at least one of a second amplitude, a second DC offset, a second modulation, a second MCS, or a second FEC.

13. The system of claim 1, wherein the DSC further comprising:
a power source circuit operably coupled to the touch sensor electrode of the touch sensor device via the single line, wherein, when enabled, the power source circuit configured to provide the touch sensor signal that includes an analog signal via the single line coupling to the touch sensor electrode, and wherein the analog signal includes at least one of a DC (direct current) component or an oscillating component; and
a power source change detection circuit operably coupled to the power source circuit, wherein, when enabled, the power source change detection circuit is configured to:
  detect an effect on the analog signal that is based on the electrical characteristic of the touch sensor electrode; and
  generate the digital signal that is representative of the electrical characteristic of the touch sensor electrode.

14. The system of claim 13, wherein the DSC further comprising:
the power source circuit including a power source to source at least one of a voltage or a current to the touch sensor electrode via the single line; and
the power source change detection circuit including:
  a power source reference circuit configured to provide at least one of a voltage reference or a current reference; and
  a comparator configured to compare the at least one of the voltage or the current provided to the touch sensor electrode to the at least one of the voltage reference or the current reference, respectively, to produce the analog signal.

15. A system including an electronic pen (e-pen) and a touch sensor device comprising:
the e-pen that includes one or more e-pen sensor electrodes;
the touch sensor device including a drive-sense circuit (DSC) operably coupled to a touch sensor electrode of the touch sensor device via a single line, wherein, when enabled, the DSC configured to:
  drive a touch sensor signal via the single line coupling to the touch sensor electrode of the touch sensor device and simultaneously sense, via the single line, change of the touch sensor signal based on interaction of the e-pen with the touch sensor electrode of the touch sensor device; and
  process the change of the touch sensor signal to generate a digital signal that is representative of an electrical characteristic of the touch sensor electrode;
a memory that stores operational instructions; and
a processing module operably coupled to the DSC and to the memory, wherein, when enabled, the processing module is configured to execute the operational instructions to:
  process the digital signal to detect the interaction of the e-pen with the touch sensor electrode of the touch sensor device and to determine whether the e-pen is an independent e-pen or a dependent e-pen that is dependent on the touch sensor device;
  based on a determination that the e-pen is the dependent e-pen that is dependent on the touch sensor device, determine availability of one or more signals to be assigned to the one or more e-pen sensor electrodes to facilitate communication between the e-pen and the touch sensor device;
  assign at least one of the one or more signals that is determined to be available to the one or more e-pen sensor electrodes to facilitate communication between the e-pen and the touch sensor device;
  assign a first signal that is determined to be available to a first e-pen sensor electrode of the one or more e-pen sensor electrodes to facilitate communication between the e-pen and the touch sensor device; and
  assign a second signal that is determined to be available to a second e-pen sensor electrode of the one or more e-pen sensor electrodes to facilitate communication between the e-pen and the touch sensor device; and
when enabled, the e-pen configured to:
  transmit first information to the touch sensor device using the first signal; and
  transmit second information to the touch sensor device using the second signal.

16. The system of claim 15, wherein, when enabled, the processing module is further configured to execute the operational instructions to:
after communication between the e-pen and the touch sensor device based on the first signal being assigned to the first e-pen sensor electrode, assign a third signal that is determined to be available to the first e-pen sensor electrode to facilitate communication between the e-pen and the touch sensor device; and
after communication between the e-pen and the touch sensor device based on the second signal being assigned to the second e-pen sensor electrode, assign a fourth signal that is determined to be available to the second e-pen sensor electrode to facilitate communication between the e-pen and the touch sensor device.

17. The system of claim 15, wherein:
the first signal includes a first frequency; and
the second signal includes a second frequency.

18. The system of claim 15, wherein:
the first signal includes at least one of a first amplitude, a first direct current (DC) offset, a first modulation, a first modulation & coding set/rate (MCS), or a first forward error correction (FEC); and
the second signal includes at least one of a second amplitude, a second DC offset, a second modulation, a second MCS, or a second FEC.

19. The system of claim 15, wherein the DSC further comprising:
a power source circuit operably coupled to the touch sensor electrode of the touch sensor device via the single line, wherein, when enabled, the power source circuit configured to provide the touch sensor signal that includes an analog signal via the single line coupling to the touch sensor electrode, and wherein the analog signal includes at least one of a DC (direct current) component or an oscillating component; and
a power source change detection circuit operably coupled to the power source circuit, wherein, when enabled, the power source change detection circuit is configured to:

detect an effect on the analog signal that is based on the electrical characteristic of the touch sensor electrode; and generate the digital signal that is representative of the electrical characteristic of the touch sensor electrode.

20. The system of claim 19, wherein the DSC further comprising:

the power source circuit including a power source to source at least one of a voltage or a current to the touch sensor electrode via the single line; and the power source change detection circuit including:

a power source reference circuit configured to provide at least one of a voltage reference or a current reference; and a comparator configured to compare the at least one of the voltage or the current provided to the touch sensor electrode to the at least one of the voltage reference or the current reference, respectively, to produce the analog signal.

\* \* \* \* \*